(12) United States Patent
Graham et al.

(10) Patent No.: US 12,256,205 B2
(45) Date of Patent: Mar. 18, 2025

(54) WIRELESS HEADPHONE INTERACTIONS

(71) Applicant: Apple Inc., Cupertino, CA (US)

(72) Inventors: David Chance Graham, Columbus, OH (US); Patrick L. Coffman, San Francisco, CA (US); Thomas S. Hulbert, Sunnyvale, CA (US); Cyrus Daniel Irani, Menlo Park, CA (US); Daniel Max Strongwater, Santa Fe, NM (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/394,413

(22) Filed: Dec. 22, 2023

(65) Prior Publication Data

US 2024/0129670 A1 Apr. 18, 2024

Related U.S. Application Data

(63) Continuation of application No. 17/503,145, filed on Oct. 15, 2021, now Pat. No. 11,863,954, which is a
(Continued)

(51) Int. Cl.
| H04R 5/04 | (2006.01) |
| G06F 3/01 | (2006.01) |
| G06F 9/54 | (2006.01) |
| G10L 21/0208 | (2013.01) |
| H04R 3/04 | (2006.01) |
| H04R 5/033 | (2006.01) |

(52) U.S. Cl.
CPC ............... *H04R 5/04* (2013.01); *G06F 3/017* (2013.01); *G06F 9/542* (2013.01); *G10L 21/0208* (2013.01); *H04R 3/04* (2013.01); *H04R 5/033* (2013.01)

(58) Field of Classification Search
CPC . H04R 5/04; H04R 3/04; H04R 5/033; H04R 1/1041; H04R 1/1083; H04R 2201/109; H04R 2460/01; G06F 3/017; G06F 9/542; G06F 3/04847; G06F 3/04883; G06F 3/167; G10L 21/0208; G10K 11/17885
See application file for complete search history.

(56) References Cited

U.S. PATENT DOCUMENTS 5,936,619 A 8/1999 Nagasaki et al.
6,639,584 B1 10/2003 Li
(Continued)

FOREIGN PATENT DOCUMENTS

EP 0587161 A2 3/1994
EP 1517228 A2 3/2005
(Continued)

OTHER PUBLICATIONS

Advisory Action received for U.S. Appl. No. 12/199,532, mailed on Jan. 31, 2013, 3 Pages.
(Continued)

*Primary Examiner* — Yogeshkumar Patel
(74) *Attorney, Agent, or Firm* — DLA Piper LLP (US)

(57) ABSTRACT

The present disclosure generally relates to user interfaces for electronic audio devices. In some examples, the operating mode of the device changes to various states of sound transparency.

30 Claims, 49 Drawing Sheets

Related U.S. Application Data continuation of application No. 16/550,139, filed on Aug. 23, 2019, now Pat. No. 11,153,687.

(60) Provisional application No. 62/722,751, filed on Aug. 24, 2018.

(56) References Cited

U.S. PATENT DOCUMENTS

| | | |
|---|---|---|
| 8,217,904 B2 | 7/2012 | Kim |
| 2003/0014296 A1 | 1/2003 | Meine et al. |
| 2005/0114788 A1 | 5/2005 | Fabritius |
| 2006/0001656 A1 | 1/2006 | Laviola et al. |
| 2006/0026521 A1 | 2/2006 | Hotelling et al. |
| 2006/0196347 A1 | 9/2006 | Iwata |
| 2007/0013671 A1 | 1/2007 | Zadesky et al. |
| 2007/0111767 A1 | 5/2007 | Brown et al. |
| 2007/0155434 A1 | 7/2007 | Jobs et al. |
| 2007/0211023 A1 | 9/2007 | Boillot |
| 2007/0252821 A1 | 11/2007 | Hollemans et al. |
| 2007/0262964 A1 | 11/2007 | Zotov et al. |
| 2008/0084400 A1 | 4/2008 | Rosenberg |
| 2009/0002335 A1 | 1/2009 | Chaudhri |
| 2009/0006292 A1 | 1/2009 | Block |
| 2009/0199130 A1 | 8/2009 | Tsern et al. |
| 2010/0020025 A1 | 1/2010 | Lemort et al. |
| 2010/0045705 A1 | 2/2010 | Vertegaal et al. |
| 2010/0058251 A1 | 3/2010 | Rottler et al. |
| 2011/0199393 A1 | 8/2011 | Nurse et al. |
| 2012/0121103 A1 | 5/2012 | Cohen et al. |
| 2014/0240466 A1 | 8/2014 | Holz |
| 2016/0205459 A1 | 7/2016 | Kamada et al. |
| 2016/0269841 A1 | 9/2016 | Shinde |
| 2016/0314788 A1 | 10/2016 | Jitkoff et al. |
| 2016/0323672 A1 | 11/2016 | Bhogal et al. |
| 2016/0351183 A1* | 12/2016 | Gauger, Jr. ...... G10K 11/17881 |
| 2016/0357429 A1 | 12/2016 | Nilo et al. |
| 2017/0280223 A1 | 9/2017 | Cavarra et al. |
| 2017/0357478 A1* | 12/2017 | Piersol ................... G10L 15/22 |
| 2018/0129402 A1 | 5/2018 | Rottler et al. |
| 2018/0247646 A1 | 8/2018 | Meacham et al. |
| 2018/0336000 A1 | 11/2018 | Vaughn et al. |
| 2022/0038820 A1 | 2/2022 | Graham et al. |
| 2023/0359340 A1 | 11/2023 | Rottler et al. |

FOREIGN PATENT DOCUMENTS

| | | |
|---|---|---|
| WO | 2002/08881 A2 | 1/2002 |
| WO | 2007/089766 A2 | 8/2007 |

OTHER PUBLICATIONS

Advisory Action received for U.S. Appl. No. 12/199,532, mailed on Mar. 30, 2012, 3 Pages.
Applicant-Initiated Interview Summary received for U.S. Appl. No. 15/803,652, mailed on Apr. 13, 2022, 4 pages.
Applicant-Initiated Interview Summary received for U.S. Appl. No. 15/803,652, mailed on Dec. 23, 2019, 4 pages.
Applicant-Initiated Interview Summary received for U.S. Appl. No. 15/803,652, mailed on Oct. 28, 2020, 5 pages.
Applicant-Initiated Interview Summary received for U.S. Appl. No. 16/550,139, mailed on Sep. 11, 2020, 4 pages.
Applicant-Initiated Interview Summary received for U.S. Appl. No. 17/503,145, mailed on Jul. 11, 2023, 2 pages.
Corrected Notice of Allowance received for U.S. Appl. No. 16/550,139, mailed on Sep. 2, 2021, 6 pages.
Decision on Appeal received for U.S. Appl. No. 15/803,652, mailed on May 16, 2023, 15 pages.
Examiner's Answer to Appeal Brief received for U.S. Appl. No. 15/803,652, mailed on Aug. 30, 2022, 11 pages.
Final Office Action received for U.S. Appl. No. 15/803,652, mailed on Feb. 5, 2021, 10 pages.
Final Office Action received for U.S. Appl. No. 15/803,652, mailed on Feb. 25, 2020, 10 pages.
Final Office Action received for U.S. Appl. No. 12/199,532, mailed on Dec. 23, 2011, 21 pages.
Office Action received for U.S. Appl. No. 12/199,532, mailed on Jun. 27, 2016, 19 pages.
Final Office Action received for U.S. Appl. No. 12/199,532, mailed on Oct. 26, 2012, 18 Pages.
International Preliminary Report on Patentability received for PCT Patent Application No. PCT/US2009/054926, mailed on Dec. 6, 2010, 9 pages.
International Search Report and Written Opinion received for PCT Patent Application No. PCT/US2009/054926, mailed on Feb. 18, 2010, 10 pages.
Non-Final Office Action received for U.S. Appl. No. 12/199,532, mailed on May 4, 2017, 14 pages.
Non-Final Office Action received for U.S. Appl. No. 12/199,532, mailed on Aug. 4, 2011, 19 pages.
Non-Final Office Action received for U.S. Appl. No. 12/199,532, mailed on Jan. 5, 2016, 15 pages.
Non-Final Office Action received for U.S. Appl. No. 16/550,139, mailed on Mar. 12, 2020, 17 pages.
Non-Final Office Action received for U.S. Appl. No. 12/199,532, mailed on Jun. 4, 2012, 18 pages.
Non-Final Office Action received for U.S. Appl. No. 15/803,652, mailed on Jan. 27, 2022, 13 pages.
Non-Final Office Action received for U.S. Appl. No. 15/803,652, mailed on Nov. 5, 2019, 10 pages.
Non-Final Office Action received for U.S. Appl. No. 15/803,652, mailed on Sep. 21, 2020, 10 pages.
Non-Final Office Action received for U.S. Appl. No. 16/550,139, mailed on Jan. 28, 2021, 15 pages.
Non-Final Office Action received for U.S. Appl. No. 17/503,145, mailed on Jan. 20, 2023, 20 pages.
Notice of Allowance received for U.S. Appl. No. 16/550,139, mailed on Jun. 9, 2021, 10 pages.
Notice of Allowance received for U.S. Appl. No. 16/550,139, mailed on Sep. 23, 2020, 9 pages.
Notice of Allowance received for U.S. Appl. No. 17/503,145, mailed on Aug. 3, 2023, 9 pages.
Record of Oral Hearing received for U.S. Appl. No. 15/803,652, mailed on Apr. 25, 2023, 20 pages.
Applicant-Initiated Interview Summary received for U.S. Appl. No. 18/222,394, mailed on May 29, 2024, 3 pages.
Final Office Action received for U.S. Appl. No. 18/222,394, mailed on Jul. 31, 2024, 11 pages.
Non-Final Office Action received for U.S. Appl. No. 18/222,394, mailed on Mar. 29, 2024, 6 pages.
Non-Final Office Action received for U.S. Appl. No. 18/222,394, mailed on May 1, 2024, 9 pages.

* cited by examiner

WIRELESS HEADPHONE INTERACTIONS

RELATED APPLICATIONS

This application is a continuation of U.S. application Ser. No. 17/503,145, entitled "WIRELESS HEADPHONE INTERACTIONS", filed on Oct. 15, 2021, which is a continuation of U.S. application Ser. No. 16/550,139, entitled "WIRELESS HEADPHONE INTERACTIONS", filed on Aug. 23, 2019, now U.S. Pat. No. 11,153,687, which claims priority to U.S. Provisional Patent Application Ser. No. 62/722,751, entitled "WIRELESS HEADPHONE INTERACTIONS", filed on Aug. 24, 2018, all of which are hereby incorporated by reference in their entireties.

FIELD

The present disclosure relates generally to user interfaces for electronic devices, and more specifically to techniques for interacting with and operating electronic audio devices such as wireless headphones.

BACKGROUND

Traditional headphones are connected via a wire to a device (e.g., a music player, phone, receiver, etc.) that provides audio signals, which the headphones use to produce audio output via speakers in or near the user's ear(s). Headphones often have few, if any, user input capabilities. The device to which the headphones are connected typically controls operations such as adjusting volume, changing an audio track, pausing the audio, and other features.

BRIEF SUMMARY

Some techniques for interacting with electronic audio devices such as wireless headphones, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for electronic audio devices. Such methods and interfaces optionally complement or replace other methods for interacting with electronic audio devices. Such methods and interfaces reduce the cognitive burden on a user and produce a more efficient human-machine interface. For battery-operated computing devices, such methods and interfaces conserve power and increase the time between battery charges.

A method includes: at an electronic device including at least a first touch-sensitive surface: detecting, at the at least a first touch-sensitive surface, a first gesture, including detecting an orientation of the first gesture with respect to the touch-sensitive surface; and in response to detecting the first gesture: in accordance with a determination that the electronic device is in a first device orientation and that the orientation of the first gesture corresponds to a first predetermined orientation, performing a first action; and in accordance with a determination that the electronic device is in a second device orientation, different than the first device orientation and that the orientation of the first gesture corresponds to the first predetermined orientation, performing a second action, different than the first action.

A non-transitory computer-readable storage medium stores one or more programs configured to be executed by one or more processors of an electronic device with at least a first touch-sensitive surface, the one or more programs including instructions for: detecting, at the at least a first touch-sensitive surface, a first gesture, including detecting an orientation of the first gesture with respect to the touch-sensitive surface; and in response to detecting the first gesture: in accordance with a determination that the electronic device is in a first device orientation and that the orientation of the first gesture corresponds to a first predetermined orientation, performing a first action; and in accordance with a determination that the electronic device is in a second device orientation, different than the first device orientation and that the orientation of the first gesture corresponds to the first predetermined orientation, performing a second action, different than the first action.

A transitory computer-readable storage medium stores one or more programs configured to be executed by one or more processors of an electronic device with at least a first touch-sensitive surface, the one or more programs including instructions for: detecting, at the at least a first touch-sensitive surface, a first gesture, including detecting an orientation of the first gesture with respect to the touch-sensitive surface; and in response to detecting the first gesture: in accordance with a determination that the electronic device is in a first device orientation and that the orientation of the first gesture corresponds to a first predetermined orientation, performing a first action; and in accordance with a determination that the electronic device is in a second device orientation, different than the first device orientation and that the orientation of the first gesture corresponds to the first predetermined orientation, performing a second action, different than the first action.

An electronic device includes: at least a first touch-sensitive surface; one or more processors; and memory storing one or more programs configured to be executed by the one or more processors, the one or more programs including instructions for: detecting, at the at least a first touch-sensitive surface, a first gesture, including detecting an orientation of the first gesture with respect to the touch-sensitive surface; and in response to detecting the first gesture: in accordance with a determination that the electronic device is in a first device orientation and that the orientation of the first gesture corresponds to a first predetermined orientation, performing a first action; and in accordance with a determination that the electronic device is in a second device orientation, different than the first device orientation and that the orientation of the first gesture corresponds to the first predetermined orientation, performing a second action, different than the first action.

An electronic device includes: at least a first touch-sensitive surface; means for detecting, at the at least a first touch-sensitive surface, a first gesture, including detecting an orientation of the first gesture with respect to the touch-sensitive surface; and means, responsive to detecting the first gesture, for: in accordance with a determination that the electronic device is in a first device orientation and that the orientation of the first gesture corresponds to a first predetermined orientation, performing a first action; and in accordance with a determination that the electronic device is in a second device orientation, different than the first device orientation and that the orientation of the first gesture corresponds to the first predetermined orientation, performing a second action, different than the first action.

A method includes: at an electronic device having an audio output mechanism; determining a context of the electronic device; and in response to determining the context of the electronic device: in accordance with a determination that the context of the electronic device is a first context, operating the electronic device in a first state of ambient sound transparency; and in accordance with a determination that the context of the electronic device is a second context, different than the first context, operating the electronic device in a second state of ambient sound transparency, different than the first state of ambient sound transparency.

A non-transitory computer-readable storage medium stores one or more programs configured to be executed by one or more processors of an electronic device with an audio output mechanism, the one or more programs including instructions for: determining a context of the electronic device; and in response to determining the context of the electronic device: in accordance with a determination that the context of the electronic device is a first context, operating the electronic device in a first state of ambient sound transparency; and in accordance with a determination that the context of the electronic device is a second context, different than the first context, operating the electronic device in a second state of ambient sound transparency, different than the first state of ambient sound transparency.

A transitory computer-readable storage medium stores one or more programs configured to be executed by one or more processors of an electronic device with an audio output mechanism, the one or more programs including instructions for: determining a context of the electronic device; and in response to determining the context of the electronic device: in accordance with a determination that the context of the electronic device is a first context, operating the electronic device in a first state of ambient sound transparency; and in accordance with a determination that the context of the electronic device is a second context, different than the first context, operating the electronic device in a second state of ambient sound transparency, different than the first state of ambient sound transparency.

An electronic device includes: an audio output mechanism; one or more processors; and memory storing one or more programs configured to be executed by the one or more processors, the one or more programs including instructions for: determining a context of the electronic device; and in response to determining the context of the electronic device: in accordance with a determination that the context of the electronic device is a first context, operating the electronic device in a first state of ambient sound transparency; and in accordance with a determination that the context of the electronic device is a second context, different than the first context, operating the electronic device in a second state of ambient sound transparency, different than the first state of ambient sound transparency.

An electronic device includes: an audio output mechanism; means for determining a context of the electronic device; and means, responsive to determining the context of the electronic device, for: in accordance with a determination that the context of the electronic device is a first context, operating the electronic device in a first state of ambient sound transparency; and in accordance with a determination that the context of the electronic device is a second context, different than the first context, operating the electronic device in a second state of ambient sound transparency, different than the first state of ambient sound transparency.

A method includes: at an electronic device having one or more motion sensors and an audio output mechanism; detecting first motion of the electronic device; and in response to detecting the first motion of the electronic device: in accordance with a determination that the first motion satisfies first operating state criteria, operating the electronic device in a first audio output operating state; and in accordance with a determination that the first motion satisfies second operating state criteria, different than the first operating state criteria, operating the electronic device in a second audio output operating state, different than the first audio output operating state.

A non-transitory computer-readable storage medium stores one or more programs configured to be executed by one or more processors of an electronic device with one or more motion sensors and an audio output mechanism, the one or more programs including instructions for: detecting first motion of the electronic device; and in response to detecting the first motion of the electronic device: in accordance with a determination that the first motion satisfies first operating state criteria, operating the electronic device in a first audio output operating state; and in accordance with a determination that the first motion satisfies second operating state criteria, different than the first operating state criteria, operating the electronic device in a second audio output operating state, different than the first audio output operating state.

A transitory computer-readable storage medium stores one or more programs configured to be executed by one or more processors of an electronic device with one or more motion sensors and an audio output mechanism, the one or more programs including instructions for: detecting first motion of the electronic device; and in response to detecting the first motion of the electronic device: in accordance with a determination that the first motion satisfies first operating state criteria, operating the electronic device in a first audio output operating state; and in accordance with a determination that the first motion satisfies second operating state criteria, different than the first operating state criteria, operating the electronic device in a second audio output operating state, different than the first audio output operating state.

An electronic device includes: one or more motion sensors; an audio output mechanism; one or more processors; and memory storing one or more programs configured to be executed by the one or more processors, the one or more programs including instructions for: detecting first motion of the electronic device; and in response to detecting the first motion of the electronic device: in accordance with a determination that the first motion satisfies first operating state criteria, operating the electronic device in a first audio output operating state; and in accordance with a determination that the first motion satisfies second operating state criteria, different than the first operating state criteria, operating the electronic device in a second audio output operating state, different than the first audio output operating state.

An electronic device includes: one or more motion sensors; an audio output mechanism; means for detecting first motion of the electronic device; and means, responsive to detecting the first motion of the electronic device, for: in accordance with a determination that the first motion satisfies first operating state criteria, operating the electronic device in a first audio output operating state; and in accordance with a determination that the first motion satisfies second operating state criteria, different than the first operating state criteria, operating the electronic device in a second audio output operating state, different than the first audio output operating state.

A method includes: at an electronic device including one or more orientation sensors, a first output device, and a second output device, different than the first output device:

receiving an input requesting information about a state of the electronic device; and in response to receiving the input requesting the information about the state of the electronic device: in accordance with a determination, based on the one or more orientation sensors, that the electronic device is in a first orientation, providing the requested information via the first output device; and in accordance with a determination, based on the one or more orientation sensors, that the electronic device is in a second orientation, different than the first orientation, providing the requested information about the state of the device via the second output device.

A non-transitory computer-readable storage medium stores one or more programs configured to be executed by one or more processors of an electronic device with one or more orientation sensors, a first output device, and a second output device, different than the first output device, the one or more programs including instructions for: receiving an input requesting information about a state of the electronic device; and in response to receiving the input requesting the information about the state of the electronic device: in accordance with a determination, based on the one or more orientation sensors, that the electronic device is in a first orientation, providing the requested information via the first output device; and in accordance with a determination, based on the one or more orientation sensors, that the electronic device is in a second orientation, different than the first orientation, providing the requested information about the state of the device via the second output device.

A transitory computer-readable storage medium stores one or more programs configured to be executed by one or more processors of an electronic device with one or more orientation sensors, a first output device, and a second output device, different than the first output device, the one or more programs including instructions for: receiving an input requesting information about a state of the electronic device; and in response to receiving the input requesting the information about the state of the electronic device: in accordance with a determination, based on the one or more orientation sensors, that the electronic device is in a first orientation, providing the requested information via the first output device; and in accordance with a determination, based on the one or more orientation sensors, that the electronic device is in a second orientation, different than the first orientation, providing the requested information about the state of the device via the second output device.

An electronic device includes: one or more orientation sensors; a first output device; a second output device, different than the first output device; one or more processors; and memory storing one or more programs configured to be executed by the one or more processors, the one or more programs including instructions for: receiving an input requesting information about a state of the electronic device; and in response to receiving the input requesting the information about the state of the electronic device: in accordance with a determination, based on the one or more orientation sensors, that the electronic device is in a first orientation, providing the requested information via the first output device; and in accordance with a determination, based on the one or more orientation sensors, that the electronic device is in a second orientation, different than the first orientation, providing the requested information about the state of the device via the second output device.

An electronic device includes: one or more orientation sensors; a first output device; a second output device, different than the first output device; means for receiving an input requesting information about a state of the electronic device; and means, responsive to receiving the input requesting the information about the state of the electronic device, for: in accordance with a determination, based on the one or more orientation sensors, that the electronic device is in a first orientation, providing the requested information via the first output device; and in accordance with a determination, based on the one or more orientation sensors, that the electronic device is in a second orientation, different than the first orientation, providing the requested information about the state of the device via the second output device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with electronic audio devices, thereby increasing the effectiveness, efficiency, and user satisfaction with such devices. Such methods and interfaces can complement or replace other methods for interacting with electronic audio devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for electronic audio devices, such as wireless headphones. The orientation-dependent, context-dependent, and motion-dependent techniques described below provide for more efficient, intuitive, and user-friendly operation of an audio-enabled electronic device. Such techniques can reduce the cognitive burden on a user who uses electronic audio devices, thereby enhancing productivity. Further, such techniques can reduce processor and battery power otherwise wasted on redundant user inputs.

Figure 9:
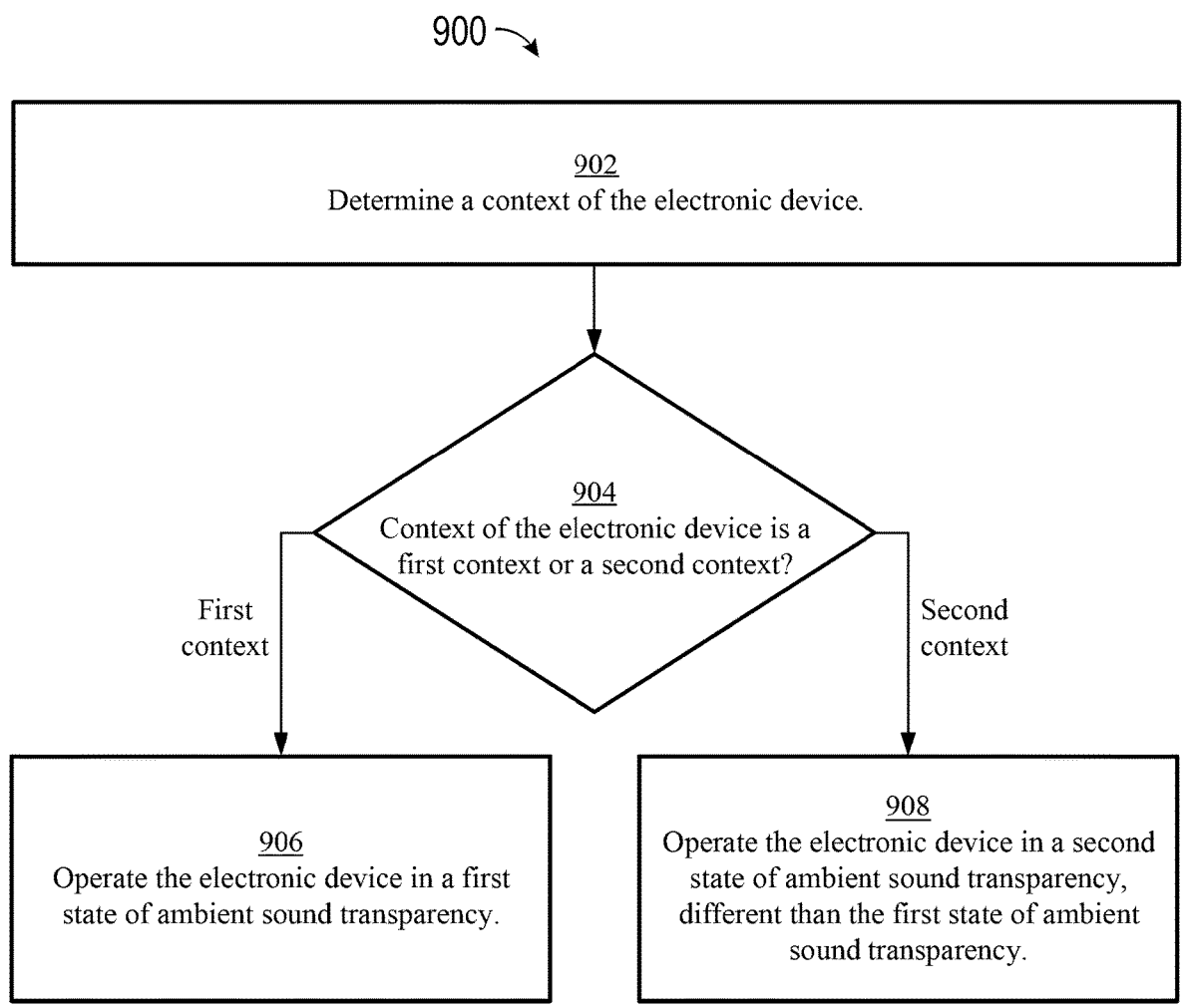
FIG. 9 is a flow diagram illustrating a method for context-dependent ambient sound transparency operation of an electronic device in accordance with some embodiments.
Figure 10A:
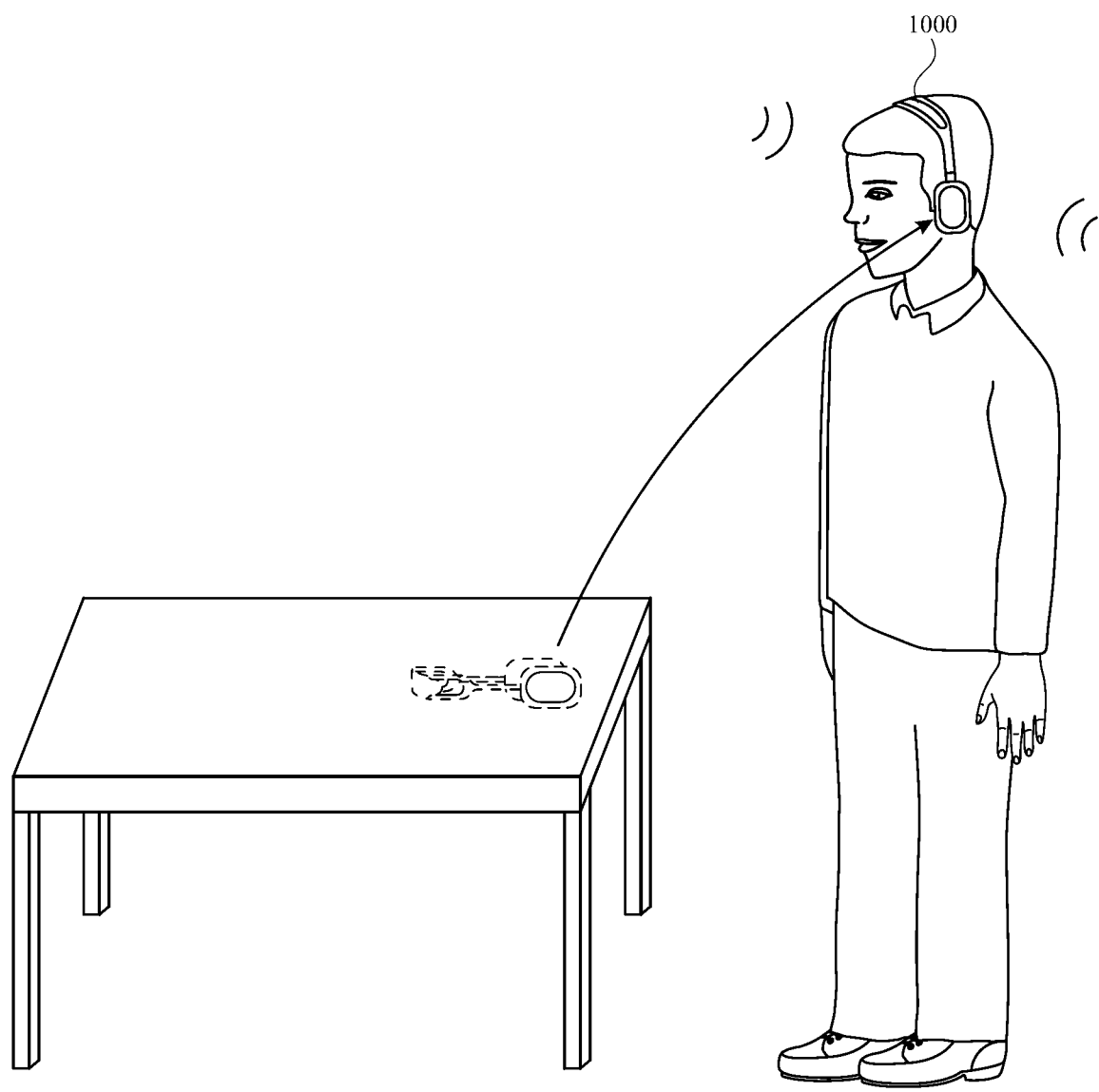
FIGS. 10A-10C illustrate exemplary techniques for motion-dependent audio output operation of an electronic device in accordance with some embodiments.
Figure 10B:
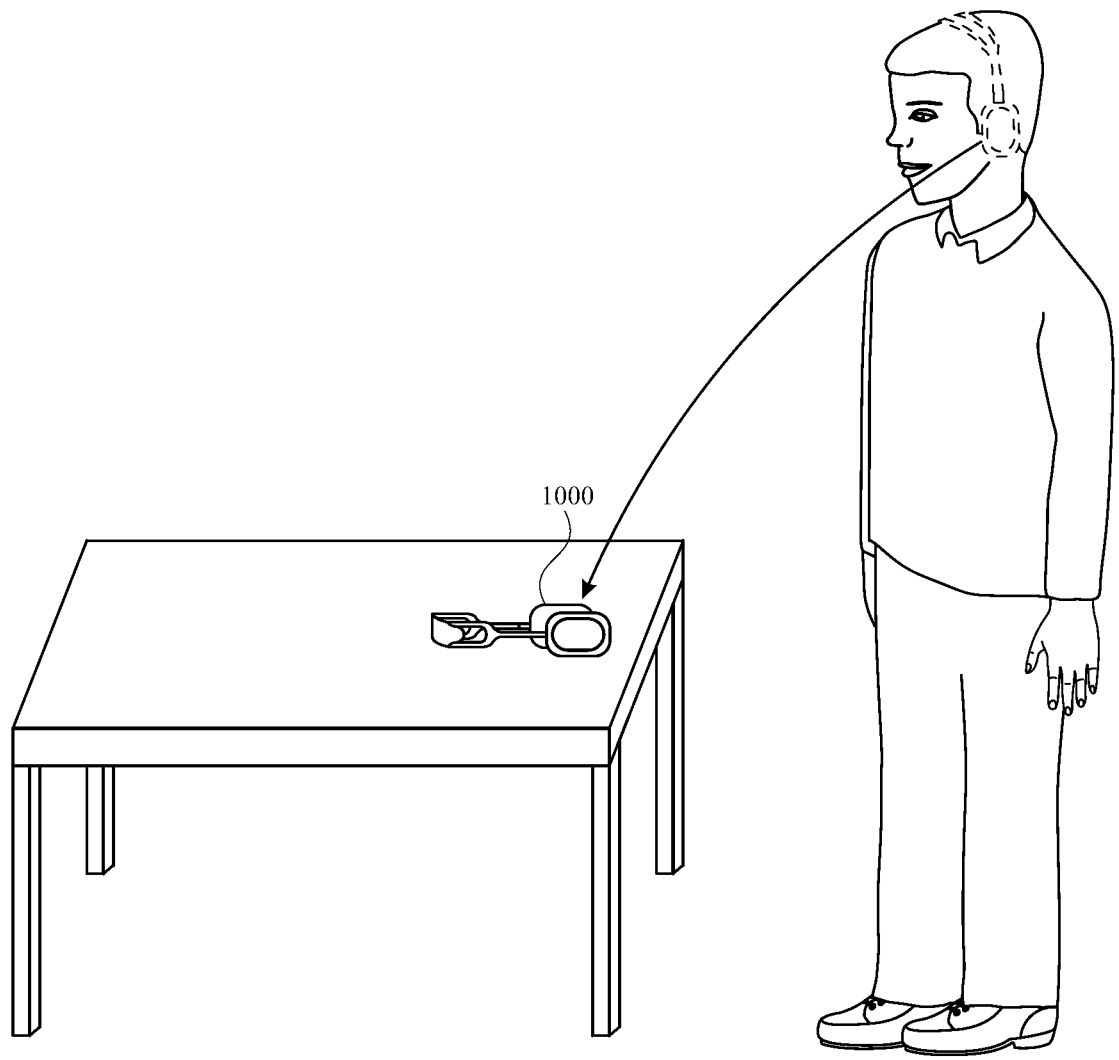
Figure 10C:
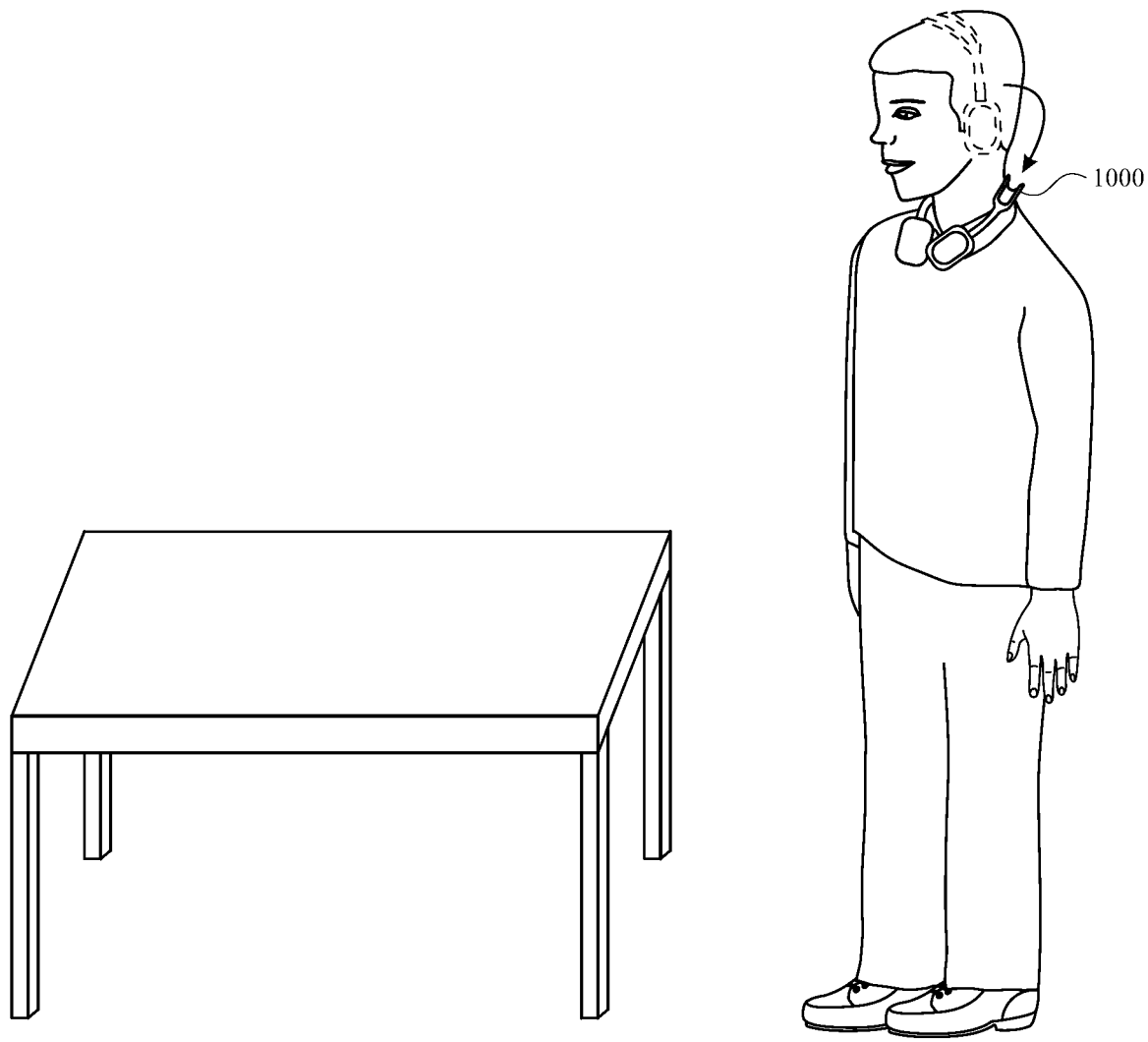
Figure 11:
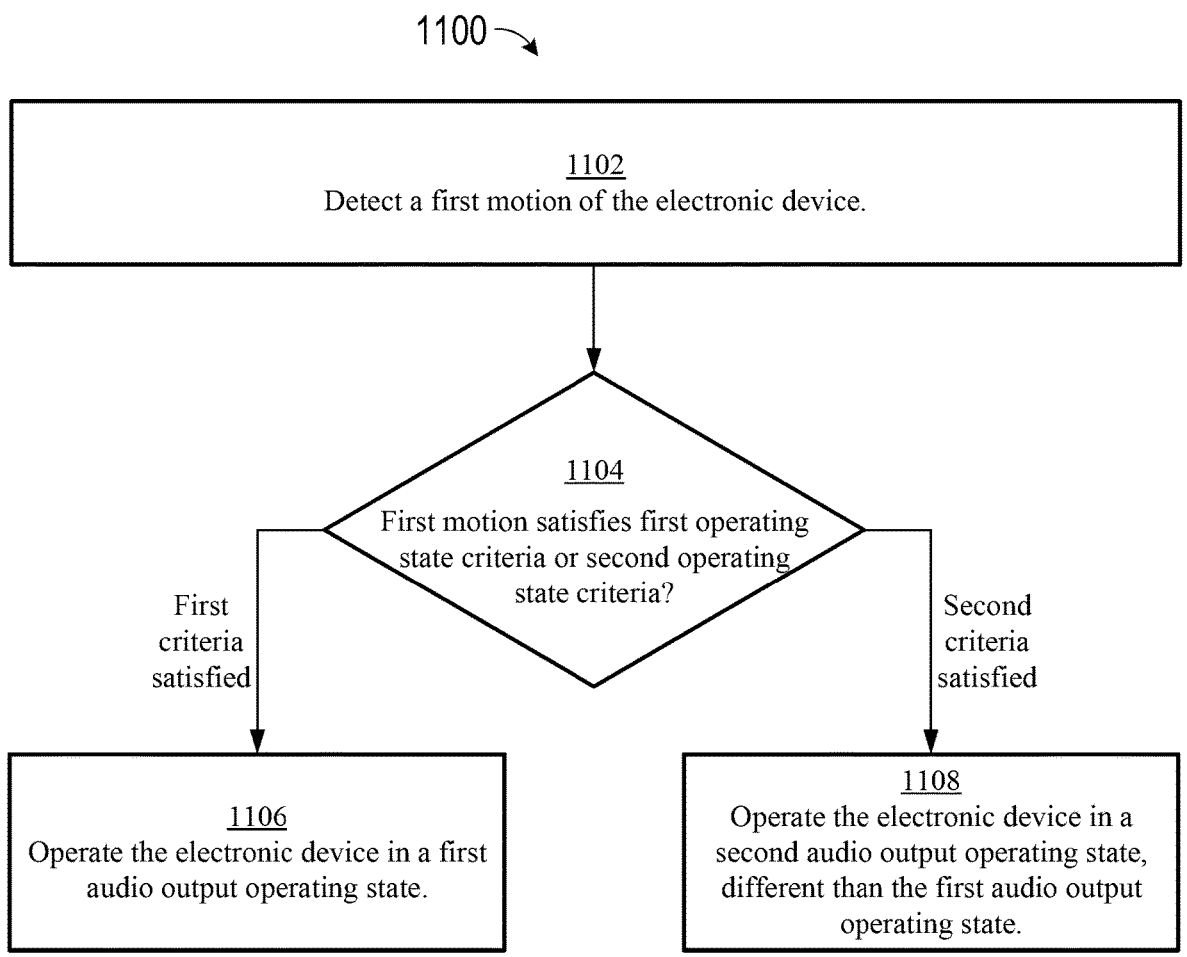
FIG. 11 is a flow diagram illustrating a method for motion-dependent audio output operation of an electronic device in accordance with some embodiments.
Figure 13:
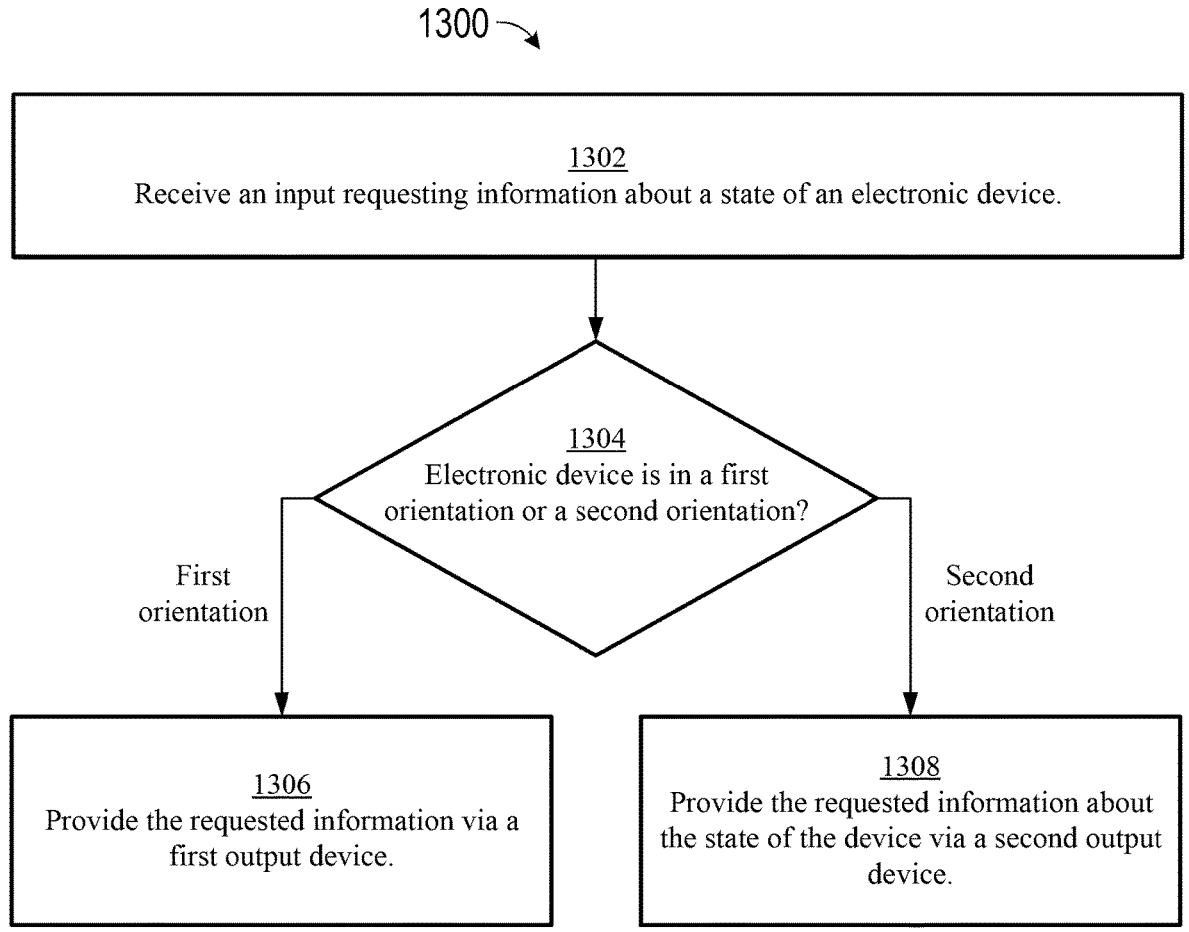
FIG. 13 is a flow diagram illustrating a method for providing state information about an electronic device in accordance with some embodiments.
Figure 14:
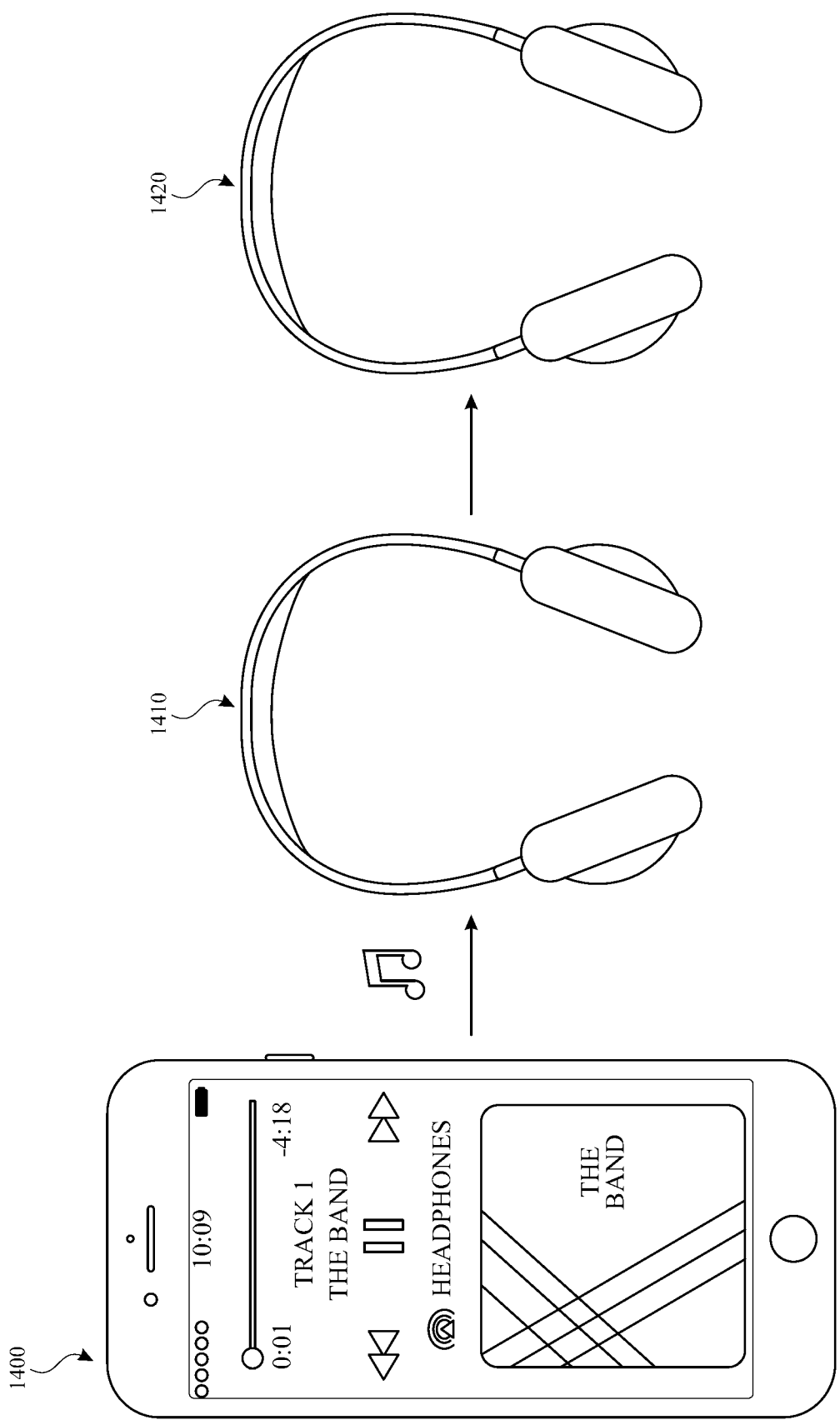
FIG. 14 illustrates exemplary techniques for operating multiple sets of headphones in accordance with some embodiments.

Below, FIGS. 1A-1B, 2, 3, 4A-4B, and 5A-5H provide a description of exemplary devices for performing the techniques described below. FIGS. 6A-6R illustrate exemplary techniques for processing gestures on a touch-sensitive surface using an electronic device. FIG. 7 is a flow diagram illustrating methods of processing gestures on a touch-sensitive surface using an electronic device in accordance with some embodiments. The illustrations in FIGS. 6A-6R are used to illustrate the processes described below, including the processes in FIG. 7. FIGS. 8A-8E illustrate exemplary techniques for context-dependent ambient sound transparency operation of an electronic device. FIG. 9 is a flow diagram illustrating methods of context-dependent ambient sound transparency operation of an electronic device in accordance with some embodiments. The illustrations in FIGS. 8A-8E are used to illustrate the processes described below, including the processes in FIG. 9. FIGS. 10A-10C illustrate exemplary techniques for motion-dependent audio output operation of an electronic device. FIG. 11 is a flow diagram illustrating methods of motion-dependent audio output operation of an electronic device in accordance with some embodiments. The illustrations in FIGS. 10A-10C are used to illustrate the processes described below, including the processes in FIG. 11. FIGS. 12A-12D illustrate exemplary techniques for providing state information about an electronic device. FIG. 13 is a flow diagram illustrating methods of providing state information about an electronic device in accordance with some embodiments. The illustrations in FIGS. 12A-12D are used to illustrate the processes described below, including the processes in FIG. 13. FIG. 14 illustrates exemplary techniques for operating multiple sets of headphones in accordance with some embodiments Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
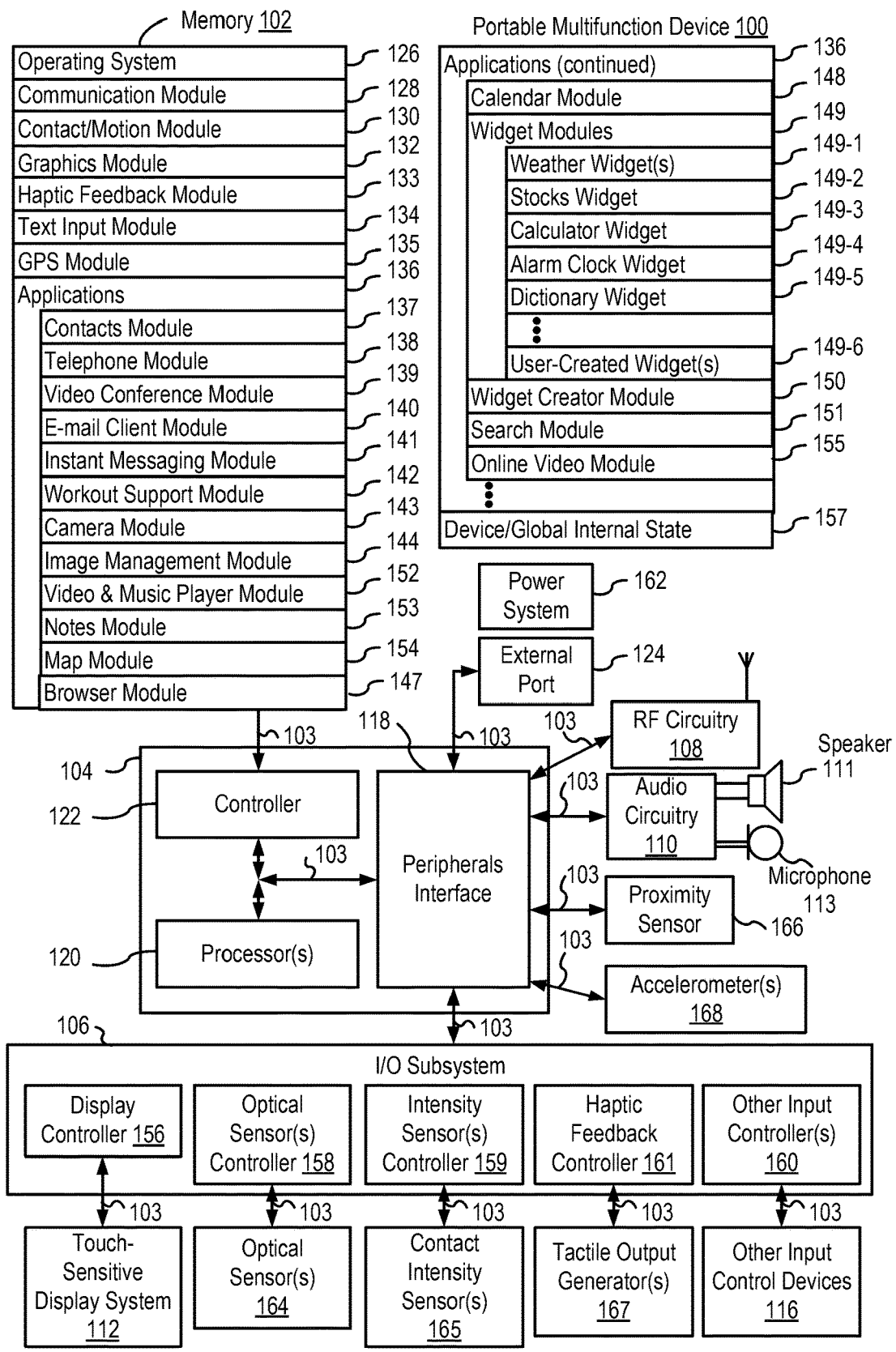
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that can otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
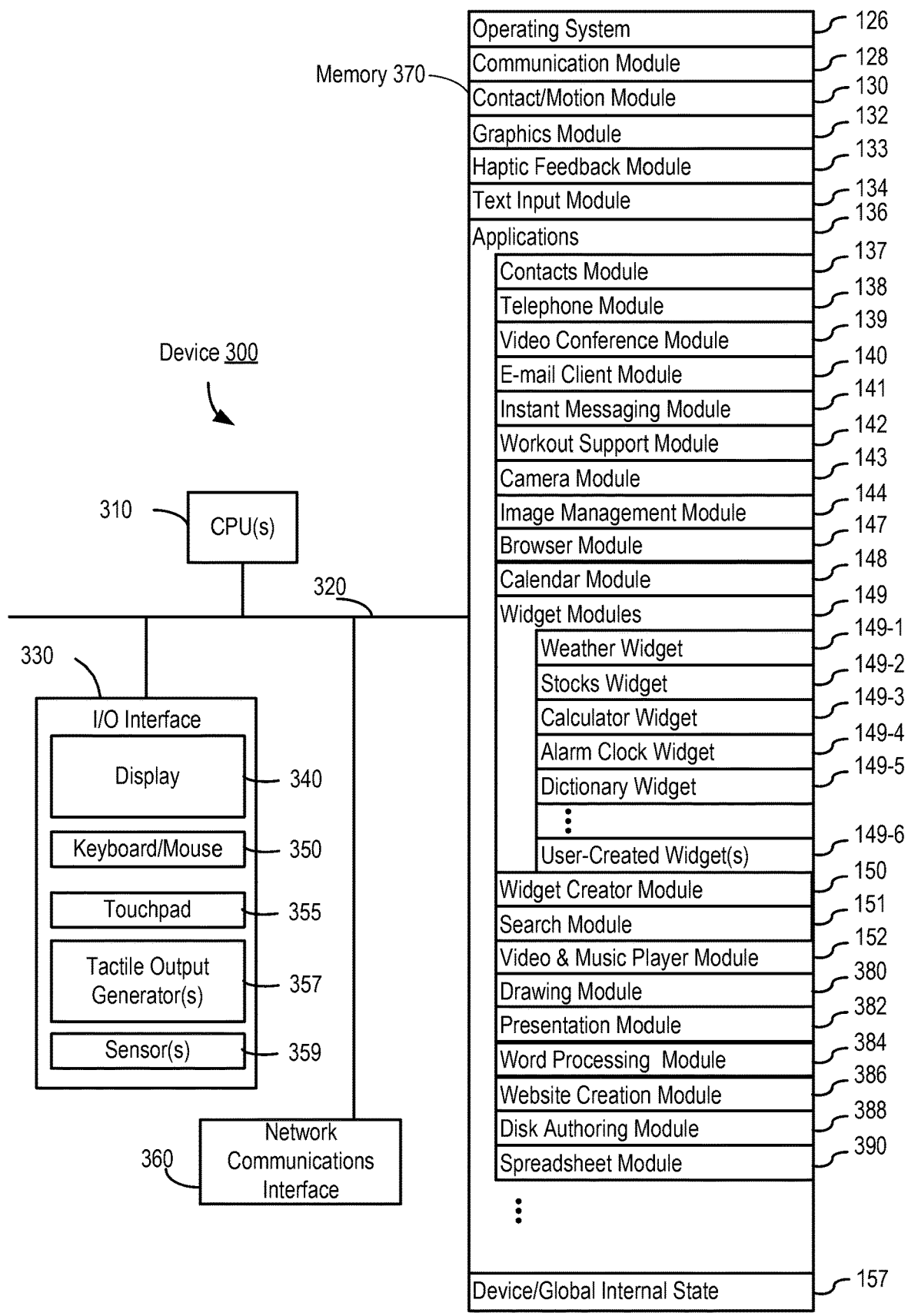
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, Instant messaging (IM) module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
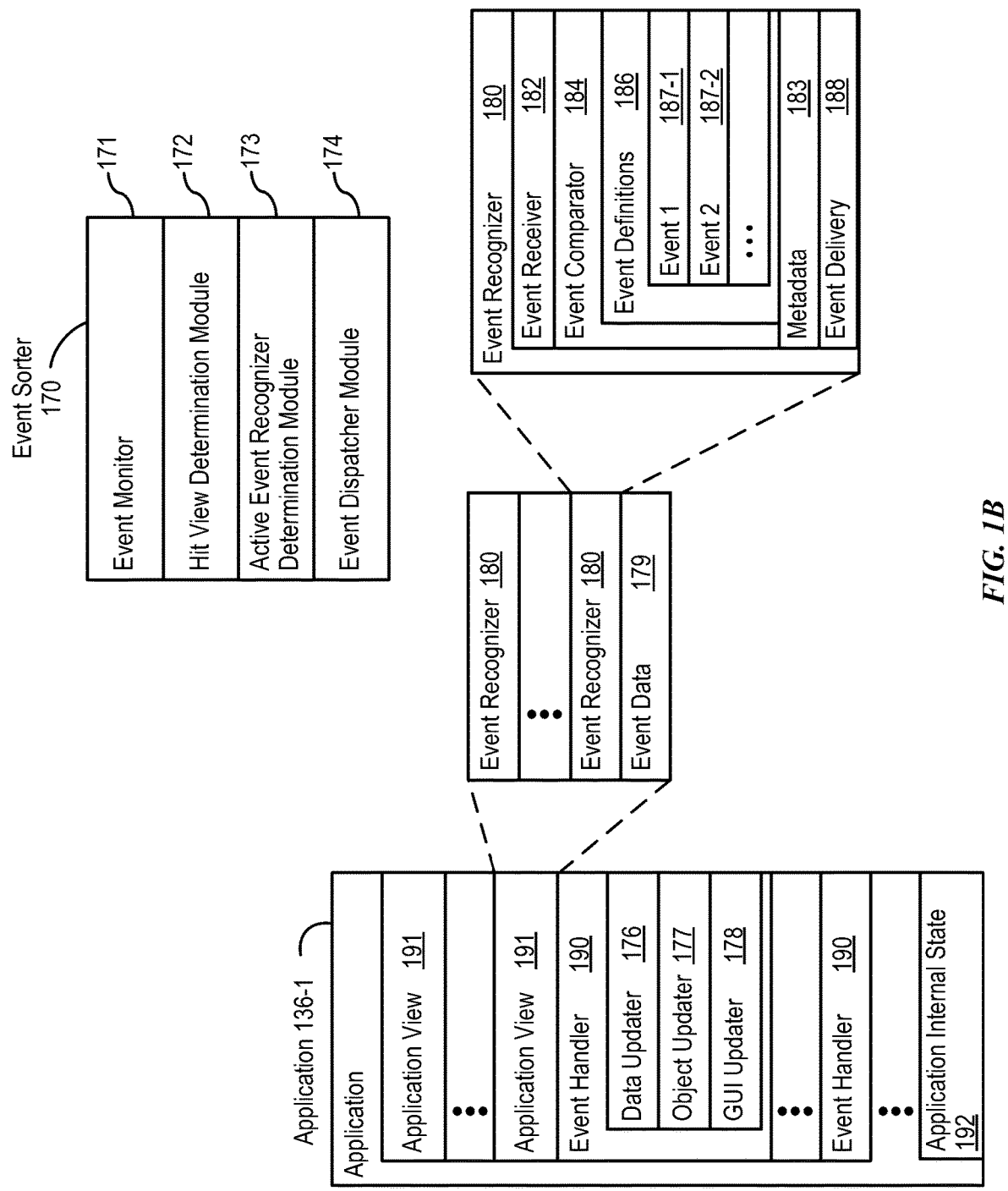
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
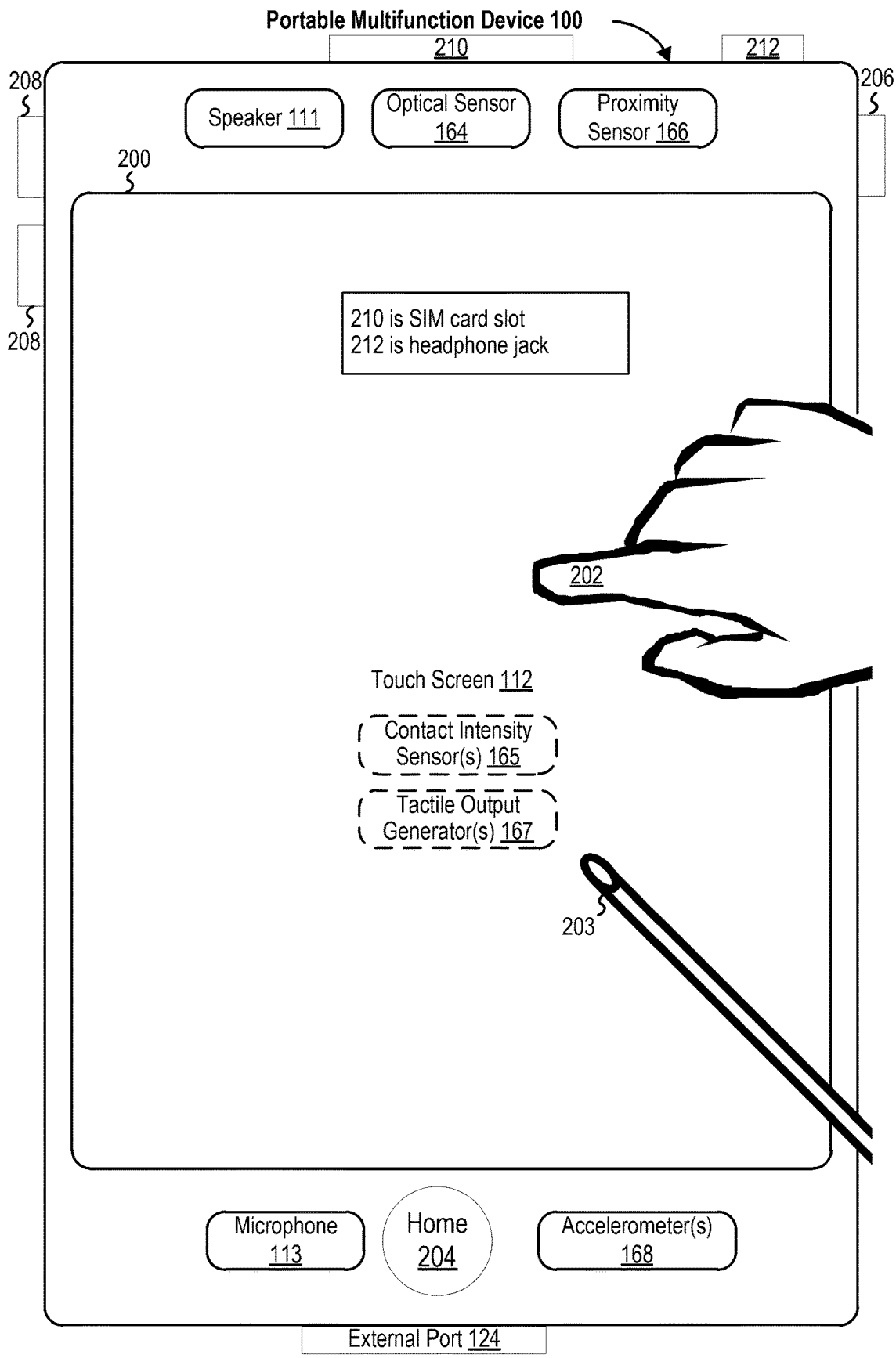
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
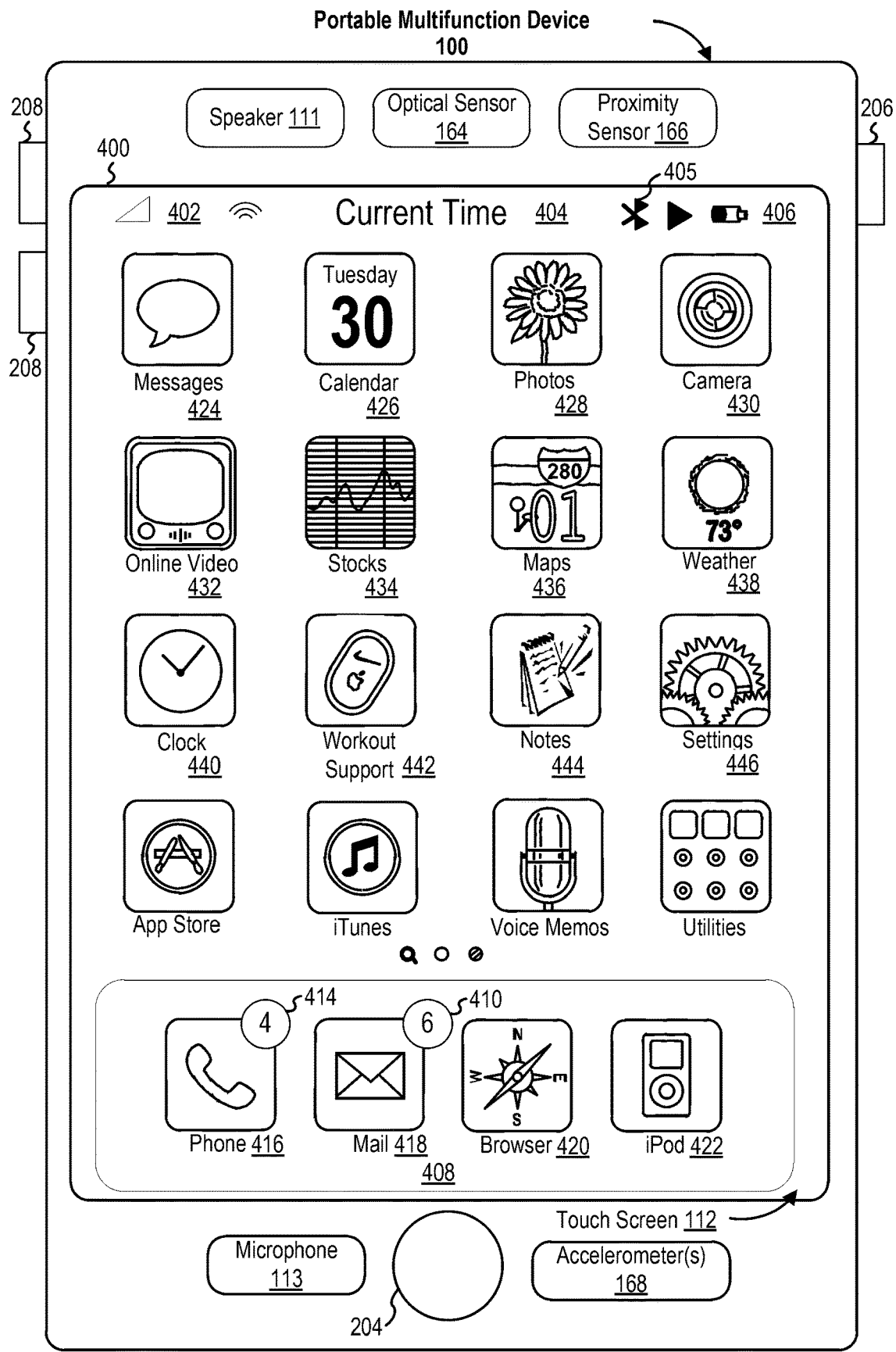
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
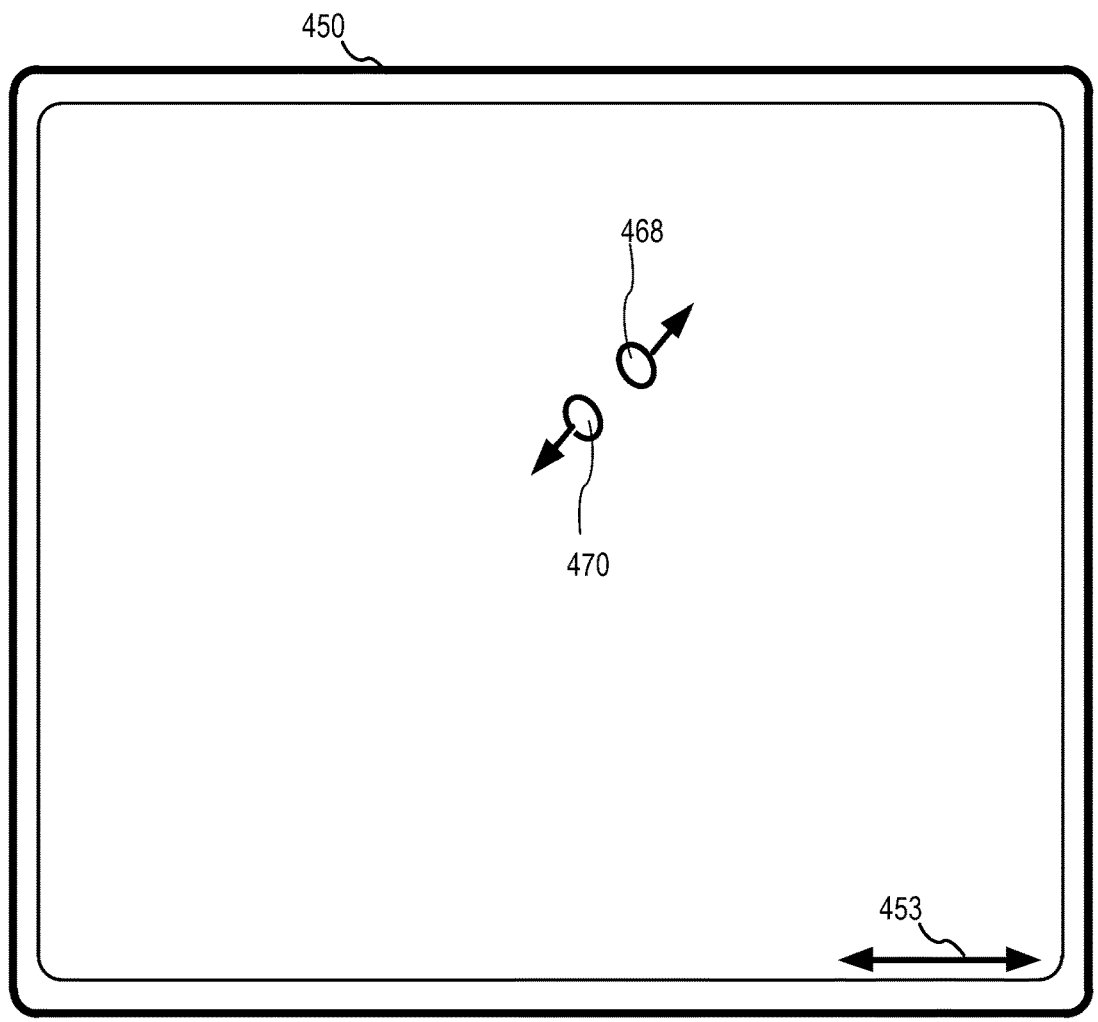
FIG. 4B illustrates an exemplary user interface for a multifunction device with a touch-sensitive surface that is separate from the display in accordance with some embodiments.
Figure 4B:
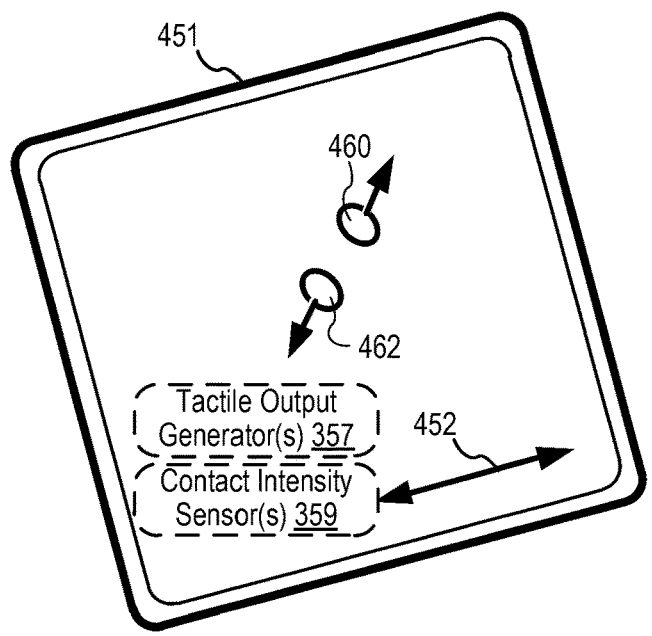

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
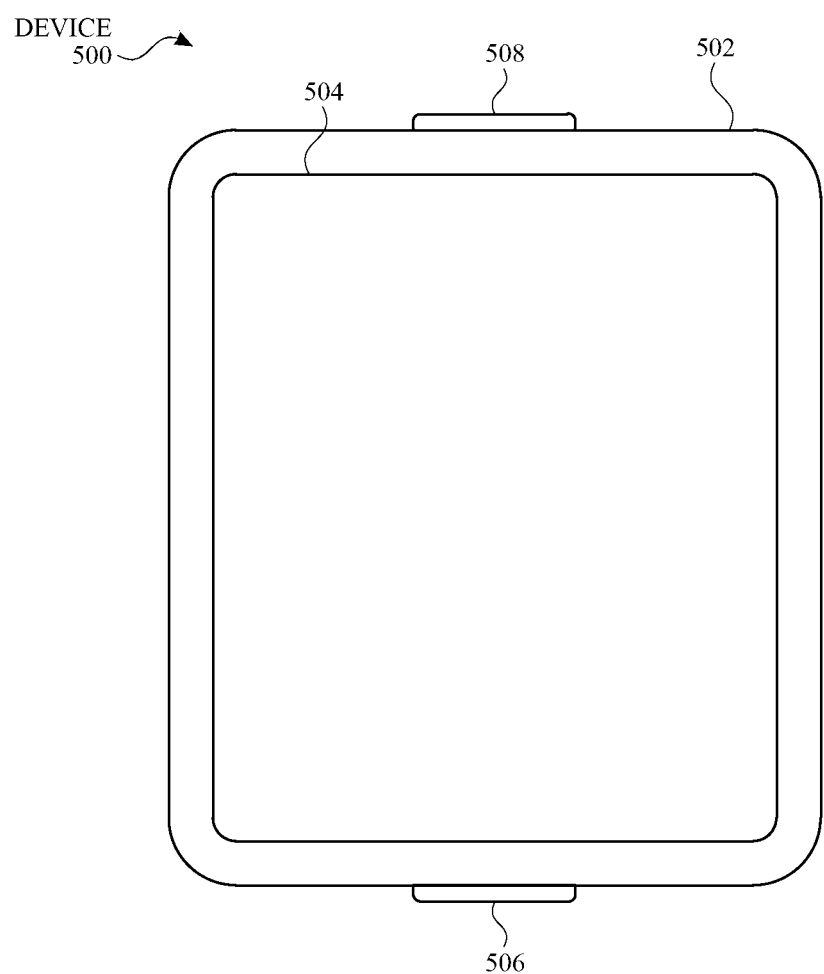
FIG. 5A illustrates a personal electronic device in accordance with some embodiments.
Figure 6A:
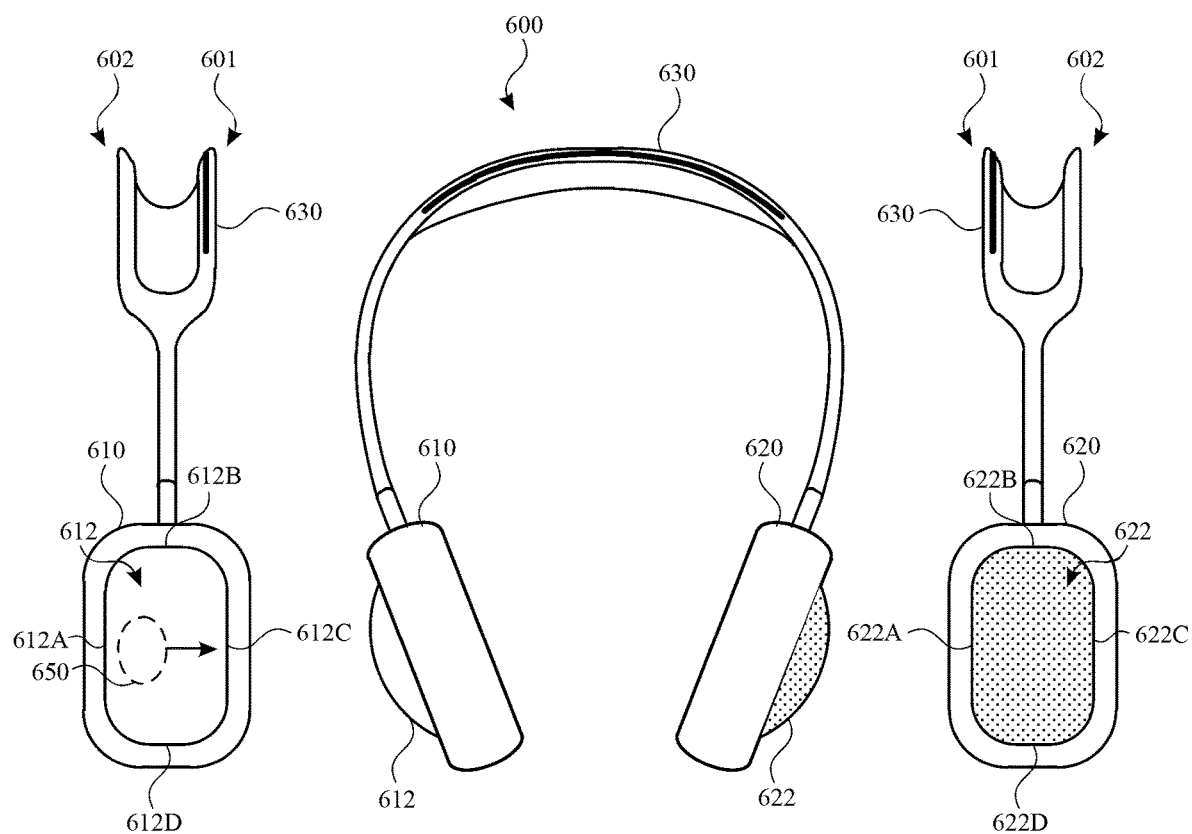
FIGS. 6A-6R illustrate exemplary techniques for processing gestures on a touch-sensitive surface using an electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
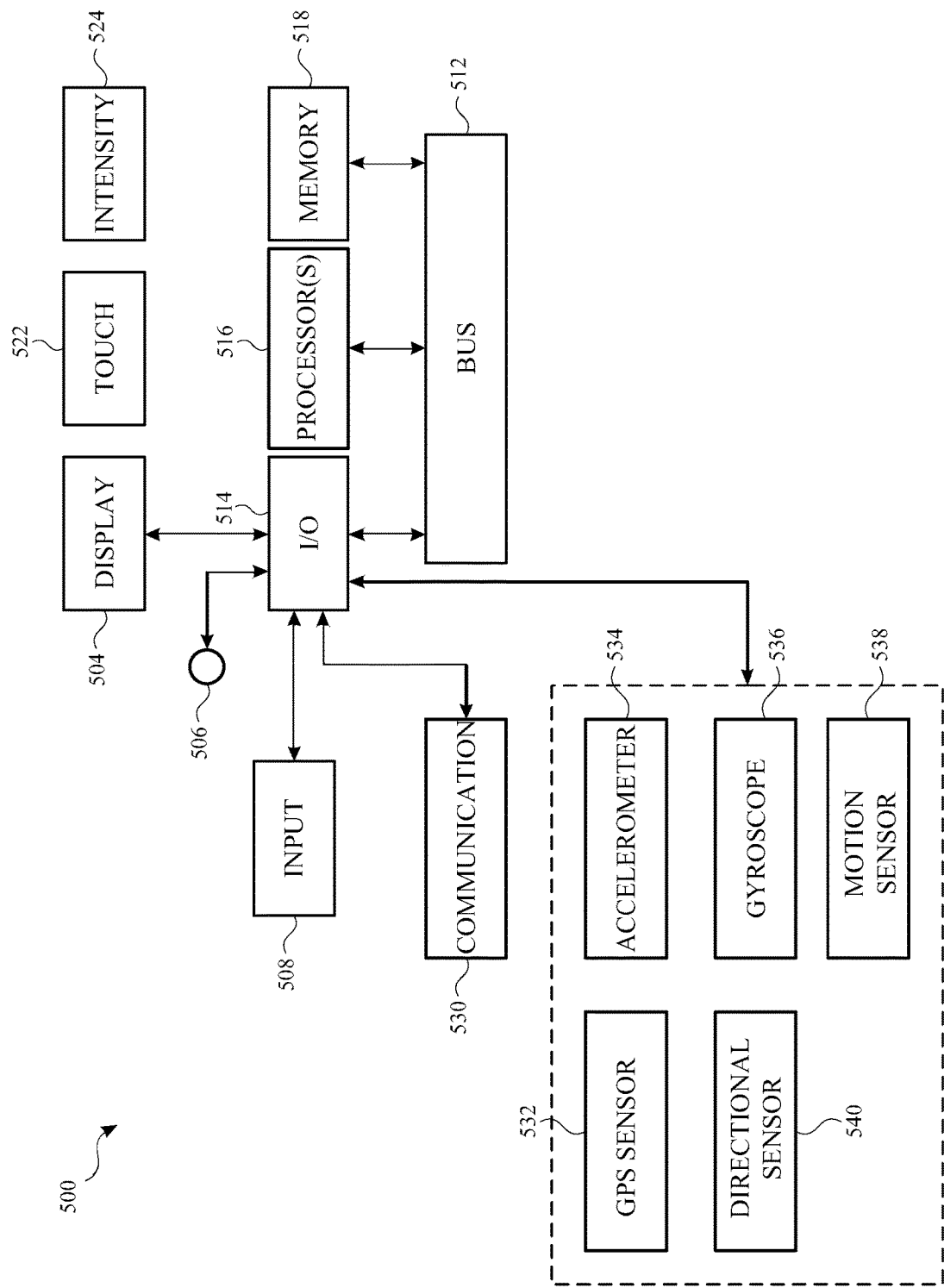
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
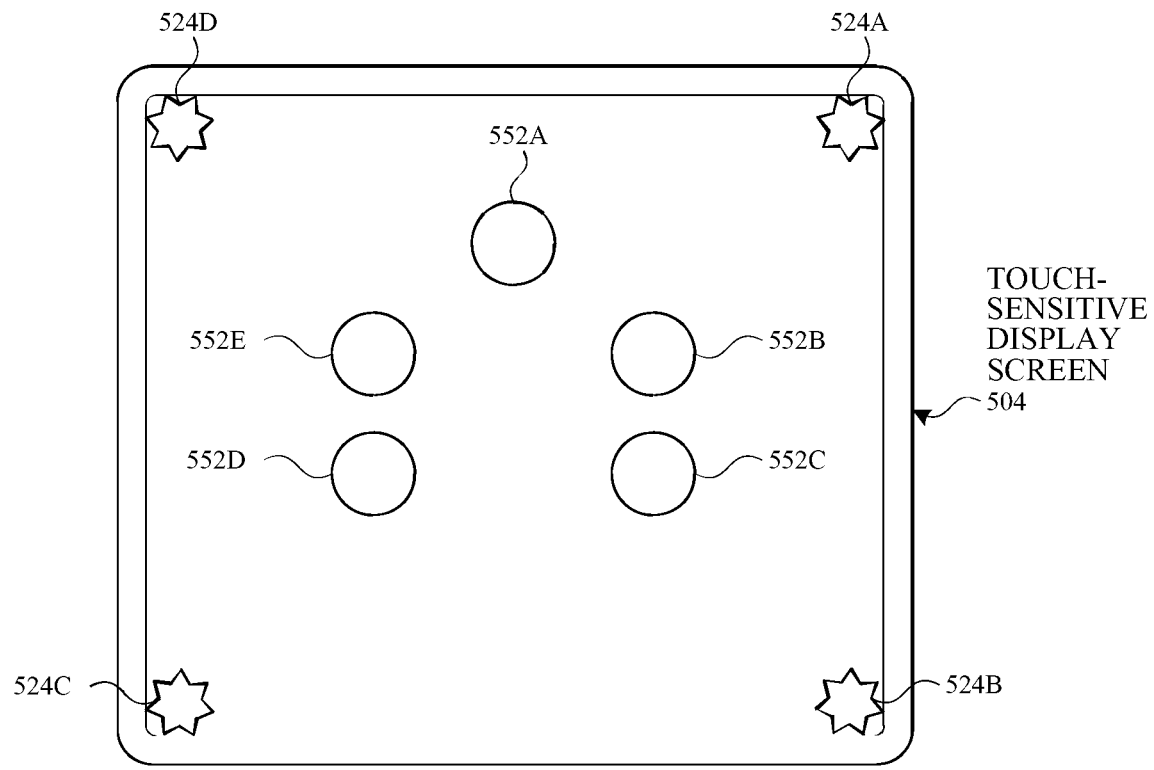
FIGS. 5C-5D illustrate exemplary components of a personal electronic device having a touch-sensitive display and intensity sensors in accordance with some embodiments.
Figure 5C:
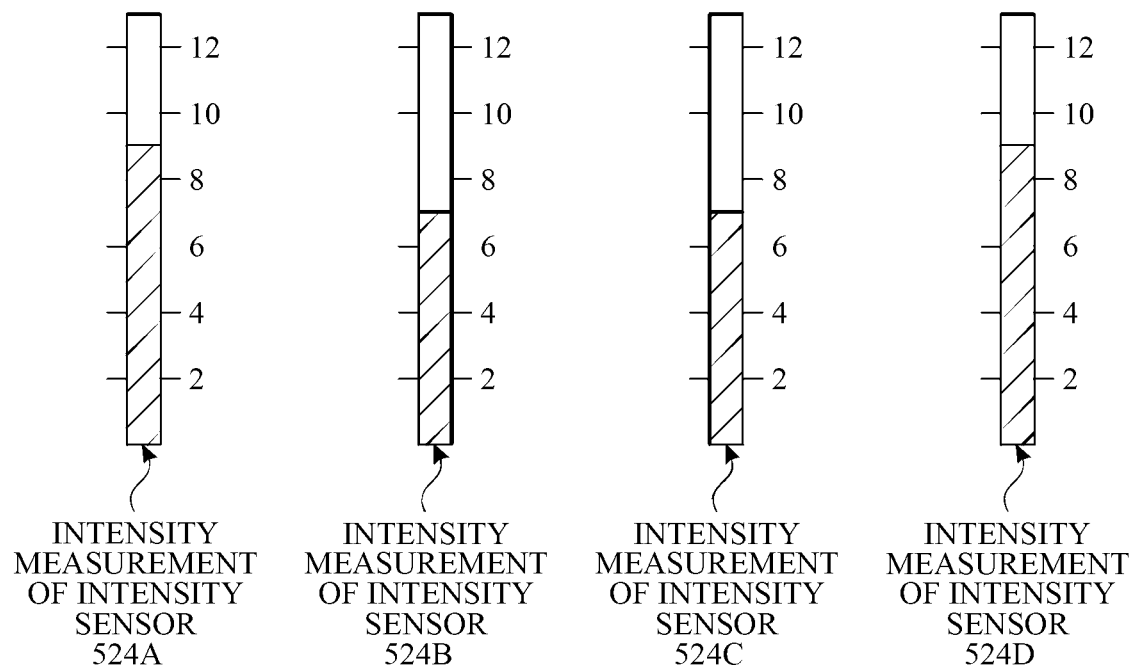
Figure 5D:
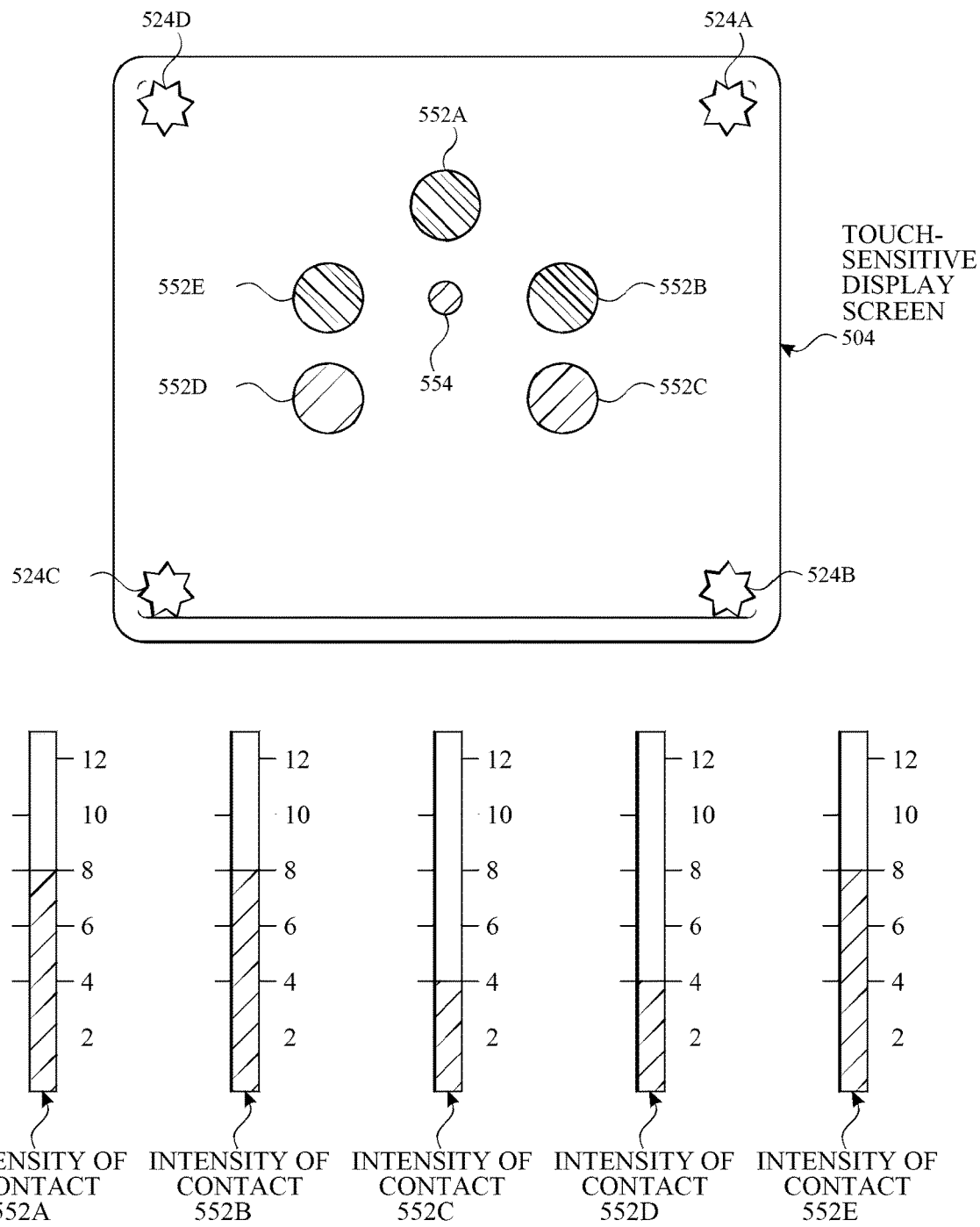

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and/Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
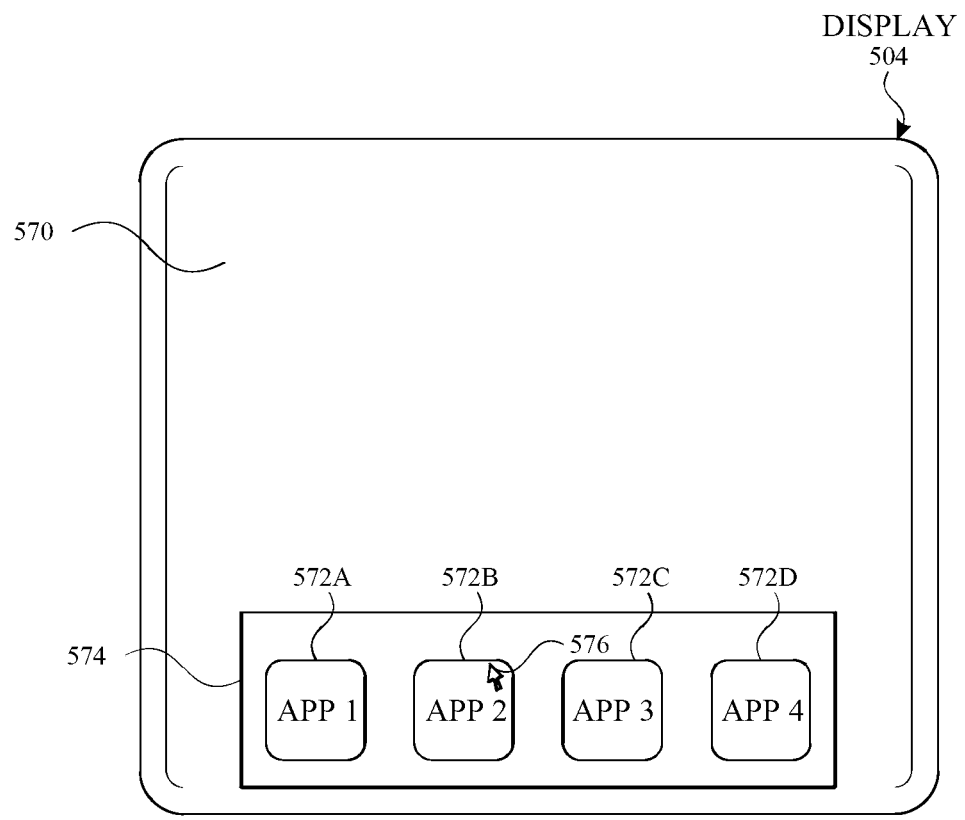
FIGS. 5E-5H illustrate exemplary components and user interfaces of a personal electronic device in accordance with some embodiments.
Figure 5E:
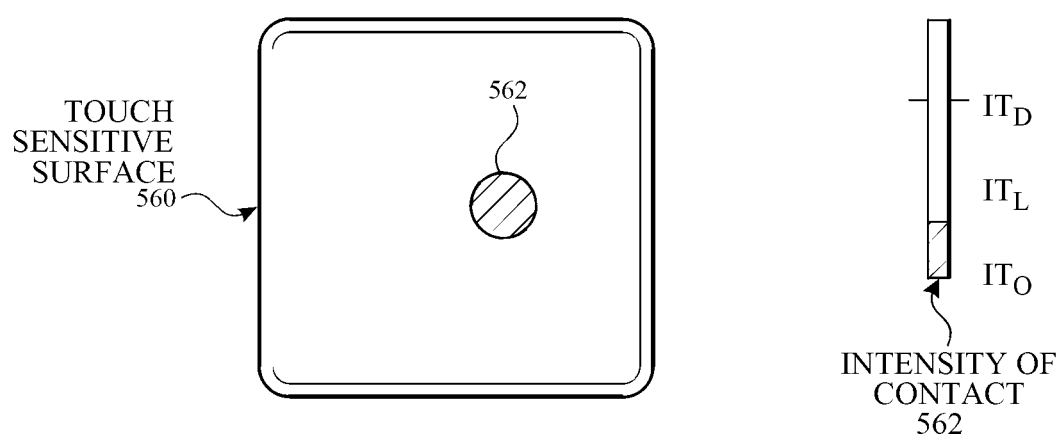
Figure 5F:
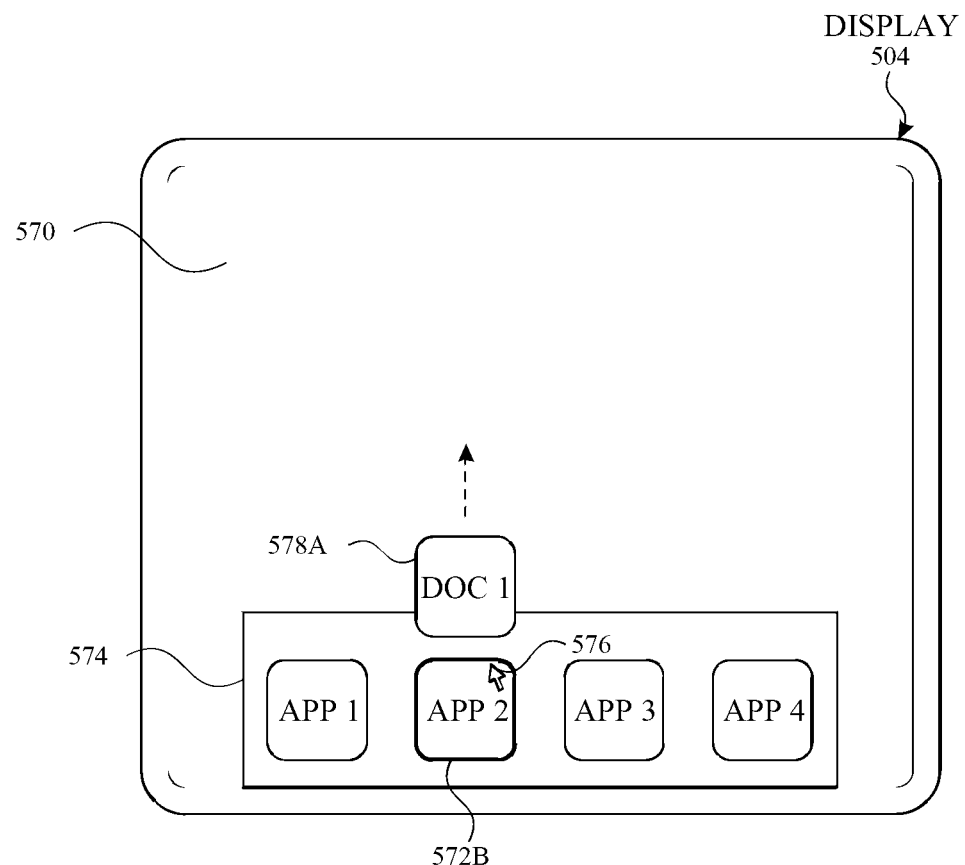
Figure 5F:
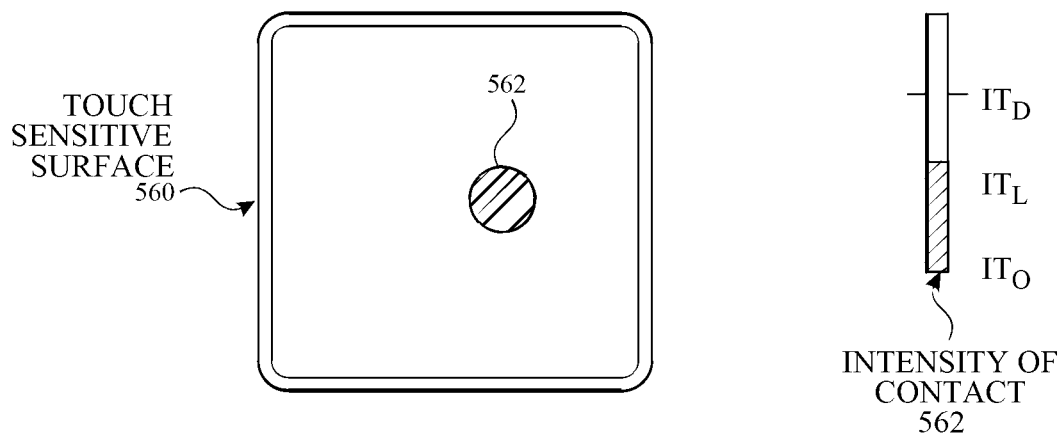
Figure 5G:
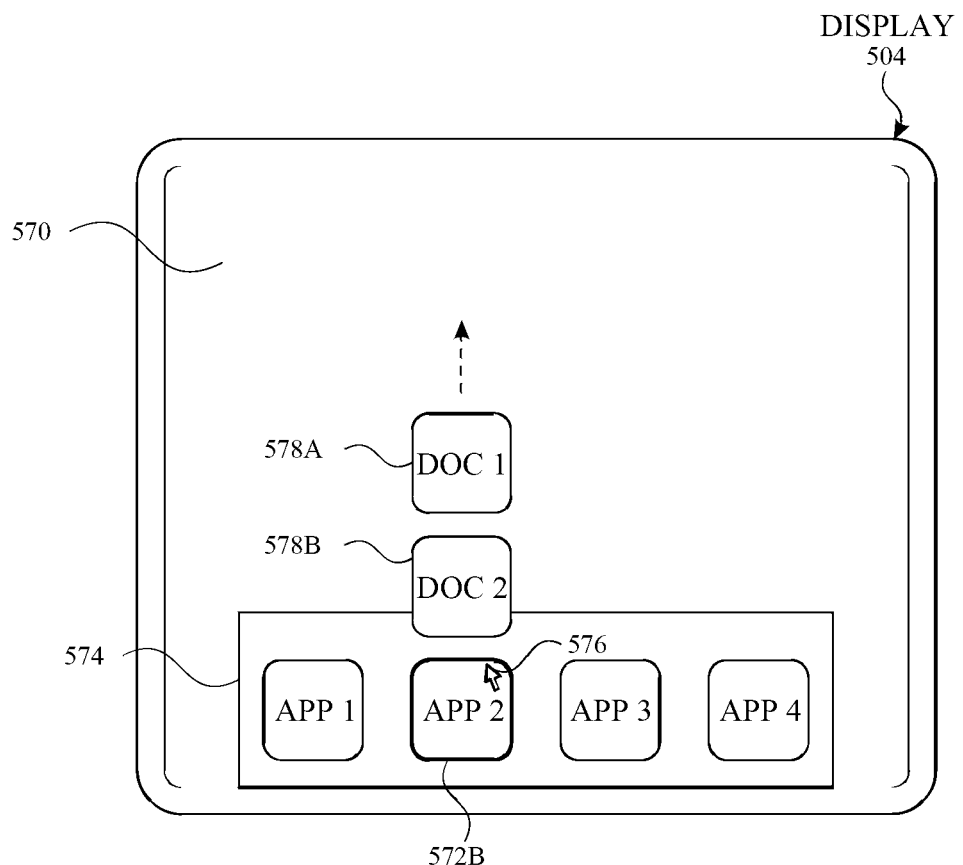
Figure 5G:
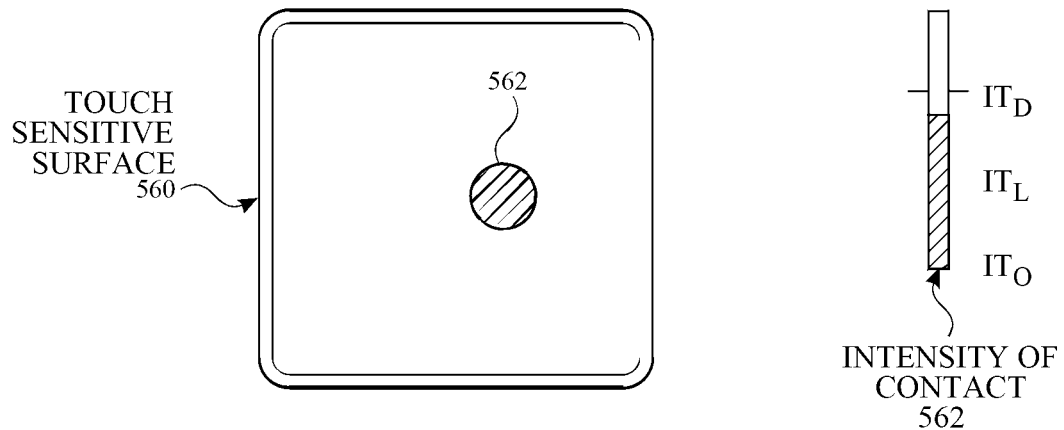
Figure 5H:
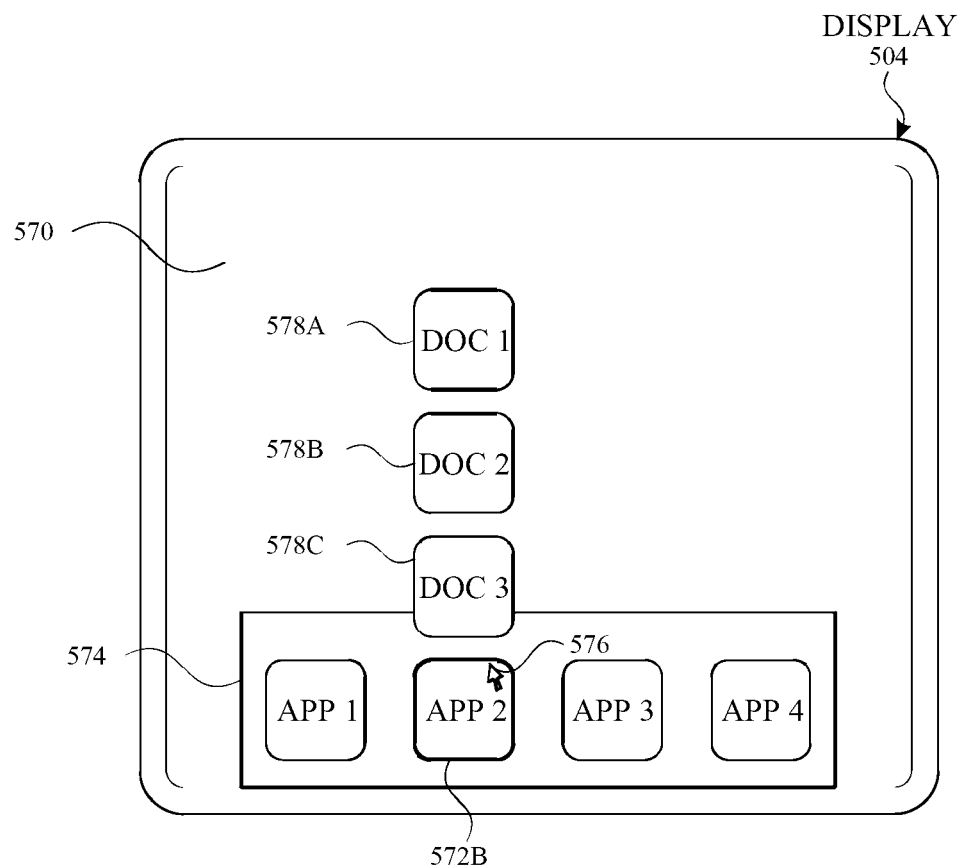
Figure 5H:
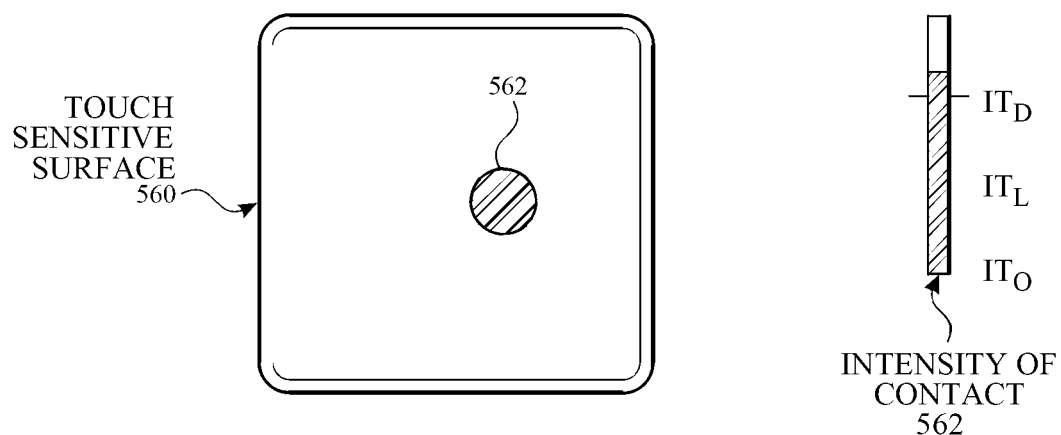

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT D"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT S"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500, described above, or device 600 described below.

FIGS. 6A-6R illustrate exemplary techniques for operating wireless headphones, in accordance with some embodiments. The user interfaces in these figures are used to illustrate the processes described below, including the processes in FIG. 7.

FIG. 6A illustrates a front view of exemplary headphones 600 having first ear cup 610, second ear cup 620, and overhead band 630. In some embodiments, headphones 600 include one or more features of devices 100, 300, or 500. Headphones 600 have a first side 601 and a second side 602. For the purposes of discussion, first side 601 is considered to be the front side of headphones 600, second side 602 is the back, and headband 630 is at the top. In FIGS. 6A-6R, a solid dark stripe visually distinguishes first side 601 from second side 602. When headphones 600 are worn by a user such that first ear cup 610 is on the user's right ear, second cup 620 is on the user's left ear, and headband 630 is on top of the user's head, then headphones 600 are considered to be upright and forward-facing, which is also referred to herein as the first device orientation.

In some embodiments, first ear cup 610 and/or second ear cup 620 include one or more sensors, such as imaging sensors that are able to image an ear of a user on which the ear cups are placed, for determining which ear a given ear cup is on. Based on output from the sensors, the orientation of the device can be determined (e.g., the first device orientation depicted in FIG. 6A (mentioned above) or the second, third, and fourth device orientations depicted in FIGS. 6B, 6C, and 6D, respectively (discussed below)). The determination about which ear a given cup are on is optionally made by headphones 600 themselves based on outputs from the imaging sensors. In some embodiments, the determination about which ear a given cup is on is made by an electronic device with which the headphones are in communication. In some embodiments, headphones 600 are in communication (e.g., wireless communication) with another electronic device, such as a smartphone, a tablet computer, a smartwatch, or any other electronic device. For example, headphones 600 are optionally in communication with the another electronic device via Bluetooth via which the headphones are able to play audio provided by the electronic device. In some embodiments, in addition to audio communication, the headphones and the another electronic device are able to communicate other information between them, such as headphone battery information, headphone orientation information, and information about touch inputs detected on the touch-sensitive surface of the headphones.

Referring again to FIG. 6A, the outer surface (e.g., the surface opposite the user's ear) of first ear cup 610 includes first touch-sensitive surface 612, and the outer surface of second ear cup 620 includes second touch-sensitive surface 622, which has been stippled in FIGS. 6A-6R to be visually distinguishable from first touch-sensitive surface 612. Each touch-sensitive surface has, independent of any frame of reference from which the touch-sensitive surface is being observed or monitored, one or more locations on its surface that correspond to one or more fixed coordinates on the touch-sensitive surface. As illustrated in FIG. 6A, touch-sensitive surfaces 612 and 622 have a rectangular shape with a first side, a second side (e.g., adjacent the first side), a third side (e.g., opposite the first side) and a fourth side (e.g., opposite the second side). In FIG. 6A, the sides of each touch-sensitive surface are labeled alphabetically, beginning with the left side and going clockwise, according to the view depicted in FIG. 6A. Thus, the first (e.g., left) side of first touch-sensitive surface 612 is 612A, the second (e.g., top) side is 612B, the third (e.g., right) side is 612C, and the fourth (e.g., bottom) side is 612D. Similarly, the first (e.g., left) side of second touch-sensitive surface 622 is 622A, the second (e.g., top) side is 622B, the third (e.g., right) side is 622C, and the fourth (e.g., bottom) side is 622D. Since first touch-sensitive surface 612 and second touch-sensitive surface 622 are on opposite outward-facing sides of ear cups 610 and 620, respectively, the left side 612A of first touch-sensitive surface 612 is oriented toward second side 602 (e.g., the back) of headphones 600, whereas the left side 622A of second touch-sensitive surface 622 is oriented toward first side 601 (e.g., the front) of headphones 600.

FIG. 6A also illustrates input 650 as a touch input on first touch-sensitive surface 612. Input 650 has a first input orientation with respect to first touch-sensitive surface 612. Specifically, input 650 is a swipe gesture going from side 612A toward opposite side 612C of first touch-sensitive surface 612. For the purposes of this disclosure, the orientation of the input (referred to herein as the input orientation) is relative to the touch-sensitive surfaces 612 and/or 622, and is distinct from the orientation of the headphones 600 (referred to herein as the device orientation). From the perspective of a user wearing headphones 600 in the first device orientation, input 650 is a back-to-front, or forward, horizontal swipe on the user's right side.

In response to input 650 and in accordance with a determination that headphones 600 are oriented in the first device orientation, headphones 600 perform a first action. In some embodiments, the first action is skipping forward to the next music track in a playlist from a currently-playing music track in the playlist. Other exemplary actions include play, pause, volume up, volume down, previous song, fast forward, rewind, and enter ambient sound transparency mode (discussed in greater detail below).

Figure 6B:
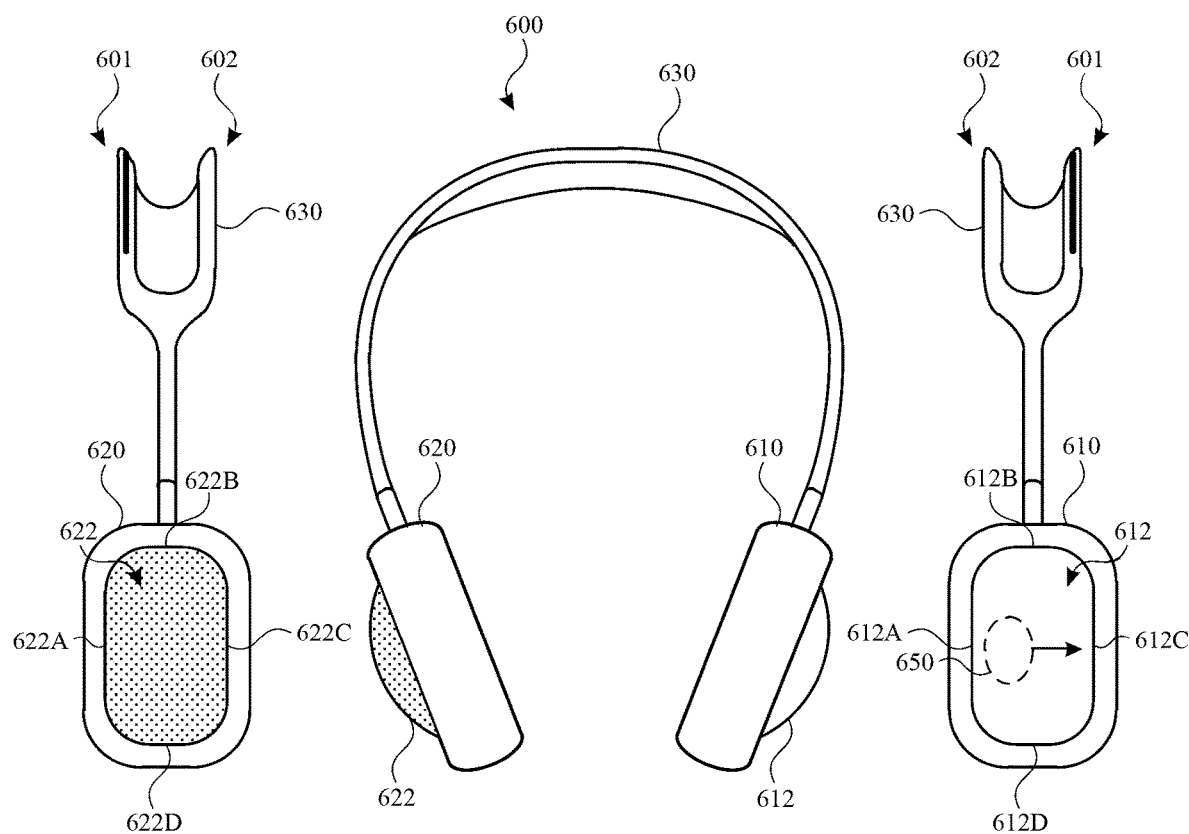

In the illustrated embodiment, headphones 600 and/or ear cups 610 and 620 are symmetrical, such that headphones 600 can be worn by a user in multiple orientations (e.g., the first ear cup on the user's left ear, and the second ear cup on the user's right ear; or, the first ear cup on the user's right ear, and the second ear cup on the user's left ear). FIG. 6B depicts headphones 600 in a second device orientation. Compared to the first device orientation depicted in FIG. 6A, the second device orientation is rotated 180 degrees around a vertical axis such that first ear cup 610 is on the user's left ear and second ear cup 620 is on the user's right ear. Accordingly, in the second device orientation, the first (e.g., front) side 601 of headphones 600 faces toward the back of the user's head, and second side 602 is facing forward. The headband 630 remains above the user's head. Thus, from the user's perspective, headphones 600 are upright and backward-facing.

The same input, input 650, is also depicted in FIG. 6B. Again, input 650 is a swipe gesture on first touch-sensitive surface 612 going from side 612A toward opposite side 612C. However, since headphones 600 have been turned backwards, from the perspective of the user, input 650 corresponds to a front-to-back, or backward, horizontal swipe on the user's left side. Thus, compared to the first device orientation, input 650 is on the user's opposite side and in the opposite direction. In response to input 650 and in accordance with a determination that headphones 600 are oriented in the second device orientation, headphones 600 perform a second action. In some embodiments, since headphones 650 are in a different device orientation, the second action is different than the first action performed when headphones 600 are in the first device orientation. That is, although the input is the same from the perspective of the touch-sensitive surface of headphones 600, the response is different due to headphones 600 being in a different device orientation. In some embodiments, headphones 600 are configured to perform opposite actions in response to gestures in opposite directions from the perspective of a user, regardless of the side of the user on which the input is received or in which device orientation headphones 600 are worn. In such embodiments, the action performed in response to the combination of input orientation and device orientation depicted in FIG. 6B is the opposite of the response associated with the combination of input orientation and device orientation depicted in FIG. 6A (e.g., the second action is skipping backward to a previous track in a playlist from a currently-playing music track in the playlist or returning to the beginning of the currently-playing track).

Figure 6C:
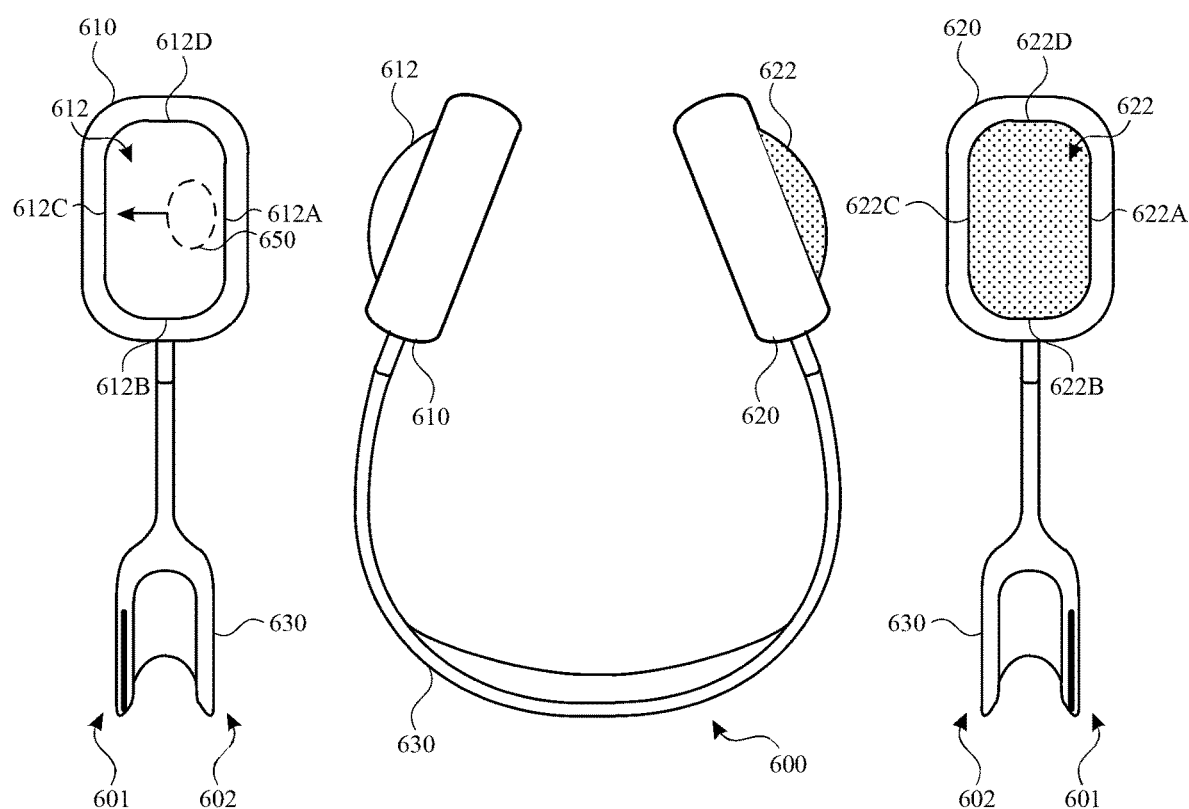

FIG. 6C depicts headphones 600 in a third device orientation in which first ear cup 610 is on the user's right ear, second ear cup 620 is on the user's left ear, and the top of headphones 600 is pointed downward. The first side 601 is facing toward the back of the user's head, and second side 602 is facing forward. Thus, from the user's perspective, headphones 600 are upside down and backward-facing. The same input 650 (a swipe gesture on first touch-sensitive surface 612 going from side 612A toward opposite side 612C) is depicted again in FIG. 6C. Now, since headphones 600 are upside down and facing backwards, from the perspective of the user, input 650 corresponds to a front-to-back, or backward, horizontal swipe on the user's right side. Thus, compared to the first device orientation, input 650 is on the user's same side, but in the opposite direction. And compared to the second device orientation, input 650 is on the user's opposite side, but in the same direction.

In response to input 650 and in accordance with a determination that headphones 600 are oriented in the third device orientation, headphones 600 perform a third action. In some embodiments, the third action is different than the response to input 650 when headphones 600 are in the first device orientation and/or different than the response to input 650 when headphones 600 are in the second device orientation. In some embodiments, headphones 600 are configured to perform an action based on the direction of the input with respect to the user, regardless of the side of the user on which the input is received or in which device orientation headphones 600 are worn. In such embodiments, the action performed in response to the combination of input orientation and device orientation depicted in FIG. 6C is the same as the response associated with the combination of input orientation and device orientation depicted in FIG. 6B (e.g., the third action is skipping to a previous track on an audio player or returning to the beginning of a current track), since both configurations correspond to a backward, horizontal swipe from the perspective of the user. Furthermore, in embodiments in which headphones 600 are configured to perform opposite actions in response to gestures in opposite directions (from the perspective of a user) whether or not the gestures are on the user's same side, the action performed in response to the combination of input orientation and device orientation depicted in FIG. 6C is the opposite of the response associated with the combination of input orientation and device orientation depicted in FIG. 6A (e.g., the third action is skipping to a previous track on an audio player or returning to the beginning of a current track).

Figure 6D:
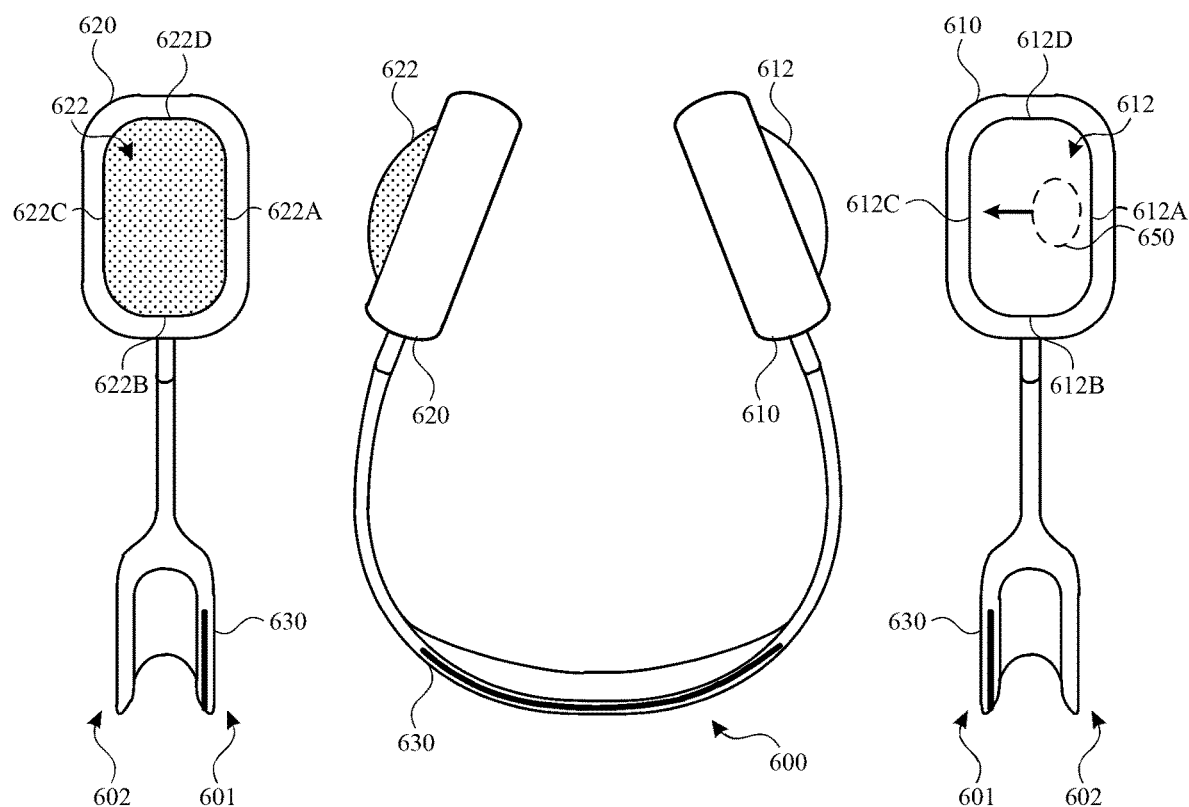

FIG. 6D depicts headphones 600 in a fourth device orientation in which first ear cup 610 is on the user's left ear, second ear cup 620 is on the user's right ear, and the top of headphones 600 is pointed downward. The first side 601 is facing toward the front of the user's head, and second side 602 is facing forward. Thus, from the user's perspective, headphones 600 are upside down and forward-facing. The same input 650 (a swipe gesture on first touch-sensitive surface 612 going from side 612A toward opposite side 612C) is depicted again in FIG. 6D. Now, since headphones 600 are upside down and facing forwards, from the perspective of the user, input 650 corresponds to a back-to-front, or forward, horizontal swipe on the user's left side. Thus, compared to the first device orientation, input 650 is on the user's opposite side, but in the same direction; compared to the second device orientation, input 650 is on the user's same side, but in the opposite direction; and compared to the third device orientation, input 650 is on the user's opposite side and in the opposite direction.

In response to input 650 and in accordance with a determination that headphones 600 are oriented in the fourth device orientation, headphones 600 perform a fourth action. In some embodiments, the fourth action is different than the response to input 650 when headphones 600 are in the first device orientation, the second device orientation, and/or the third device orientation. In embodiments in which headphones 600 are configured to perform an action based on the direction of a swipe gesture with respect to the user, regardless of the side of the user on which the input is received or in which device orientation headphones 600 are worn, the action performed in response to the combination of input orientation and device orientation depicted in FIG. 6D is the same as the response associated with the combination of input orientation and device orientation depicted in FIG. 6A (e.g., the fourth action is skipping to a next track on an audio player), since both configurations correspond to a forward, horizontal swipe from the perspective of the user. In embodiments in which headphones 600 are configured to perform opposite actions in response inputs of opposite direction (from the perspective of a user) on the user's same side, the action performed in response to the combination of input orientation and device orientation depicted in FIG. 6D is the opposite of the response associated with the combinations of input orientation and device orientation depicted in FIG. 6B. Further, if the headphones 600 are configured to perform opposite actions in response inputs of opposite direction (from the perspective of a user) regardless of the side of the user on which the input is received, the action performed in response to the combination of input orientation and device orientation depicted in FIG. 6D is also the opposite of the response associated with the combinations of input orientation and device orientation depicted in and FIG. 6C.

Turning now to FIGS. 6E-6H, the response of headphones 600 to an input having the first input orientation, but on second touch-sensitive surface 622 instead of first touch-sensitive surface 612, is described. Input 652 depicted in FIGS. 6E-6H is different than input 650 in that input 652 is received on second touch-sensitive surface 622, whereas input 650 is received on first touch-sensitive surface 612. However, input 652 is similar to input 650 in the sense that it has the same input orientation with respect to second touch-sensitive surface 622 as the input orientation that input 650 has with respect to first touch-sensitive surface 612. More specifically, input 652 is a swipe gesture going from side 622A toward opposite side 622C of second touch-sensitive surface 622, and thus is a left-to-right horizontal swipe with respect to second touch-sensitive surface 622. In FIGS. 6E-6H, input 652 is the same (with respect to second touch-sensitive surface 622), while headphones 600 are depicted in the first device orientation (FIG. 6E), second device orientation (FIG. 6F), third device orientation (FIG. 6G), and fourth device orientation (FIG. 6H), respectively.

Figure 6E:
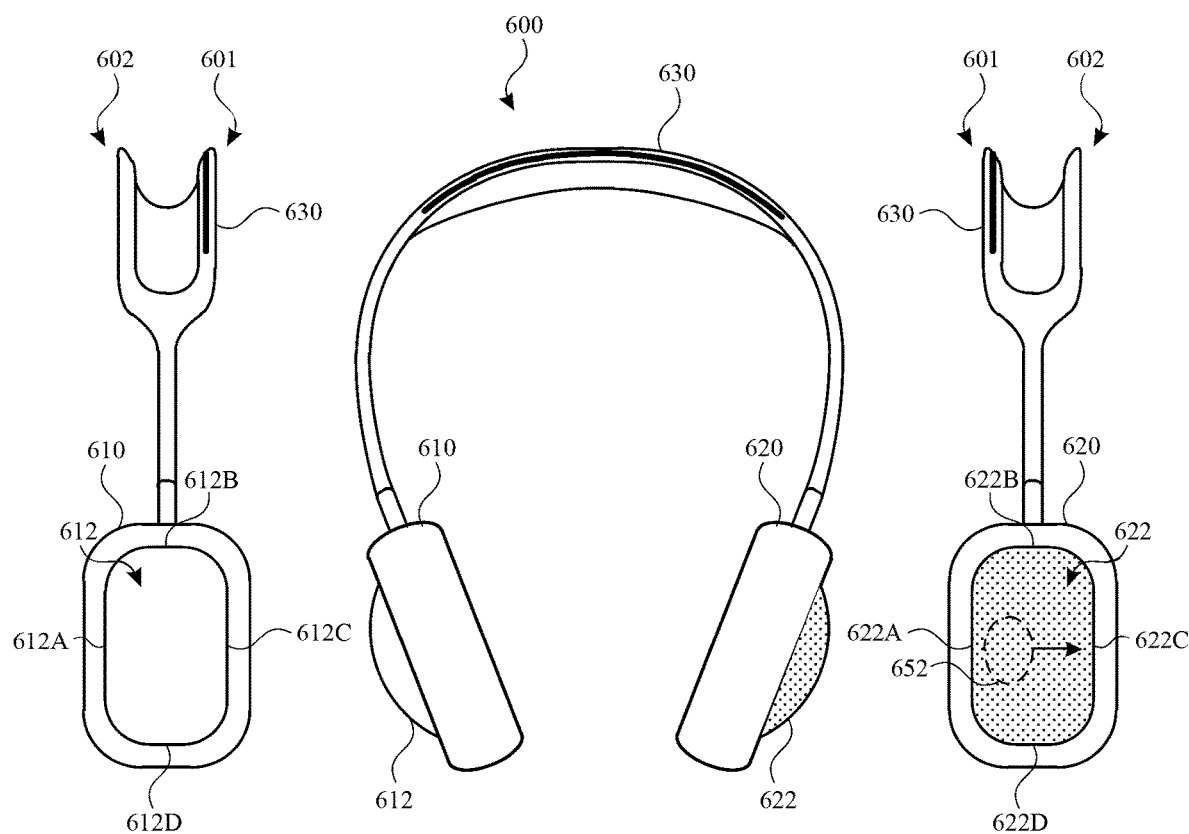
Figure 6F:
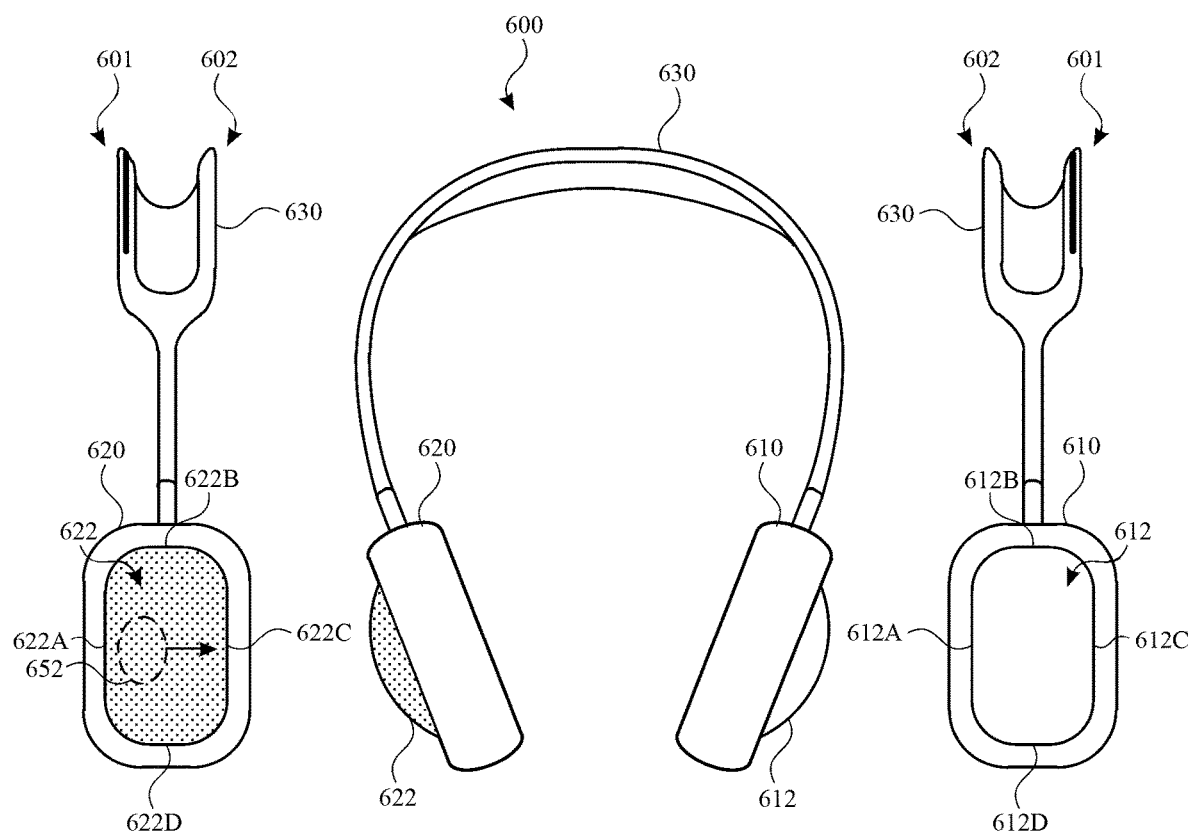
Figure 6G:
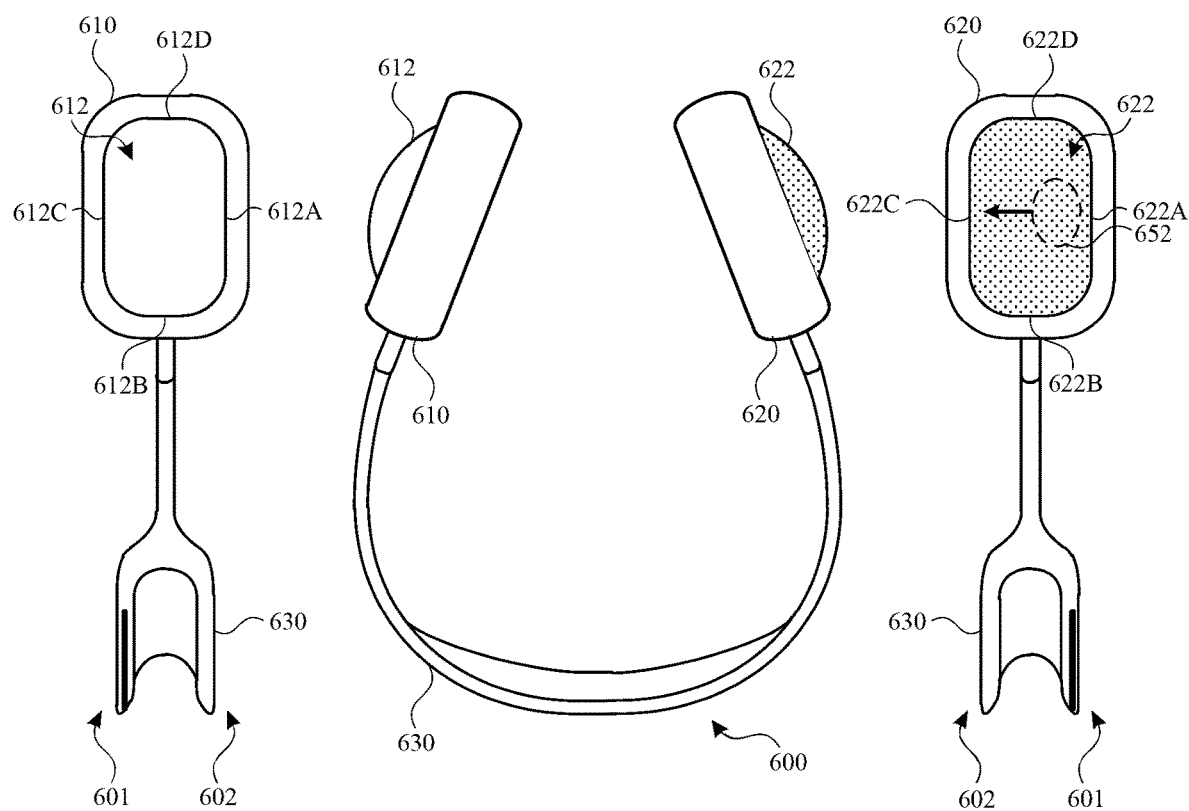
Figure 6H:
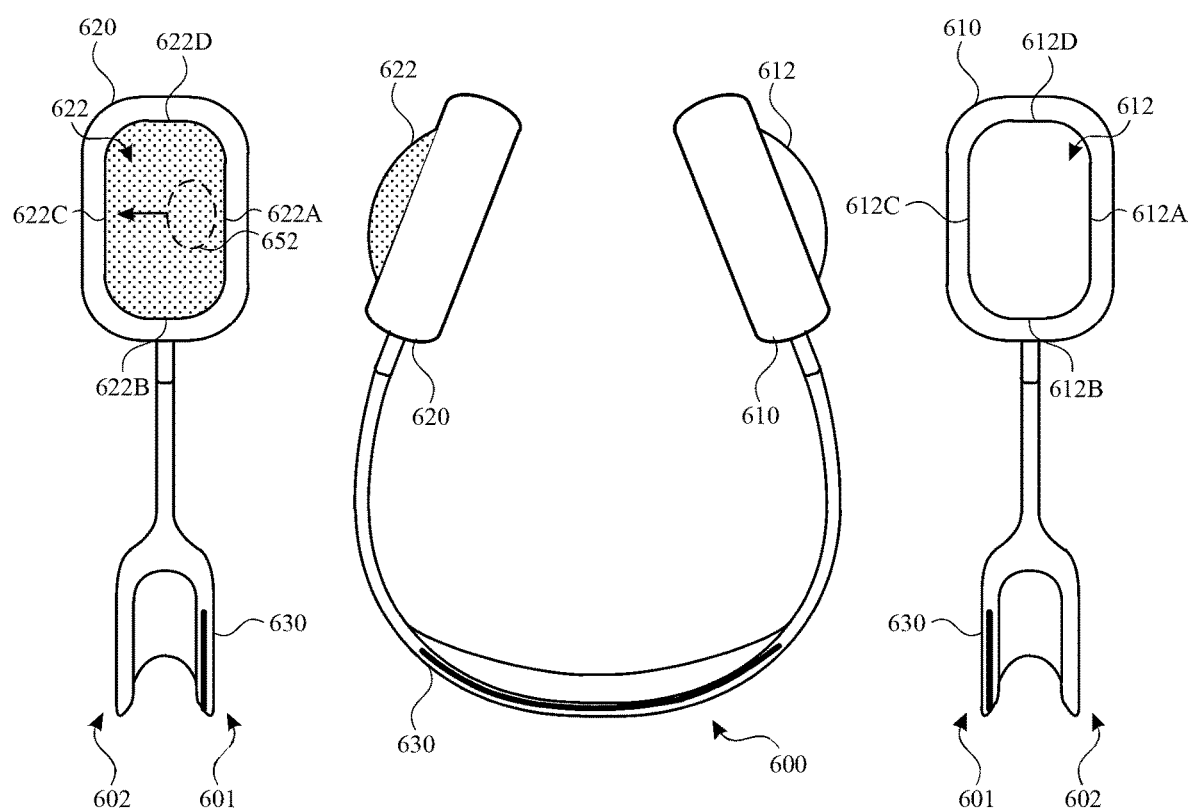

Notably, from the perspective of the user, the combination of input 652 and first device orientation depicted in FIG. 6E is the same as the combination of input 650 and second device orientation depicted in FIG. 6B. In some embodiments, since the inputs are the same from the perspective of the user, headphones 600 perform the same action in response to the combination of input 652 and first device orientation as to the combination of input 650 and second device orientation (e.g., headphones 600 perform the second action in both cases). Similarly, headphones 600 perform the same action in response to the combination of input 652 and second device orientation (FIG. 6F) as to the combination of input 650 and first device orientation (FIG. 6A) (e.g., headphones 600 perform the first action in both cases); headphones 600 perform the same action in response to the combination of input 652 and third device orientation (FIG. 6G) as to the combination of input 650 and fourth device orientation (FIG. 6D) (e.g., headphones 600 perform the fourth action in both cases); and headphones 600 perform the same action in response to the combination of input 652 and fourth device orientation (FIG. 6H) as to the combination of input 650 and third device orientation (FIG. 6C) (e.g., headphones 600 perform the third action in both cases).

In some embodiments, for a given input orientation and device orientation, headphones 600 perform different actions depending on which touch-sensitive surface the input is received (e.g., headphones 600 perform different actions in response to the configurations depicted in FIG. 6A and FIG. 6E). In some embodiments, for a given input from the perspective of the user wearing headphones 600, headphones 600 perform different actions depending on which touch-sensitive surface the input is received (e.g., headphones 600 perform different actions in response to the configurations depicted in FIG. 6A and FIG. 6F).

Turning now to FIGS. 6I-6L, the response of headphones 600 to an input having a second input orientation is described. Input 654 depicted in FIGS. 6I-6L is a swipe gesture on first touch-sensitive surface 612 going from side 612D toward opposite side 612B, and thus is a bottom-to-top, or upward, vertical swipe with respect to first touch-sensitive surface 612. In FIGS. 6I-6L, input 654 is the same (with respect to first touch-sensitive surface 612), while headphones 600 are depicted in the first device orientation (FIG. 6I), second device orientation (FIG. 6J), third device orientation (FIG. 6K), and fourth device orientation (FIG. 6L), respectively. Headphones 600 perform fifth action, sixth action, seventh action, and eighth action in response to the combinations of input 654 and first device orientation (upward swipe on the user's right ear), input 654 and second device orientation (upward swipe on the user's left ear), input 654 and third device orientation (downward swipe on the user's right ear), and input 654 and fourth device orientation (downward swipe on the user's left ear), respectively. In some embodiments, fifth action, sixth action, seventh action, and eighth action are all different from each other. In embodiments in which headphones 600 are configured to produce a response based on the direction of the swipe with respect to the user, regardless of the side on which the input is received, the fifth and sixth actions are the same (e.g., increasing a volume level of headphones 600), and the seventh and eighth actions are the same (e.g., decreasing the volume level of headphones 600).

Turning now to FIGS. 6M-6P, the response of headphones 600 to an input having the second input orientation, but on second touch-sensitive surface 622 instead of first touch-sensitive surface 612, is described. Input 656 depicted in FIGS. 6M-6P is different than input 654 in that input 656 is received on second touch-sensitive surface 622, whereas input 654 is received on first touch-sensitive surface 612. However, input 656 is similar to input 654 in the sense that it has the same input orientation with respect to second touch-sensitive surface 622 as the input orientation that input 654 has with respect to first touch-sensitive surface 612. More specifically, input 656 is a swipe gesture going from side 622D toward opposite side 622B of second touch-sensitive surface 622, and thus is a bottom-to-top vertical swipe with respect to second touch-sensitive surface 622. In FIGS. 6M-6P, input 656 is the same (with respect to second touch-sensitive surface 622), while headphones 600 are depicted in the first device orientation (FIG. 6M), second device orientation (FIG. 6N), third device orientation (FIG. 6O), and fourth device orientation (FIG. 6P), respectively.

Figure 6I:
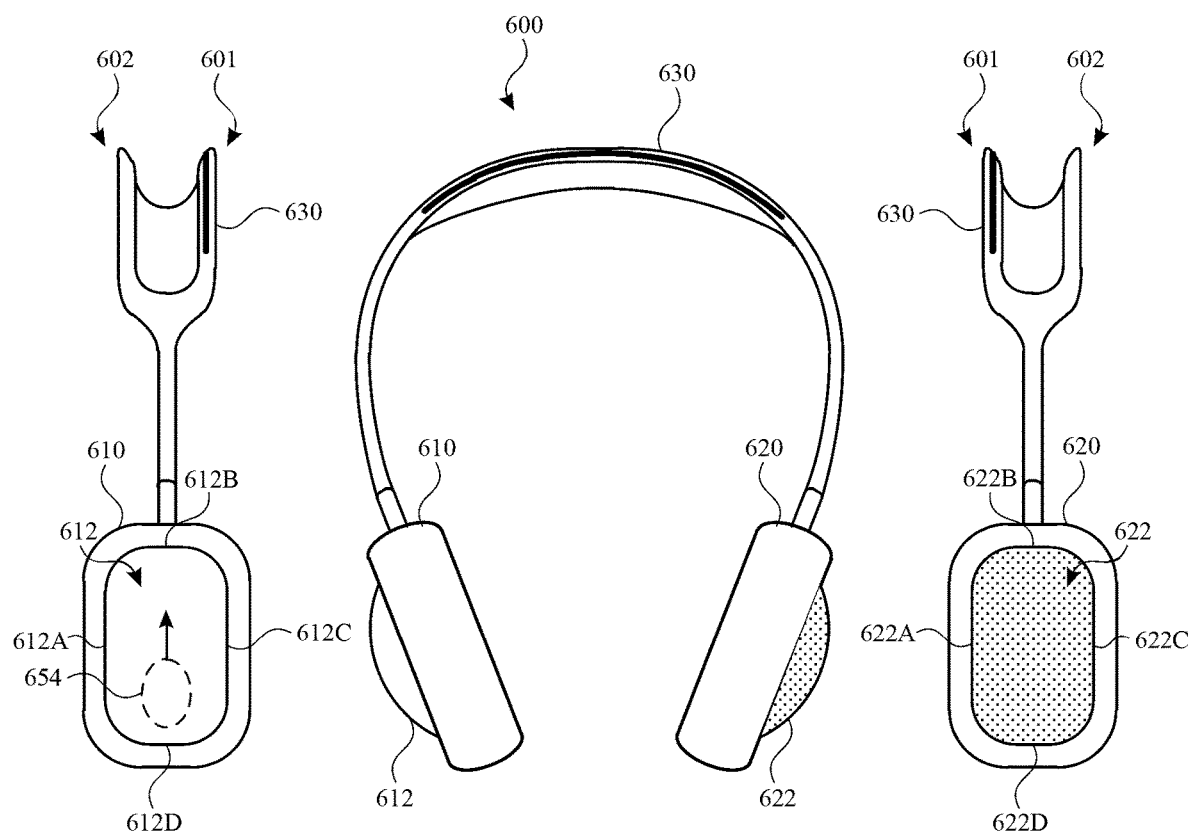
Figure 6J:
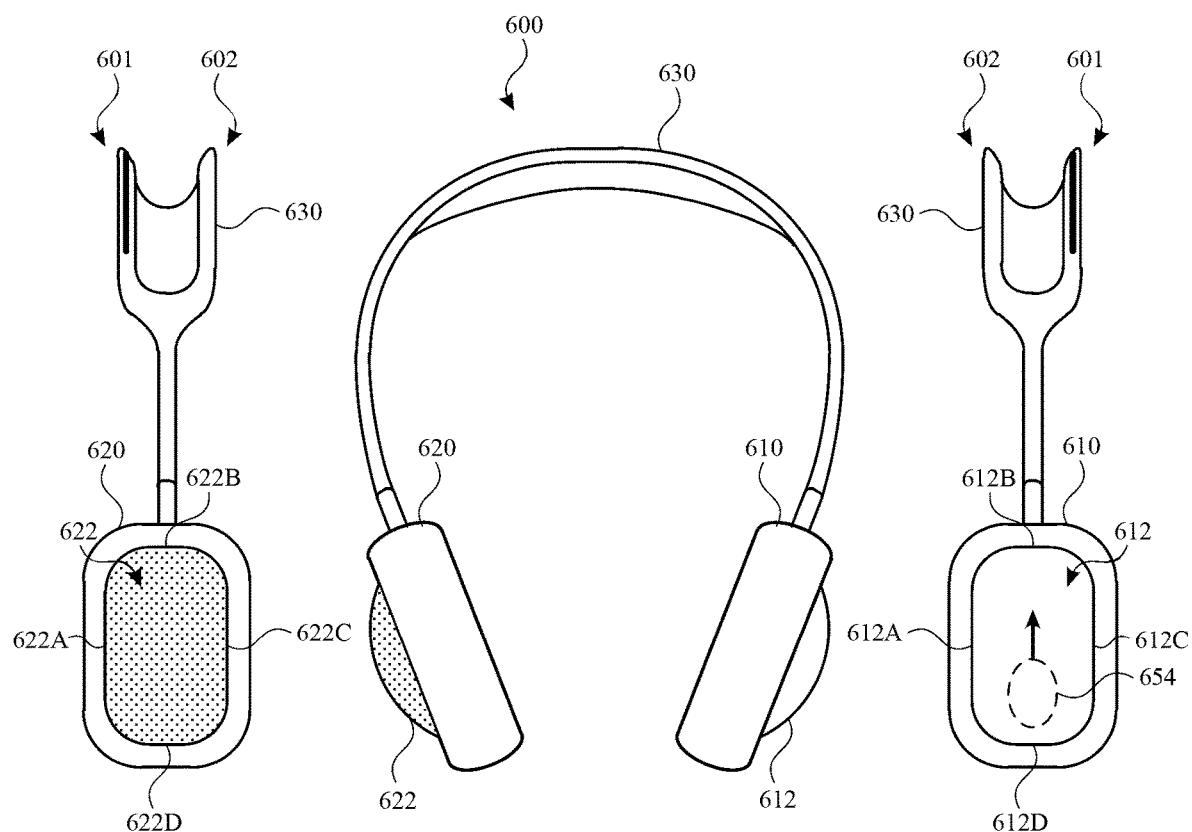
Figure 6K:
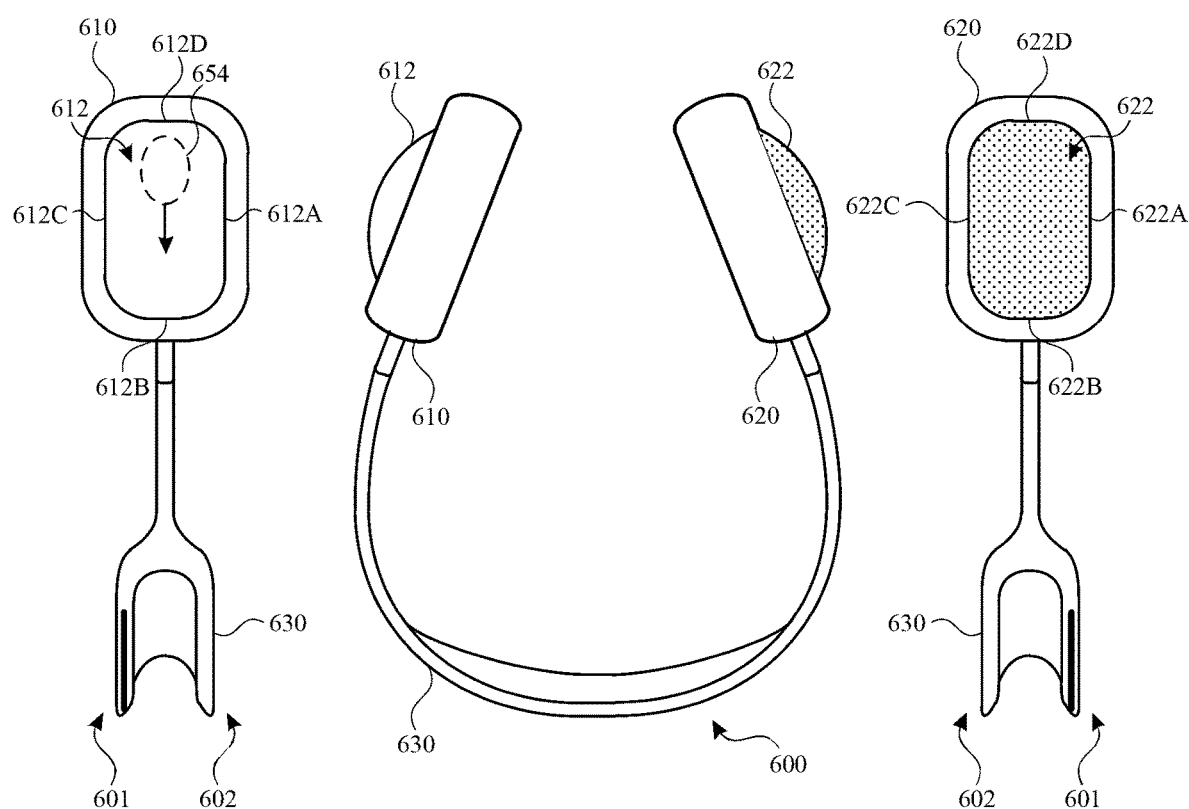
Figure 6L:
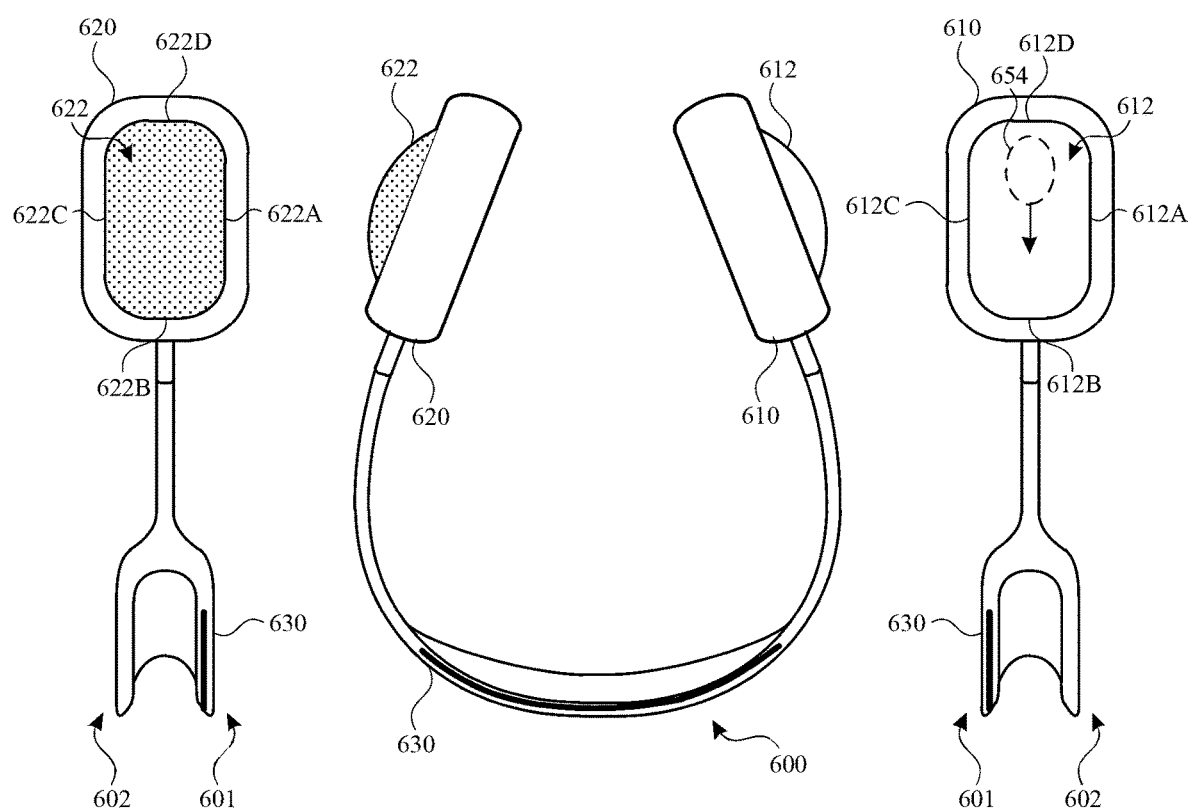
Figure 6M:
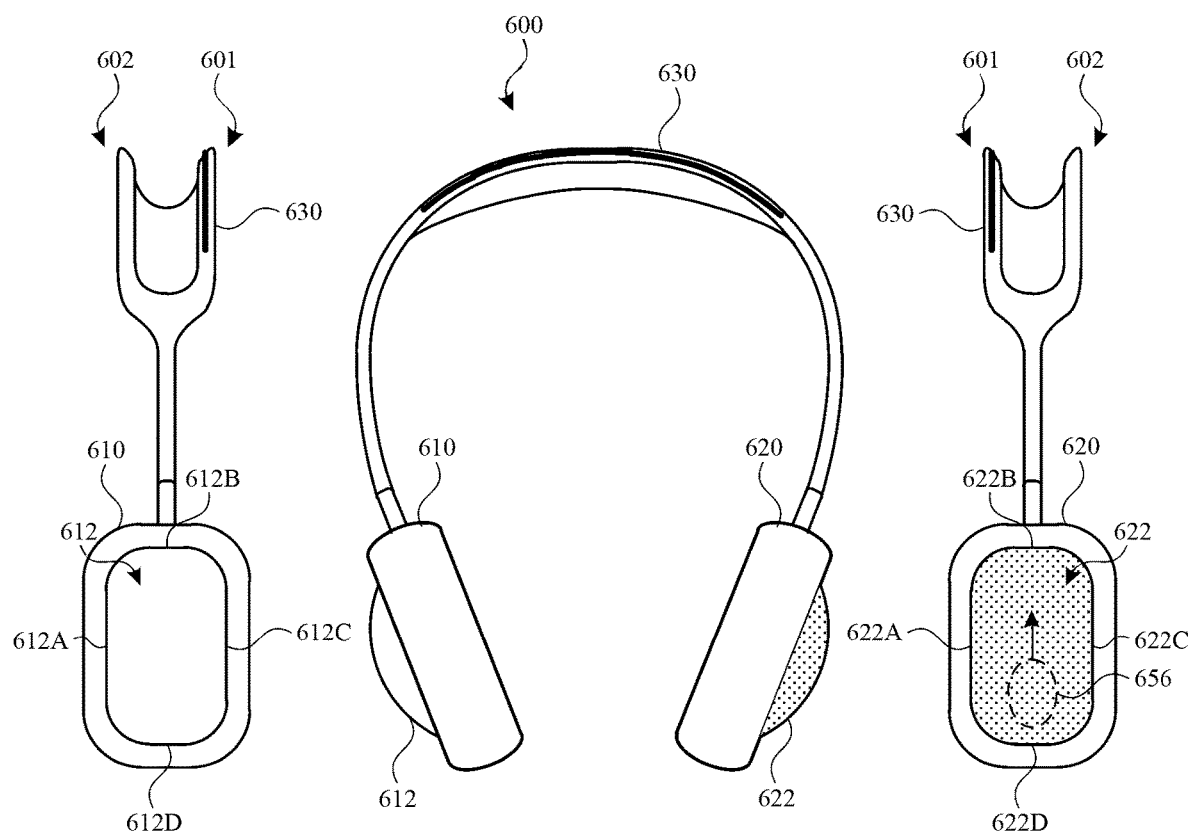
Figure 6N:
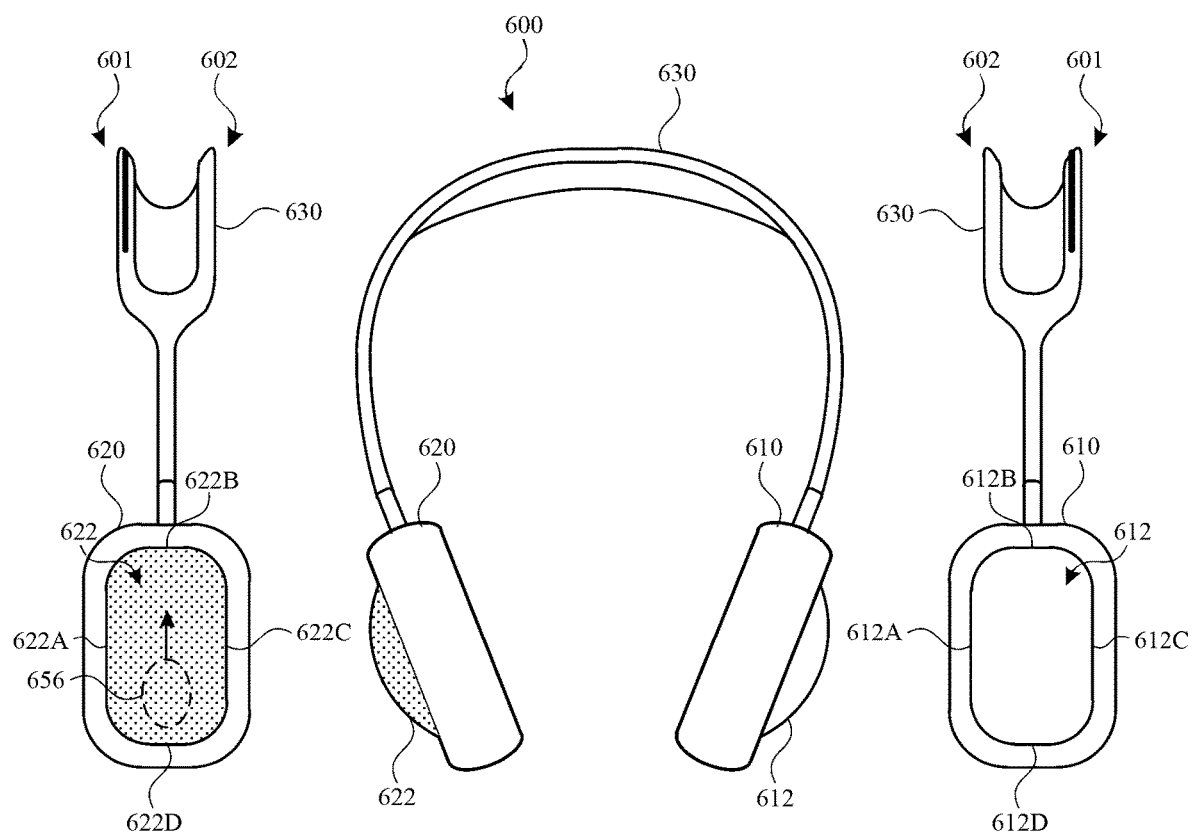
Figure 6O:
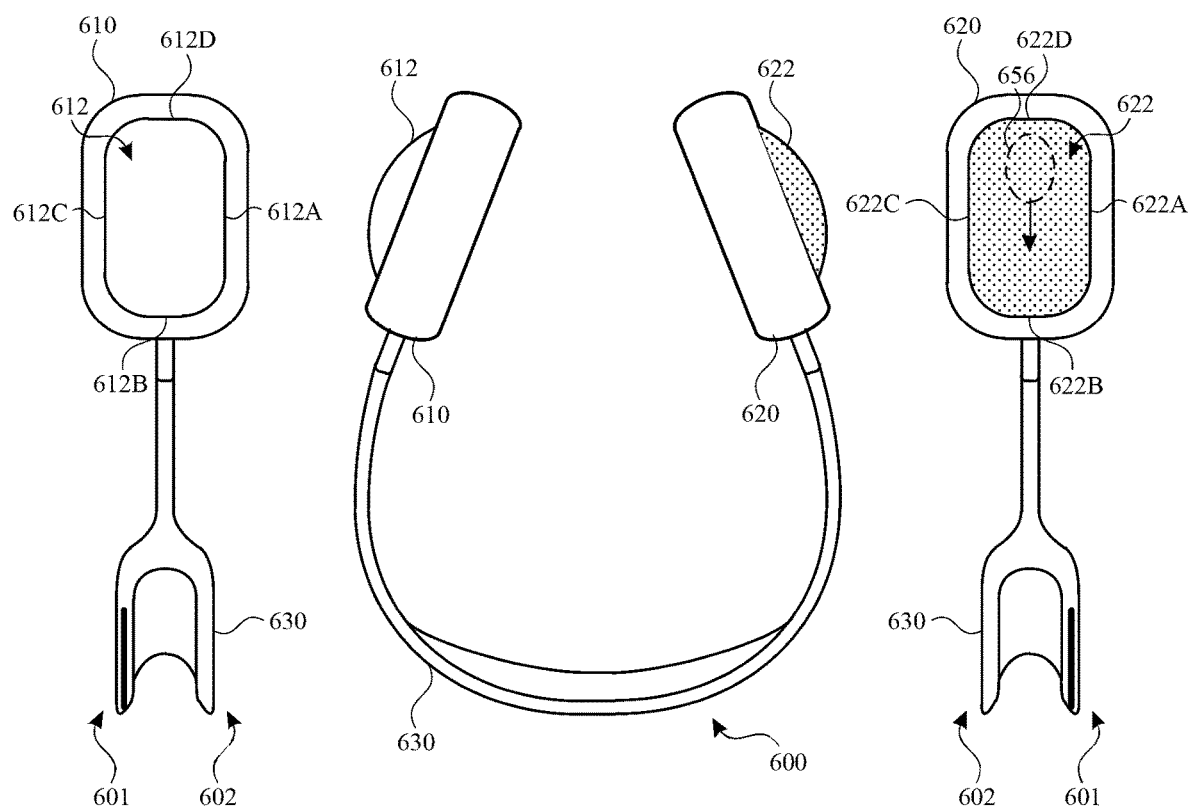
Figure 6P:
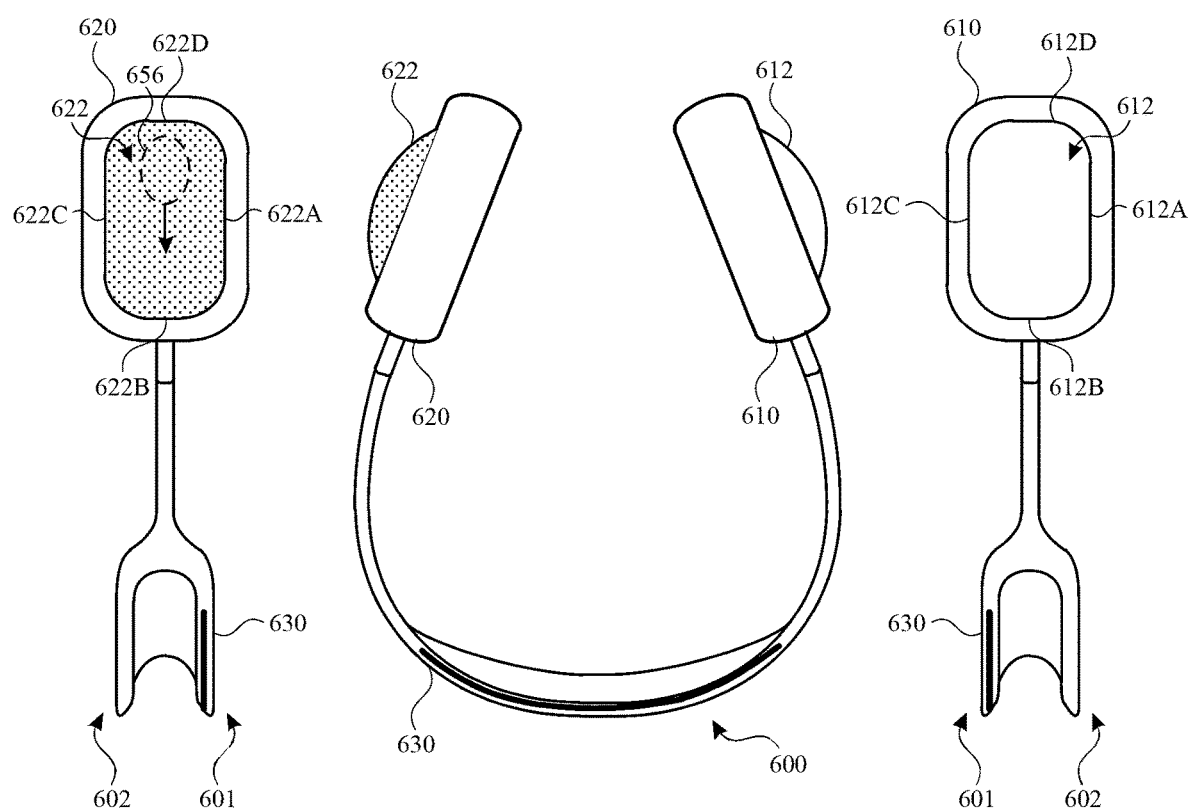

From the perspective of the user, the combination of input 656 and first device orientation depicted in FIG. 6M is the same as the combination of input 654 and second device orientation depicted in FIG. 6J. In some embodiments, since the inputs are the same from the perspective of the user, headphones 600 perform the same action in response to the combination of input 656 and first device orientation as to the combination of input 654 and second device orientation (e.g., headphones 600 perform the sixth action in both cases). Similarly, headphones 600 perform the same action in response to the combination of input 656 and second device orientation (FIG. 6N) as to the combination of input 654 and first device orientation (FIG. 6I) (e.g., headphones 600 perform the fifth action in both cases); headphones 600 perform the same action in response to the combination of input 656 and third device orientation (FIG. 6O) as to the combination of input 654 and fourth device orientation (FIG. 6L) (e.g., headphones 600 perform the eighth action in both cases); and headphones 600 perform the same action in response to the combination of input 656 and fourth device orientation (FIG. 6P) as to the combination of input 654 and third device orientation (FIG. 6K) (e.g., headphones 600 perform the seventh action in both cases).

As mentioned above, in some embodiments, for a given input orientation and device orientation, headphones 600 perform different actions depending on which touch-sensitive surface the input is received (e.g., headphones 600 perform different actions in response to the configurations depicted in FIG. 6I and FIG. 6M). And in some embodiments, for a given input from the perspective of the user wearing headphones 600, headphones 600 perform different actions depending on which touch-sensitive surface the input is received (e.g., headphones 600 perform different actions in response to the configurations depicted in FIG. 6I and FIG. 6N).

Figure 6Q:
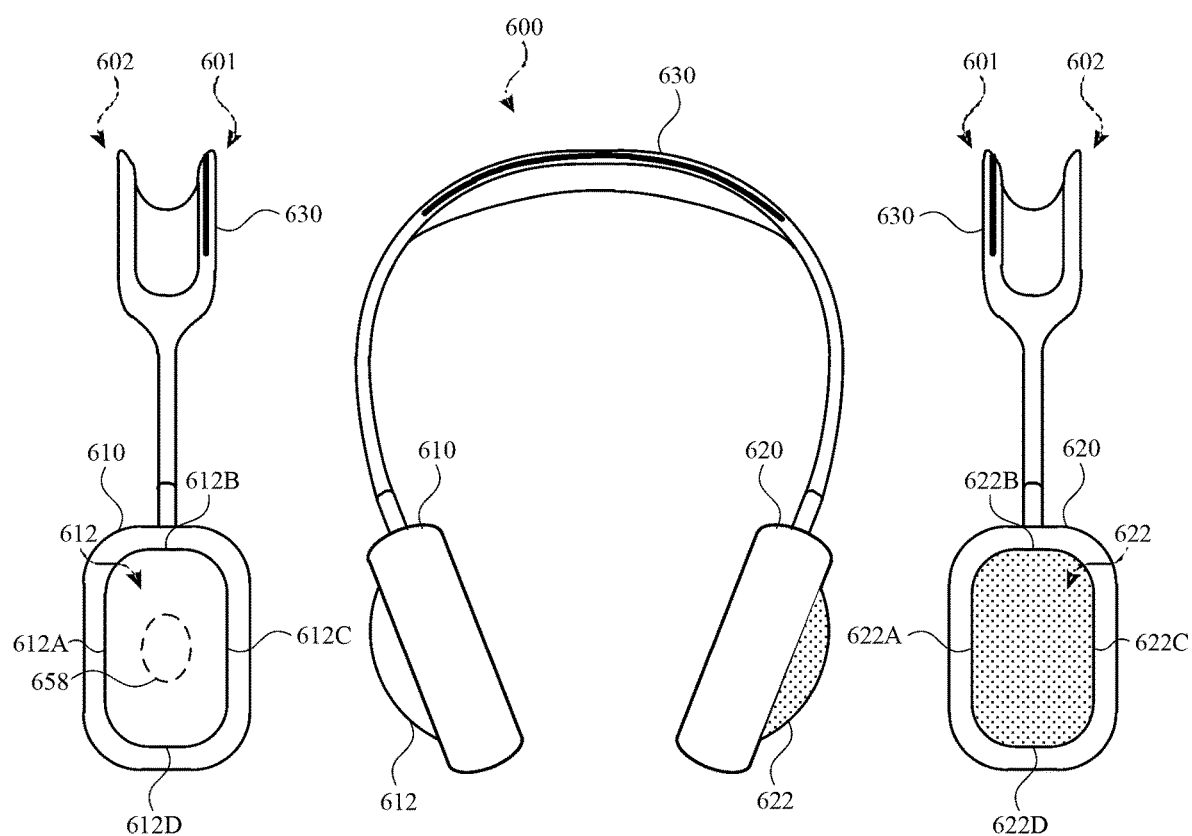
Figure 6R:
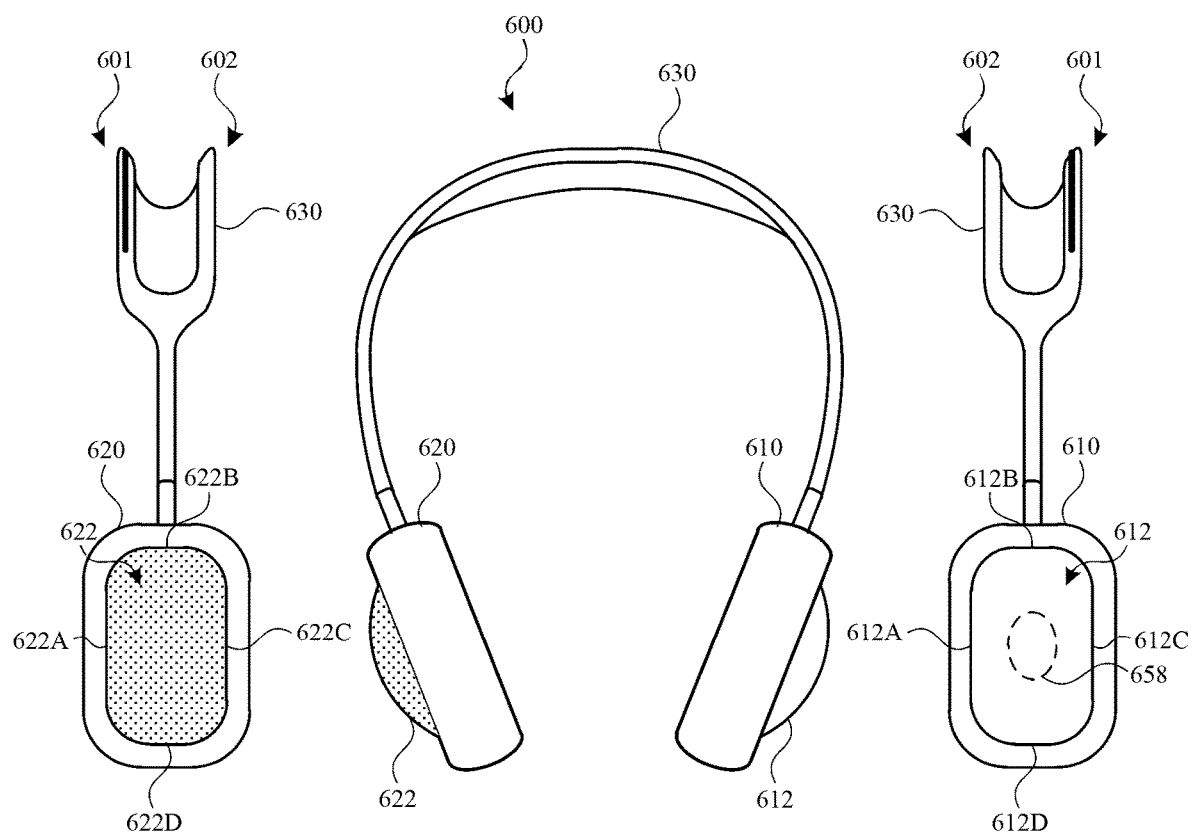
Figure 7:
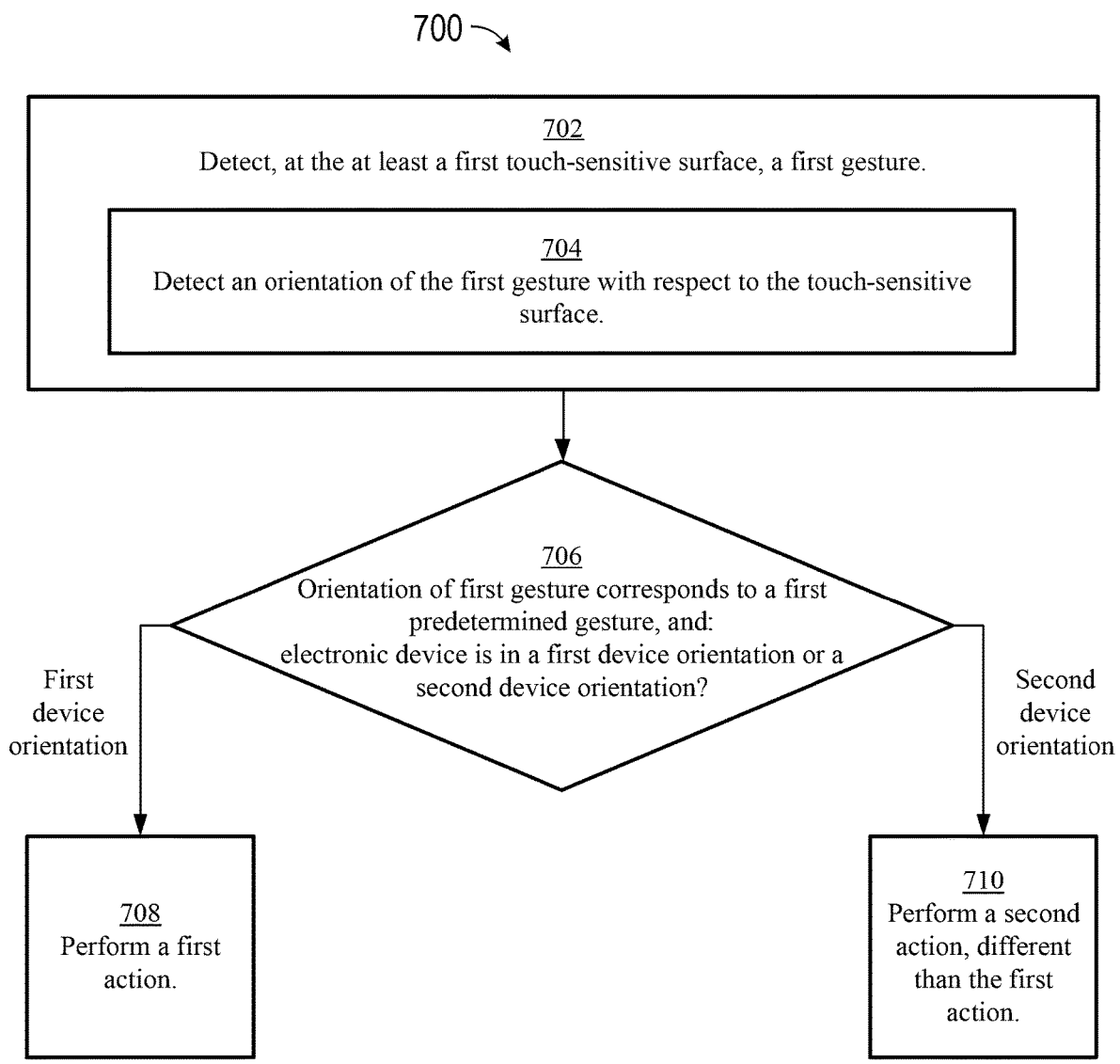
FIG. 7 is a flow diagram illustrating a method for processing gestures on a touch-sensitive surface using an electronic device in accordance with some embodiments.

Turning now to FIGS. 6Q-6R, the response to headphones 600 to an input that matches a predefined gesture pattern is described. In FIG. 6Q, headphones 600 are in the first device orientation and receive a tap gesture on first touch-sensitive surface 612, input 658. In FIG. 6R, headphones 600 receive the same input 658, a tap gesture on first touch-sensitive surface 612, while in the second device orientation. In both FIG. 6Q and FIG. 6R, headphones 600 determine that input 658 matches a predefined gesture pattern. In some embodiments, based on further determining that headphones 600 are in the first device orientation, headphones 600 perform a ninth action (e.g., a pause action on an audio player), and based on further determining that headphones 600 are in the second device orientation, headphones perform a tenth action (e.g., an answer call action). In some embodiments, headphones 600 perform the same action (e.g., a pause action on an audio player) in response to determining that input 658 matches a predefined gesture pattern, regardless of the device orientation. Other examples of a predefined gesture patterns include a two finger tap and a three finger tap.

Table 1 below shows a summary of some of the various exemplary configurations and corresponding responses described above. It should be recognized, however, that the configurations and corresponding responses in Table 1 are not the only possible combinations and that other configurations and/or responses are possible.

TABLE 1

| Surface of Input | Gesture Orientation (with respect to input surface) | Device Orientation | Device Orientation (with respect to user) | Gesture Orientation (with respect to user) | Same response on both sides (with respect to user) | Action |
| --- | --- | --- | --- | --- | --- | --- |
| 612 | Left-to-Right | First | Forward-Up | Right-Forward | NO | First |
| 612 | Left-to-Right | Second | Backward-Up | Left-Back | NO | Second |
| 612 | Left-to-Right | Third | Backward-Down | Right-Back | NO | Third |
| 612 | Left-to-Right | Fourth | Forward-Down | Left-Forward | NO | Fourth |
| 612 | Upward | First | Forward-Up | Right-Up | NO | Fifth |
| 612 | Upward | Second | Backward-Up | Left-Up | NO | Sixth |
| 612 | Upward | Third | Backward-Down | Right-Down | NO | Seventh |
| 612 | Upward | Fourth | Forward-Down | Left-Down | NO | Eighth |
| 622 | Left-to-Right | First | Forward-Up | Left-Back | NO | Second |
| 622 | Left-to-Right | Second | Backward-Up | Right-Forward | NO | First |
| 622 | Left-to-Right | Third | Backward-Down | Left-Forward | NO | Fourth |
| 622 | Left-to-Right | Fourth | Forward-Down | Right-Back | NO | Third |
| 622 | Upward | First | Forward-Up | Left-Up | NO | Sixth |
| 622 | Upward | Second | Backward-Up | Right-Up | NO | Fifth |
| 622 | Upward | Third | Backward-Down | Left-Down | NO | Eighth |
| 622 | Upward | Fourth | Forward-Down | Right-Down | NO | Seventh |
| 612 | Left-to-Right | First | Forward-Up | Right-Forward | YES | First |
| 612 | Left-to-Right | Second | Backward-Up | Left-Back | YES | Second |
| 612 | Left-to-Right | Third | Backward-Down | Right-Back | YES | Second |

TABLE 1-continued

| Surface of Input | Gesture Orientation (with respect to input surface) | Device Orientation | Device Orientation (with respect to user) | Gesture Orientation (with respect to user) | Same response on both sides (with respect to user) | Action |
|---|---|---|---|---|---|---|
| 612 | Left-to-Right | Fourth | Forward-Down | Left-Forward | YES | First |
| 612 | Upward | First | Forward-Up | Right-Up | YES | Fifth |
| 612 | Upward | Second | Backward-Up | Left-Up | YES | Fifth |
| 612 | Upward | Third | Backward-Down | Right-Down | YES | Seventh |
| 612 | Upward | Fourth | Forward-Down | Left-Down | YES | Seventh |
| 622 | Left-to-Right | First | Forward-Up | Left-Back | YES | Second |
| 622 | Left-to-Right | Second | Backward-Up | Right-Forward | YES | First |
| 622 | Left-to-Right | Third | Backward-Down | Left-Forward | YES | First |
| 622 | Left-to-Right | Fourth | Forward-Down | Right-Back | YES | Second |
| 622 | Upward | First | Forward-Up | Left-Up | YES | Fifth |
| 622 | Upward | Second | Backward-Up | Right-Up | YES | Fifth |
| 622 | Upward | Third | Backward-Down | Left-Down | YES | Seventh |
| 622 | Upward | Fourth | Forward-Down | Right-Down | YES | Seventh |

FIG. 7 is a flow diagram illustrating a method for processing gestures on a touch-sensitive surface using an electronic device in accordance with some embodiments. Method 700 is performed at a device (e.g., 100, 300, 500, 600, 800, 1000, 1200, or 1410) with at least a first touch-sensitive surface (e.g., 612). In some embodiments, the at least a first touch-sensitive surface includes a first touch-sensitive surface (e.g., 612) and a second touch-sensitive surface (e.g., 622), different than the first touch-sensitive surface. In some embodiments, the electronic device is a pair of headphones having a first ear cup (e.g., 610) and a second ear cup (e.g., 620), and where the first touch sensitive surface is on the first ear cup and the second touch sensitive surface is on the second ear cup. In some embodiments, headphones include a sensor (e.g., 164, 359) configured to capture an image of a user's ears, and the orientation of the electronic device is determined based on the image of the user's ears.

As described below, method 700 provides an intuitive way for processing gestures on a touch-sensitive surface. The method reduces the cognitive burden on a user for providing input gestures on a touch-sensitive surface, thereby creating a more efficient human-machine interface. For battery-operated computing devices, enabling a user to provide input gestures on a touch-sensitive surface faster and more efficiently conserves power and increases the time between battery charges. Some operations in method 700 are, optionally, combined, the orders of some operations are, optionally, changed, and some operations are, optionally, omitted.

In method 700, the electronic device (e.g., headphones earbuds) detects (702), at the at least a first touch-sensitive surface (e.g., 612), a first gesture (e.g., 650), including detecting (704) an orientation of the first gesture with respect to the touch-sensitive surface (e.g., the touch-sensitive surface has, independent of any frame of reference from which the touch-sensitive surface is being observed or monitored, one or more locations on its surface that correspond to one or more fixed coordinates on the touch-sensitive surface). In some embodiments, the electronic device is a set of headphones that are in communication (e.g., wireless communication) with an external electronic device (e.g., 810), such as a smartphone, a tablet computer, a smartwatch, or any other external electronic device. For example, the headphones are optionally in communication with the external electronic device via Bluetooth via which the headphones are able to play audio provided by the electronic device. In some embodiments, in addition to audio communication, the headphones and the external electronic device are able to communicate other information between them, such as headphone battery information, headphone orientation information, information about touch inputs detected on the touch-sensitive surface of the headphones, and so forth. The headphones optionally include two ear cups (e.g., "first ear cup" 610 and "second ear cup" 620). The headphones and/or ear cups are optionally symmetrical, such that the headphones can be worn by a user in multiple orientations (e.g., the first ear cup on the user's left ear, and the second ear cup on the user's right ear; or, the first ear cup on the user's right ear, and the second ear cup on the user's left ear). In some embodiments, the first ear cup and/or the second ear cup include a touch-sensitive surface on their outer surfaces (e.g., the surfaces opposite the user's ears). For example, if the touch-sensitive surface has a shape that is a four-sided shape, it optionally has a first side (e.g., 612A), a second side (e.g., 612B adjacent the first side), a third side (e.g., 612C opposite the first side) and a fourth side (e.g., 612D opposite the second side). The first gesture optionally has an orientation with respect to those locations on the touch-sensitive surface. For example, the first gesture (e.g., 650) is optionally a swipe from the first side of the touch-sensitive surface to the third side of the touch-sensitive surface.

The electronic device performs (708) a first action (e.g., a media-related action such as skip next track), in response to detecting the first gesture and in accordance with a determination (706) that the electronic device is in a first device orientation (e.g., forward, upright) and that the orientation of the first gesture corresponds to a first predetermined orientation (e.g., a determination that the first ear cup of the headphones is on the user's right ear, and that the second ear cup of the headphones is on the user's left ear; see the input orientation of input 650 and the device orientation of headphones 600 in FIG. 6A). In some embodiments, the first or second ear cups include one or more sensors, such as imaging sensors that are able to image an ear on which the ear cups are placed, for determining which ear the ear cups are on. The determination about which ear a given cup is on is optionally made by the headphones themselves based on outputs from the imaging sensors, or made by the external electronic device (e.g., 810) with which the headphones are in communication. For example, if the first ear cup is on the user's right ear and the second ear cup is on the user's left ear such that the first side of the touch-sensitive surface of the first ear cup is oriented toward the back of the user's head, and the third side of the touch-sensitive surface of the first ear cup is oriented toward the front of the user's head, a swipe detected from the first side of the touch-sensitive surface to the third side of the touch-sensitive surface on the first ear cup will be determined, by the headphones or the electronic device, to be a back-to-front swipe on the user's right side, which optionally causes the electronic device to skip forward to the next music track in a playlist from a currently-playing music track in that playlist.

The electronic device performs (710) a second action (e.g., a media-related action such as skip to previous track) that is different than the first action, in response to detecting the first gesture and in accordance with a determination (706) that the electronic device is in a second device orientation (e.g., backward, upright), different than the first device orientation (e.g., a determination that the first ear cup of the headphones is on the user's left ear, and that the second ear cup of the headphones is on the user's right ear) and that the orientation of the first gesture corresponds to the first predetermined orientation (e.g., the input orientation of input 650 and the device orientation of headphones 600 in FIG. 6B). For example, if the first ear cup is on the user's left ear and the second ear cup is on the user's right ear such that the first side of the touch-sensitive surface of the first ear cup is oriented toward the front of the user's head, and the third side of the touch-sensitive surface of the first ear cup is oriented toward the back of the user's head, a swipe detected from the first side of the touch-sensitive surface to the third side of the touch-sensitive surface on the first ear cup will be determined, by the headphones or the electronic device, to be a front-to-back swipe on the user's left side, which optionally causes the electronic device to skip backward to the previous music track in a playlist from a currently-playing music track in that playlist. Performing actions selectively based on device and gesture orientation provides the user with the ability to interact with the device without having to monitor the device's orientation and to adapt their gesture orientation to the device's current orientation. Doing so improves the user's ability to provide input to the device quickly and efficiently. Providing improved and easy-to-use control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first action and the second action are multimedia control actions. In some embodiments, the multimedia control actions are one or more of: play, pause, volume up, volume down, next song, previous song, fast forward, rewind, and enter ambient sound transparency mode.

In some embodiments, the first predetermined orientation (that the gesture corresponds to) is a vertical direction with respect to the at least a first touch sensitive surface (e.g., the orientation of input 654 with respect to first touch sensitive surface 612). In some such embodiments, the first action and the second action adjust a volume level of the electronic device. Further in some such embodiments, the first action increases the volume level and the second action decreases the volume level.

In some embodiments, the first predetermined orientation (that the gesture corresponds to) is a horizontal direction with respect to the at least a first touch sensitive surface (e.g., the orientation of input 650 with respect to first touch sensitive surface 612). In some such embodiments, the first action and the second action control an audio track played by the electronic device. Further in some such embodiments, the first action skips to a subsequent audio track and the second action returns to a beginning of a current track or skips to a previous audio track.

In some embodiments, the first action is performed further in accordance with a determination that the first gesture is detected at the first touch-sensitive surface. In some such embodiments, further in response to detecting the first gesture and in accordance with a determination that the electronic device is in the first device orientation (e.g., a determination that the first ear cup of the headphones is on the user's right ear and the second ear cup of the headphones is on the user's left ear such that the first side of the touch-sensitive surface of the second ear cup is oriented toward the front of the user's head, and the third side of the touch-sensitive surface of the second ear cup is oriented toward the back of the user's head), that the orientation of the first gesture corresponds to the first predetermined orientation (e.g., a swipe detected from the first side of the touch-sensitive surface to the third side of the touch-sensitive surface on the second ear cup will be determined, by the headphones or the electronic device, to be a front-to-back swipe on the user's left side), and that the first gesture is detected at the second touch-sensitive surface (e.g., on the left ear cup), the electronic device performs the second action (e.g., headphones 600 perform the second action in response to the configuration of input 652 and device orientation shown in FIG. 6E).

In some embodiments, the second action is performed further in accordance with a determination that the first gesture is detected at the first touch-sensitive surface. In some such embodiments, further in response to detecting the first gesture and in accordance with a determination that the electronic device is in the second device orientation (e.g., a determination that the first ear cup of the headphones is on the user's left ear and the second ear cup of the headphones is on the user's right ear such that the first side of the touch-sensitive surface of the second ear cup is oriented toward the back of the user's head, and the third side of the touch-sensitive surface of the second ear cup is oriented toward the front of the user's head), that the orientation of the first gesture corresponds to the first predetermined orientation (e.g., a swipe detected from the first side of the touch-sensitive surface to the third side of the touch-sensitive surface on the second ear cup will be determined, by the headphones or the electronic device, to be a back-to-front swipe on the user's right side), and that the first gesture is detected at the second touch-sensitive surface (e.g., the right ear cup), the electronic device performs the first action (e.g., headphones 600 perform the first action in response to the configuration of input 652 and device orientation shown in FIG. 6F).

In some embodiments, the electronic device performs a third action (e.g., a media-related action such as skip to previous track), in response to detecting the first gesture and in accordance with a determination that the electronic device is in a third device orientation (e.g., backward, upside-down), different than the first device orientation and the second device orientation, and that the orientation of the first gesture corresponds to the first predetermined orientation (e.g., headphones 600 perform the third action in response to the configuration of input 650 and device orientation shown in FIG. 6C). For example, if the first ear cup of the headphones is on the user's right ear and the second ear cup of the headphones is on the user's left ear such that the first side of the touch-sensitive surface of the first ear cup is oriented toward the front of the user's head, and the third side of the touch-sensitive surface of the first ear cup is oriented toward the back of the user's head, a swipe detected from the first side of the touch-sensitive surface to the third side of the touch-sensitive surface on the first ear cup will be determined, by the headphones or the electronic device, to be a front-to-back swipe on the user's right side. In some such embodiments, a front-to-back swipe on the user's right side causes the electronic device to skip backward to the previous music track in a playlist from a currently-playing music track in that playlist. In some embodiments, the third action is the same as the second action.

In some embodiments, the electronic device performs a fourth action (e.g., a media-related action such as skip to next track), in response to detecting the first gesture and in accordance with a determination that the electronic device is in a fourth device orientation (e.g., forward, upside-down), different than the first device orientation, the second device orientation, and the third device orientation, and that the orientation of the first gesture corresponds to the first predetermined orientation (e.g., headphones 600 perform the fourth action in response to the configuration of input 650 and device orientation shown in FIG. 6D). For example, if the first ear cup of the headphones is on the user's left ear and the second ear cup of the headphones is on the user's right ear such that the first side of the touch-sensitive surface of the first ear cup is oriented toward the back of the user's head, and the third side of the touch-sensitive surface of the first ear cup is oriented toward the front of the user's head, a swipe detected from the first side of the touch-sensitive surface to the third side of the touch-sensitive surface on the first ear cup will be determined, by the headphones or the electronic device, to be a back-to-front swipe on the user's left side. In some such embodiments, a back-to-front swipe on the user's left side causes the electronic device to skip forward to the next music track in a playlist from a currently-playing music track in that playlist). In some embodiments, the fourth action is the same as the first action.

In some embodiments, the third action is performed further in accordance with a determination that the first gesture is detected at the first touch-sensitive surface. In some such embodiments, further in response to detecting the first gesture and in accordance with a determination that the electronic device is in the third device orientation (e.g., a determination that the first ear cup of the headphones is on the user's right ear and the second ear cup of the headphones is on the user's left ear such that the first side of the touch-sensitive surface of the second ear cup is oriented toward the back of the user's head, and the third side of the touch-sensitive surface of the second ear cup is oriented toward the front of the user's head), that the orientation of the first gesture corresponds to the first predetermined orientation, and that the first gesture is detected at the second touch-sensitive surface (e.g., a swipe detected from the first side of the touch-sensitive surface to the third side of the touch-sensitive surface on the second ear cup will be determined, by the headphones or the electronic device, to be a back-to-front swipe on the user's left side), the electronic device performs the fourth action (e.g., headphones 600 perform the fourth action in response to the configuration of input 652 and device orientation shown in FIG. 6G)). In some embodiments, the fourth action (e.g., response to back-to-front swipe on user's left side) is the same as the first action (e.g., response to back-to-front swipe on user's right side)

In some embodiments, the fourth action is performed further in accordance with a determination that the first gesture is detected at the first touch-sensitive surface. In some such embodiments, further in response to detecting the first gesture and in accordance with a determination that the electronic device is in the fourth device orientation (e.g., a determination that the first ear cup of the headphones is on the user's left ear and the second ear cup of the headphones is on the user's right ear such that the first side of the touch-sensitive surface of the second ear cup is oriented toward the front of the user's head, and the third side of the touch-sensitive surface of the second ear cup is oriented toward the back of the user's head), that the orientation of the first gesture corresponds to the first predetermined orientation, and that the first gesture is detected at the second touch-sensitive surface (e.g., a swipe detected from the first side of the touch-sensitive surface to the third side of the touch-sensitive surface on the second ear cup will be determined, by the headphones or the electronic device, to be a front-to-back swipe on the user's right side), the electronic device performs the third action (e.g., headphones 600 perform the third action in response to the configuration of input 652 and device orientation shown in FIG. 6H). In some embodiments, the third action (e.g., response to front-to-back swipe on right side) is the same as the second action (e.g., response to front-to-back swipe on left side).

In some embodiments, the electronic device performs a fifth action (e.g., a media-related action such as increasing the playback volume), in response to detecting the first gesture and in accordance with a determination that the electronic device is in the first device orientation and that the first gesture corresponds to a second predetermined orientation (e.g., headphones 600 perform the fifth action in response to the configuration of input 654 and device orientation shown in FIG. 6I). For example, if the first ear cup of the headphones is on the user's right ear and the second ear cup of the headphones is on the user's left ear such that the second side of the touch-sensitive surface of the first ear cup is oriented toward the top of the user's head, and the fourth side of the touch-sensitive surface of the first ear cup is oriented toward the bottom of the user's head, a swipe detected from the fourth side of the touch-sensitive surface to the second side of the touch-sensitive surface on the first ear cup will be determined, by the headphones or the electronic device, to be an upward swipe on the user's right side. In some such embodiments, an upward swipe on the user's right side causes the electronic device to increase the volume.

In some embodiments, the electronic device performs a sixth action (e.g., a media-related action such as increasing the playback volume), in response to detecting the first gesture and in accordance with a determination that the electronic device is in the second device orientation and that the first gesture corresponds to the second predetermined orientation (e.g., headphones 600 perform the sixth action in response to the configuration of input 654 and device orientation shown in FIG. 6J). For example, if the first ear cup of the headphones is on the user's left ear and the second ear cup of the headphones is on the user's right ear such that the second side of the touch-sensitive surface of the first ear cup is oriented toward the top of the user's head, and the fourth side of the touch-sensitive surface of the first ear cup is oriented toward the bottom of the user's head, a swipe detected from the fourth side of the touch-sensitive surface to the second side of the touch-sensitive surface on the first ear cup will be determined, by the headphones or the electronic device, to be an upward swipe on the user's left side). In some such embodiments, an upward swipe on the user's left side causes the electronic device to increase the volume. In some embodiments, the sixth action is the same as the fifth action.

In some embodiments, the fifth action is performed further in accordance with a determination that the first gesture is detected at the first touch-sensitive surface. In some such embodiments, further in response to detecting the first gesture and in accordance with a determination that the electronic device is in the first device orientation (e.g., a determination that the first ear cup of the headphones is on the user's right ear and the second ear cup of the headphones is on the user's left ear such that the second side of the touch-sensitive surface of the second ear cup is oriented toward the top of the user's head, and the fourth side of the touch-sensitive surface of the second ear cup is oriented toward the bottom of the user's head), that the orientation of the first gesture corresponds to the second predetermined orientation, and that the first gesture is detected at the second touch-sensitive surface (e.g., a swipe detected from the fourth side of the touch-sensitive surface to the second side of the touch-sensitive surface on the second ear cup will be determined, by the headphones or the electronic device, to be an upward swipe on the user's left side), the electronic device performs the sixth action (e.g., headphones 600 perform the sixth action in response to the configuration of input 656 and device orientation shown in FIG. 6M). In some embodiments, the sixth action is the same as the fifth action (e.g., response to upward swipe on left side is the same as the response to an upward swipe on the right side).

In some embodiments, the sixth action is performed further in accordance with a determination that the first gesture is detected at the first touch-sensitive surface. In some such embodiments, further in response to detecting the first gesture and in accordance with a determination that the electronic device is in the second device orientation, that the first gesture corresponds to the second predetermined orientation, and that the first gesture is detected at the second touch-sensitive surface (e.g., a determination that the first ear cup of the headphones is on the user's left ear and the second ear cup of the headphones is on the user's right ear such that the second side of the touch-sensitive surface of the second ear cup is oriented toward the top of the user's head, and the fourth side of the touch-sensitive surface of the second ear cup is oriented toward the bottom of the user's head, a swipe detected from the fourth side of the touch-sensitive surface to the second side of the touch-sensitive surface on the second ear cup will be determined, by the headphones or the electronic device, to be an upward swipe on the user's right side), the electronic device performs the fifth action (e.g., headphones 600 perform the fifth action in response to the configuration of input 656 and device orientation shown in FIG. 6N).

In some embodiments, the electronic device performs a seventh action (e.g., a media-related action such as decreasing the playback volume), in response to detecting the first gesture and in accordance with a determination that the electronic device is in the third device orientation and that the first gesture corresponds to the second predetermined orientation (e.g., headphones 600 perform the seventh action in response to the configuration of input 654 and device orientation shown in FIG. 6K). For example, if the first ear cup of the headphones is on the user's left ear and the second ear cup of the headphones is on the user's right ear such that the second side of the touch-sensitive surface of the first ear cup is oriented toward the bottom of the user's head, and the fourth side of the touch-sensitive surface of the first ear cup is oriented toward the top of the user's head, a swipe detected from the fourth side of the touch-sensitive surface to the second side of the touch-sensitive surface on the first ear cup will be determined, by the headphones or the electronic device, to be a downward swipe on the user's left side. In some such embodiments, a downward swipe on the user's left side causes the electronic device to decrease the volume.

In some embodiments, the electronic device performs an eighth action (e.g., a media-related action such as decreasing the playback volume), in response to detecting the first gesture and in accordance with a determination that the electronic device is in the fourth device orientation and that the first gesture corresponds to the second predetermined orientation (e.g., headphones 600 perform the eighth action in response to the configuration of input 654 and device orientation shown in FIG. 6L). For example, if the first ear cup of the headphones is on the user's left ear and the second ear cup of the headphones is on the user's right ear such that the second side of the touch-sensitive surface of the first ear cup is oriented toward the bottom of the user's head, and the fourth side of the touch-sensitive surface of the first ear cup is oriented toward the top of the user's head, a swipe detected from the fourth side of the touch-sensitive surface to the second side of the touch-sensitive surface on the first ear cup will be determined, by the headphones or the electronic device, to be a downward swipe on the user's left side. In some such embodiments, a downward swipe on the user's left side causes the electronic device to decrease the volume. In some embodiments, the eight action is the same as the seventh action.

In some embodiments, the seventh action is performed further in accordance with a determination that the first gesture is detected at the first touch-sensitive surface. In some such embodiments, further in response to detecting the first gesture and in accordance with a determination that the electronic device is in the third device orientation, that the first gesture corresponds to the second predetermined orientation, and that the first gesture is detected at the second touch-sensitive surface (e.g., a determination that the first ear cup of the headphones is on the user's right ear and the second ear cup of the headphones is on the user's left ear such that the second side of the touch-sensitive surface of the second ear cup is oriented toward the bottom of the user's head, and the fourth side of the touch-sensitive surface of the second ear cup is oriented toward the top of the user's head, a swipe detected from the fourth side of the touch-sensitive surface to the second side of the touch-sensitive surface on the second ear cup will be determined, by the headphones or the electronic device, to be a downward swipe on the user's left side), the electronic device performs the eighth action (e.g., headphones 600 perform the eighth action in response to the configuration of input 656 and device orientation shown in FIG. 6O). In some embodiments, the eighth action is the same as the seventh action (e.g., same response to downward swipe, regardless of side).

In some embodiments, the eighth action is performed further in accordance with a determination that the first gesture is detected at the first touch-sensitive surface. In some such embodiments, further in response to detecting the first gesture and in accordance with a determination that the electronic device is in the fourth device orientation, that the first gesture corresponds to the second predetermined orientation, and that the first gesture is detected at the second touch-sensitive surface (e.g., a determination that the first ear cup of the headphones is on the user's left ear and the second ear cup of the headphones is on the user's right ear such that the second side of the touch-sensitive surface of the second ear cup is oriented toward the bottom of the user's head, and the fourth side of the touch-sensitive surface of the second ear cup is oriented toward the top of the user's head, a swipe detected from the fourth side of the touch-sensitive surface to the second side of the touch-sensitive surface on the second ear cup will be determined, by the headphones or the electronic device, to be a downward swipe on the user's right side), the electronic device performs the seventh action (e.g., headphones 600 perform the seventh action in response to the configuration of input 656 and device orientation shown in FIG. 6P).

In some embodiments in which the electronic device is a pair of headphones having a first ear cup and a second ear cup, and wherein the first touch sensitive surface is on the first ear cup and the second touch sensitive surface is on the second ear cup, the first ear cup has a first top side and a first bottom side, opposite the first top side, and the second ear cup has a second top side and a second bottom side, opposite the second top side. In some such embodiments, the electronic device is in the first device orientation when the first ear cup is on a user's right ear, the second ear cup is on the user's left ear, the first top side is above the first bottom side, and the second top side is above the second bottom side. In some embodiments, the electronic device is in the second device orientation when the first ear cup is on a user's left ear, the second ear cup is on the user's right ear, the first top side is above the first bottom side, and the second top side is above the second bottom side. In some embodiments, the electronic device is in the third device orientation when the first ear cup is on a user's right ear, the second ear cup is on the user's left ear, the first top side is below the first bottom side, and the second top side is below the second bottom side. In some embodiments, the electronic device is in the fourth device orientation when the first ear cup is on a user's left ear, the second ear cup is on the user's right ear, the first top side is below the first bottom side, and the second top side is below the second bottom side.

In some embodiments, the electronic device detects, at the at least a first touch sensitive surface, a second gesture (e.g., 658). In some such embodiments, in response to receiving an indication of the second gesture and in accordance with a determination that the second gesture matches a predefined gesture pattern, the electronic device performs one or more of the following processes: in accordance with the electronic device being in the first device orientation, the electronic device performs a ninth action, and in accordance with the electronic device being in the second device orientation, the electronic device performs the ninth action (e.g., the same action is performed regardless of device orientation).

Note that details of the processes described above with respect to method 700 (e.g., FIG. 7) are also applicable in an analogous manner to the methods described below. For example, method 900 optionally includes one or more of the characteristics of the various methods described above with reference to method 700. For example, method 700 can be performed on an electronic device that determines the current context of the device and operates in different states of ambient sound transparency, in accordance with the determined context. For another example, method 700 can be performed on a device that detects motion of the device and operates in different audio output states, based on the detected motion. For brevity, these details are not repeated below.

FIGS. 8A-8E illustrate exemplary methods for operation of ambient sound transparency and noise cancellation modes of an electronic device, in accordance with some embodiments. The user interfaces in these figures are used to illustrate the processes described below, including the processes in FIG. 9.

Figure 8A:
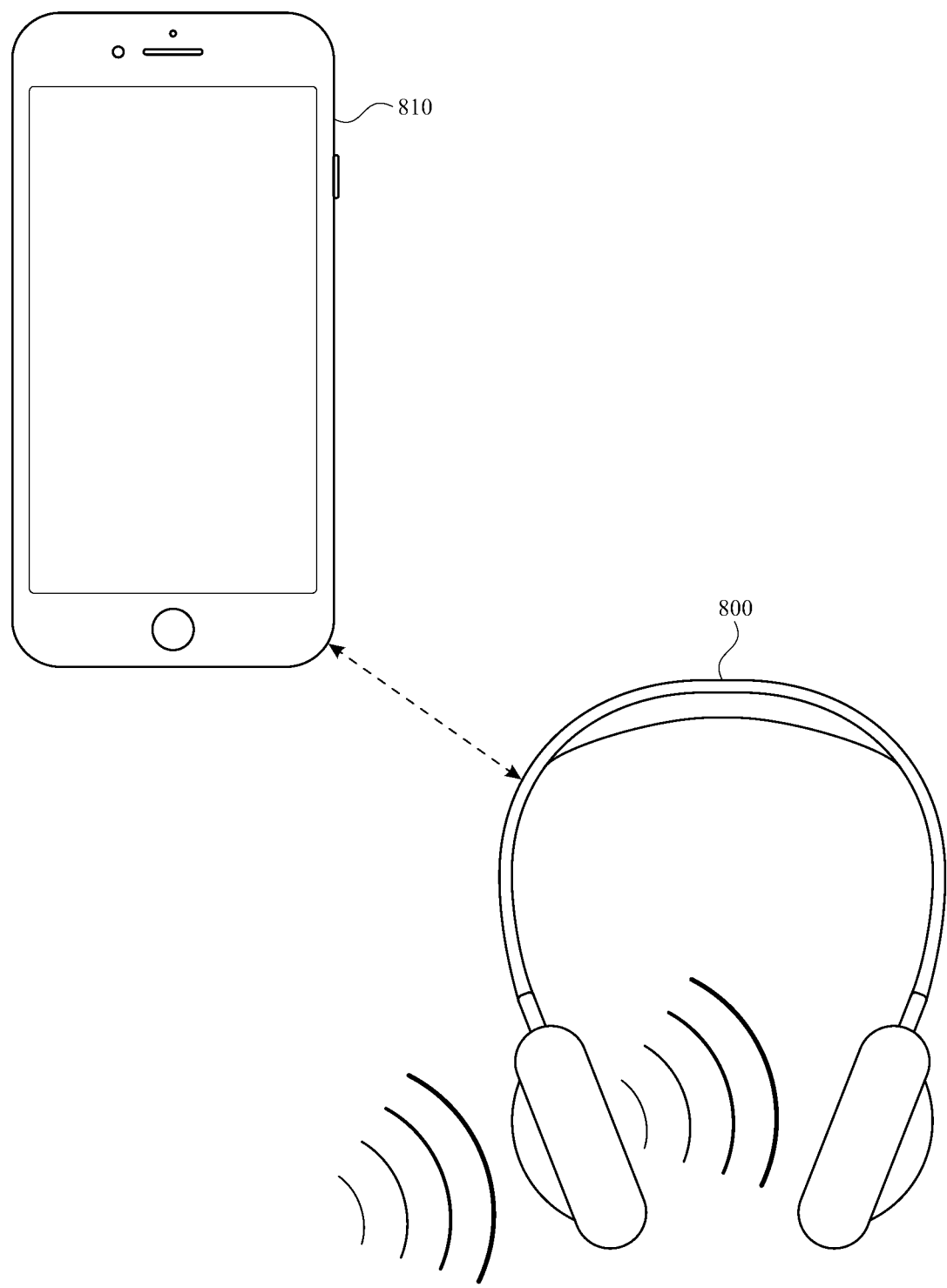
FIGS. 8A-8E illustrate exemplary techniques for context-dependent ambient sound transparency operation of an electronic device in accordance with some embodiments.

FIG. 8A depicts an exemplary embodiment of headphones 800 and electronic device 810 in communication with the headphones 800. Headphones 800 and electronic device 810 include one or more sensors—for example, microphones, location sensors such as GPS sensors—that are used to determine a current context of headphones 800 or electronic device 810. Optionally, headphones 800 include one or more features of headphones 600 described above (e.g., image sensors to determine on which of the user's ears each ear cup is placed).

In some embodiments, the context is an audio context, a device usage context, or a location/movement context. Some examples of the context of headphones 800 include that the electronic device with which the headphones are in communication is receiving a phone call and the headphones are playing the ringtone for that phone call (e.g., a device usage context), the headphones/user are traveling at a high rate of speed (a location/movement context), or another person is talking to the user of the headphones (e.g., an audio context). In some embodiments, determining the context occurs in response to a context-changing (or potentially context-changing) event such as receipt of an incoming call. In some embodiments, determining the context occurs automatically (e.g., without user input) at the time the headphones 800 and/or device 810 is powered on.

Figure 8B:
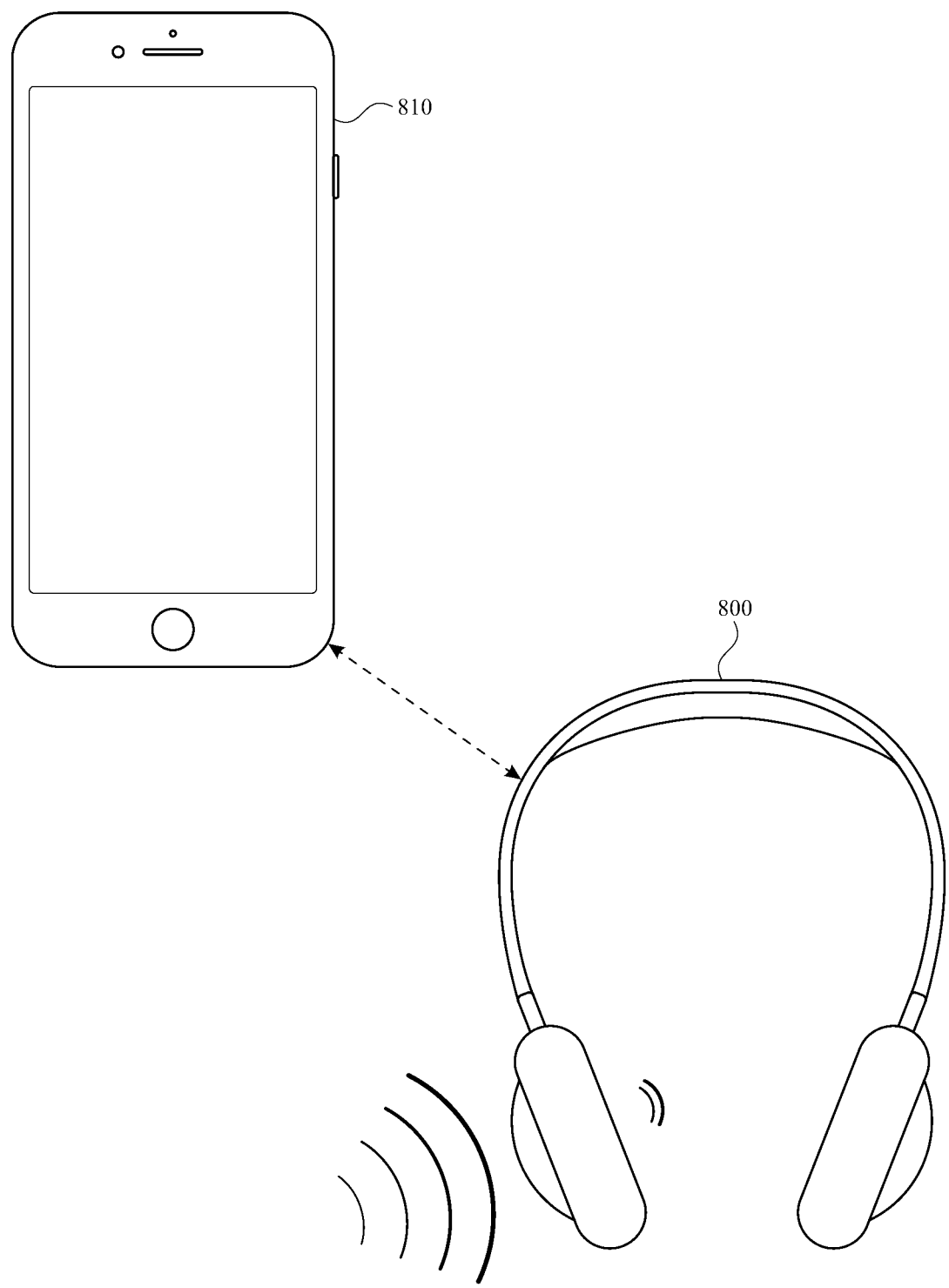
Figure 8C:
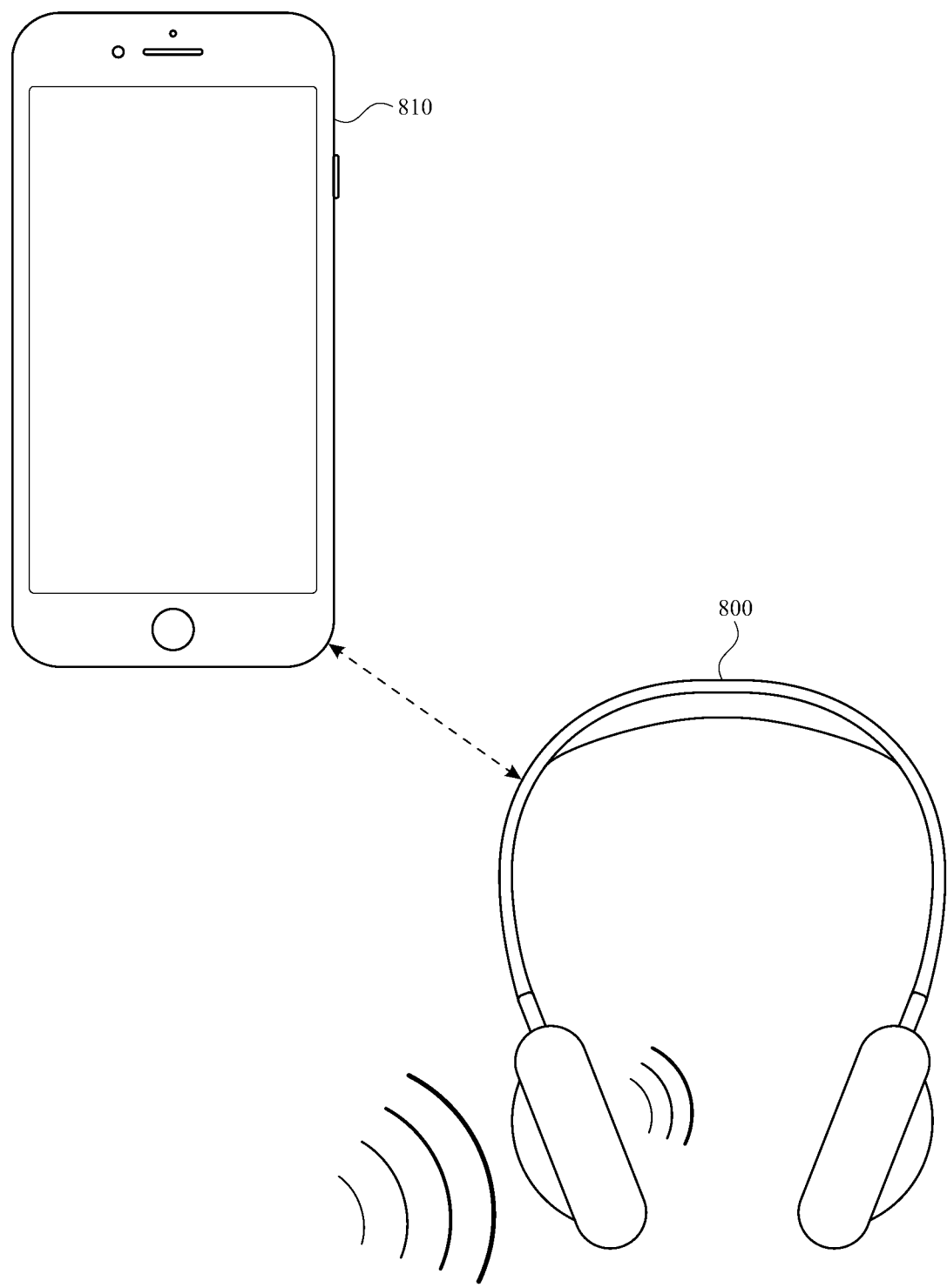

Furthermore, headphones 800 have the ability to operate at multiple states of ambient sound transparency, corresponding to different levels of noise cancellation and sound transparency. For example, headphones 800 are optionally able to operate at a minimum ambient sound transparency level (e.g., full noise cancellation), a maximum ambient sound transparency level (e.g., a full sound transparency), and an intermediate ambient sound transparency level (e.g., no active noise cancellation nor active pass-through of ambient sounds). In some embodiments of a low state of ambient sound transparency (e.g., full noise cancellation), noises from outside of the headphones are fully (e.g., actively) suppressed, or suppressed as much as the headphones are able, so a user wearing headphones 800 cannot hear those noises. In some embodiments of a high state of ambient sound transparency (e.g., full ambient sound transparency), noises from outside of the headphones are fully (e.g., actively) passed through to the user or amplified (or passed through as much as the headphones are able) so the user can hear those noises. In some embodiments of an intermediate state of ambient sound transparency, there is no active noise cancellation and no active pass-through of ambient sounds (e.g., ambient sounds are allowed to passively (e.g., naturally) pass through the structure of headphones 800 to the user's ear). The full transparency level, full noise cancellation level, and intermediate level are illustrated in FIGS. 8A-8C, respectively, which depict various levels of ambient sound reaching the user's ear. In some embodiments, headphones 800 are able to operate in any subset of the above levels and/or are able to operate in additional or alternative ambient sound transparency levels to those provided above.

As mentioned above, headphones 800 (which can include one or more features of devices 100, 300, or 500) and electronic device 810 determine a current context. In accordance with a determination that the context is a first context, headphones 800 operate in a first state of ambient sound transparency, and in accordance with a determination that the context is a second context, headphones 800 operate in a second state of ambient sound transparency. For example, headphones 800 automatically, and without user input, operate in different levels of ambient sound transparency depending on the current context of headphones 800. In some embodiments, the context is determined based on content playing on headphones 800. If, for example, electronic device 810 is receiving a phone call and headphones 800 are playing the ringtone for that phone call, or headphones 800 are playing music, headphones 800 optionally operate in a low state of ambient sound transparency (e.g., high noise cancellation and/or low amount of ambient sound pass-through) to increase the ability of the user to hear the ringtone or music. Headphones 800 also optionally operate in a low state of ambient sound transparency if a notification (e.g., ringtone, beep, alarm, or the like) is being played through headphones 800. Optionally, if no content is playing on headphones 800, headphones 800 operate in a state of high ambient sound transparency (e.g., low noise cancellation and high pass-through).

The state of ambient sound transparency of the headphones optionally automatically changes over time based on the current context of the headphones. In some embodiments, the context is determined based on ambient sound. As an example, if another person is talking to the user of headphones 800 (e.g., the other person is calling the user's name, the person says "hey" to the user, etc.), headphones 800 optionally operate in a high state of ambient sound transparency to increase the ability of the user to hear the other person. Optionally, headphones 800 optionally operate in a high state of ambient sound transparency if headphones 800 and/or electronic device 810 detect ambient sounds indicating a dangerous situation (e.g., sirens, car horns, screaming, etc.).

In some embodiments, the context is based on the locational characteristics of headphones 800 and/or electronic device 810. For example, if the user of headphones 800 is determined to be moving at a speed that exceeds a threshold speed, headphones 800 optionally operate in a state of high ambient sound transparency so that the user can be more aware of the surroundings.

Figure 8D:
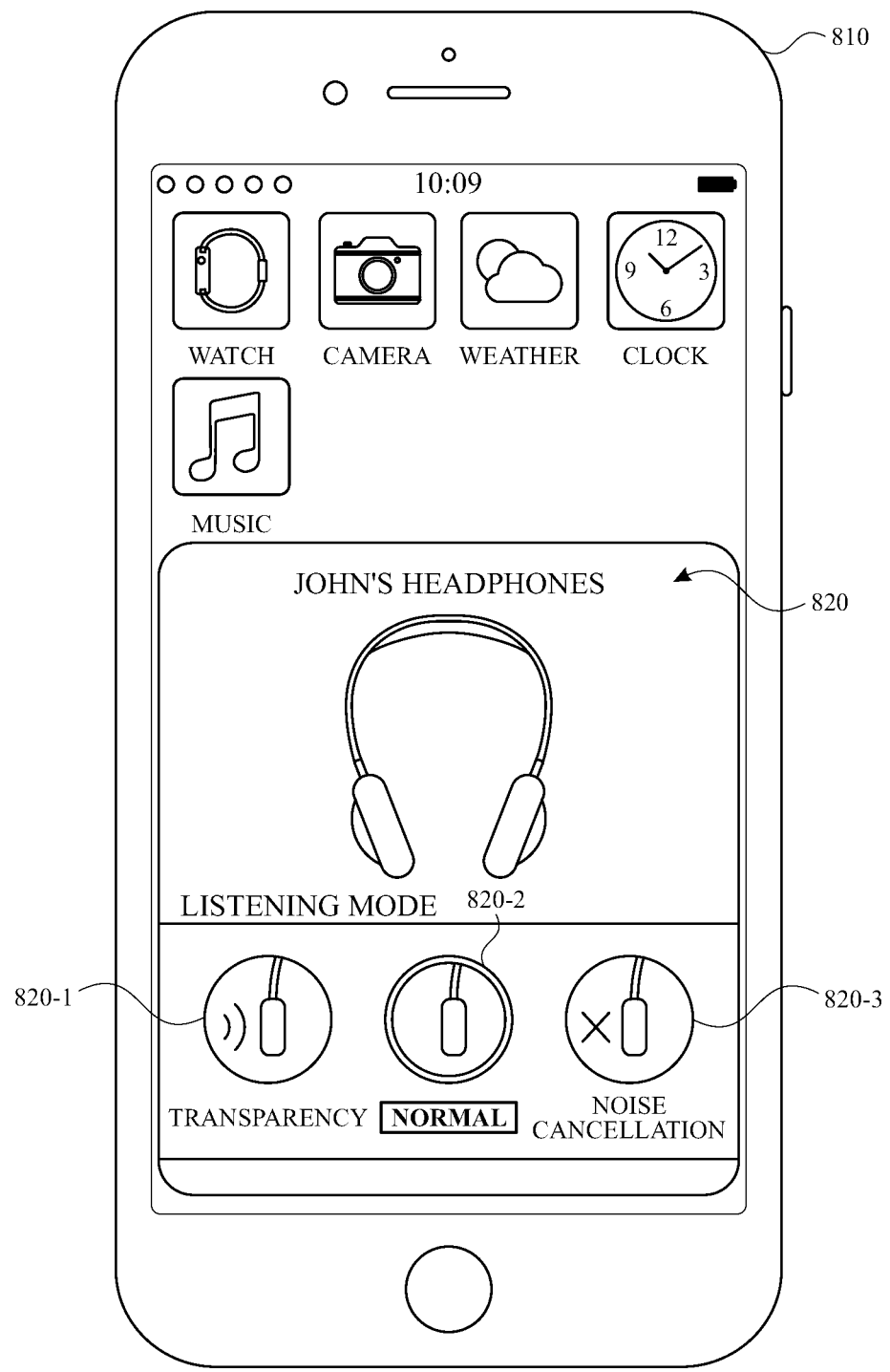
Figure 8E:
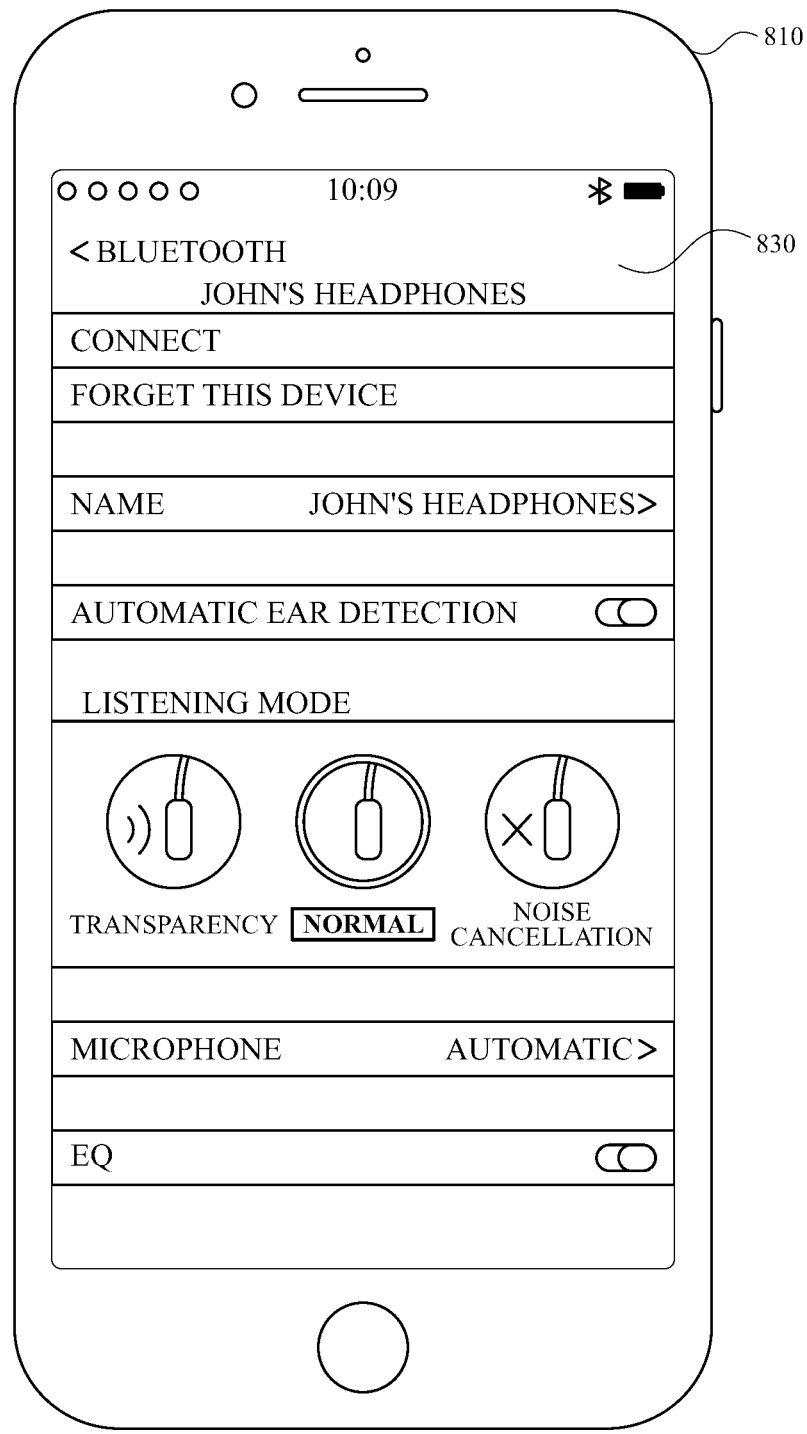

FIG. 8D illustrates an embodiment of user interface 820 for selecting operational settings of headphones 800, displayed on electronic device 810. User interface 820 includes affordances 820-1, 820-2, and 820-3 that can be selected to operate headphones 800 in states of high ambient sound transparency, intermediate ambient sound transparency, and low ambient sound transparency, respectively. In some embodiments, headphones 800 include an interface (e.g., buttons) that can be selected to operate headphones 800 in states of high ambient sound transparency, intermediate ambient sound transparency, and low ambient sound transparency. In some embodiments, headphones 800 and/or electronic device 810 includes an interface for selecting levels of ambient sound transparency between the states of high ambient sound transparency and intermediate ambient sound transparency, and between the states of intermediate sound transparency and low ambient sound transparency. In FIG. 8D, user interface 820 is displayed on a home screen of electronic device 810. FIG. 8E illustrates an embodiment of a user interface 830 in a settings menu for selecting a larger set of operational settings of headphones 800.

FIG. 9 is a flow diagram illustrating a method for methods for operation of ambient sound transparency using an electronic device in accordance with some embodiments.

Method 900 is performed at a device (e.g., 100, 300, 500, 600, 800, 1000, 1200, or 1410) with an audio output mechanism (e.g., 111).

As described below, method 900 provides an intuitive way for transitioning the electronic device between transparency (e.g., ambient sound transparency) and noise cancellation, based on the electronic device's context. The method reduces the cognitive burden on a user for transitioning the electronic device between transparency and noise cancellation, thereby creating a more efficient human-machine interface. For battery-operated computing devices, enabling a user to transition the electronic device between and noise cancellation faster and more efficiently conserves power and increases the time between battery charges. Some operations in method 900 are, optionally, combined, the orders of some operations are, optionally, changed, and some operations are, optionally, omitted.

In method 900, the electronic device determines (902) a context of the electronic device (e.g., determining, by the headphones or by an electronic device (e.g., 810) in communication with the headphones, a current context of the headphones). In some embodiments, the headphones and/or the electronic device include one or more sensors—for example, microphones (e.g., 113), location sensors such as GPS sensors (e.g., 135), etc.—that are used in making this determination. In some embodiments, the context is an audio context, a device usage context, or a location/movement context. Some examples of the context of the headphones include that the electronic device (e.g., 810) with which the headphones are in communication is receiving a phone call and the headphones are playing the ringtone for that phone call (e.g., a device usage context), the headphones/user are traveling at a high rate of speed (a location/movement context), another person is talking to the user of the headphones (e.g., an audio context), etc. In some embodiments, determining the context occurs in response to a context-changing (or potentially context-changing) event such as receipt of an incoming call. In some embodiments, determining the context occurs automatically at the time the device is powered on.

In response to determining the context of the electronic device and in accordance with a determination (e.g., an automatic determination, a determination made without user input) that the context of the electronic device is a first context (904), the electronic device operates (906) in a first state of ambient sound transparency (e.g., the state illustrated in FIG. 8A). In some embodiments, the headphones optionally have the ability to operate at multiple levels of noise cancellation/transparency. For example, the headphones are optionally able to operate at a full noise cancellation level (e.g., as illustrated in FIG. 8B, noises from outside of the headphones are fully suppressed, or suppressed as much as the headphones are able, so the user cannot hear those noises—thus, a low state of noise transparency), a full transparency level (e.g., as illustrated in FIG. 8A, noises from outside of the headphones are fully passed through to the user, or passed through as much as the headphones are able, so the user can hear those noises—thus, a high state of noise transparency), and an intermediate level that includes no noise cancellation and no transparency (e.g., thus, a moderate state of noise transparency, as illustrated in FIG. 8C). In some embodiments, the headphones are able to operate in any subset of the above levels and/or are able to operate in additional or alternative noise transparency levels to those provided above).

In response to determining the context of the electronic device and in accordance with a determination that the context of the electronic device is a second context (904), different than the first context, the electronic device operates (908) in a second state of ambient sound transparency, different than the first state of ambient sound transparency (e.g., the state illustrated in FIG. 8B or 8C, as compared to the state illustrated in FIG. 8A). In some embodiments, the headphones automatically, and without user input, operate in different levels of noise transparency depending on the current context of the headphones. For example, if the electronic device with which the headphones are in communication is receiving a phone call and the headphones are playing the ringtone for that phone call, the headphones optionally operate in a low state of noise transparency to increase the ability of the user to hear the ringtone. As another example, if another person is talking to the user of the headphones, the headphones optionally operate in a high state of noise transparency to increase the ability of the user to hear the other person. As such, the state of noise transparency of the headphones optionally automatically changes over time based on the current context of the headphones). Operating the device in different states of ambient sound transparency based on the context of the device provides the user with a device that adapts ambient sound transparency, without the need for user action. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device is configured to operate in a plurality of states (e.g., the states illustrated in FIGS. 8A-8C), each state corresponding to an ambient sound transparency level and an ambient sound cancellation level, the plurality of states having a state corresponding to a state of maximum ambient sound cancellation and minimum ambient sound transparency (e.g., FIG. 8B) and a state corresponding to a state of minimum ambient sound cancellation and maximum ambient sound transparency (e.g., FIG. 8A). In some such embodiments, the electronic device includes a control (e.g., 820) for changing the state of the electronic device between the plurality of states. Further in some such embodiments, the plurality of states includes a state corresponding to a state of minimum ambient sound cancellation and minimum ambient sound transparency (e.g., the state illustrated in FIG. 8C).

In some embodiments, the context of the electronic device is determined based on at least content (e.g., audio content) playing on the electronic device. In some such embodiments, the first context is a phone call playing on the electronic device, and the first state of ambient sound transparency corresponds to maximum ambient sound cancellation and minimum ambient sound transparency. In some such embodiments, the first context is music playing on the electronic device, and the first state of ambient sound transparency corresponds to maximum ambient sound cancellation and minimum ambient sound transparency. In some such embodiments, the first context is a notification playing on the electronic device, and the first state of ambient sound transparency corresponds to maximum ambient sound cancellation and minimum ambient sound transparency. In some embodiments, the first context is no content playing on the electronic device, and the first state of ambient sound transparency corresponds to minimum ambient sound cancellation and maximum ambient sound transparency.

In some embodiments, the context of the electronic device is determined based on at least ambient sound of the electronic device (e.g., the ambient sound of the environment of the electronic device). In some such embodiments, first context is ambient sound indicating a dangerous situation, and the first state of ambient sound transparency corresponds to minimum ambient sound cancellation and maximum ambient sound transparency. In some such embodiments, the first context is ambient sound indicating a person talking to the user, and the first state of ambient sound transparency corresponds to minimum ambient sound cancellation and maximum ambient sound transparency. In some such embodiments, the first context is ambient sound including a user's name, and the first state of ambient sound transparency corresponds to minimum ambient sound cancellation and maximum ambient sound transparency.

In some embodiments, the context of the electronic device is determined based on at least a location of the electronic device. In some such embodiments, the first context is movement of the electronic device exceeding a threshold speed, and the first state of ambient sound transparency corresponds to minimum ambient sound cancellation and maximum ambient sound transparency.

In some embodiments, the state of ambient sound transparency in which the electronic device is operated is selected from the group consisting of: a state that passively passes ambient sound through the electronic device, a state that actively cancels ambient sound, and a state that actively amplifies ambient sound.

Note that details of the processes described above with respect to method 900 (e.g., FIG. 9) are also applicable in an analogous manner to the methods described below and above. For example, method 900 optionally includes one or more of the characteristics of the various methods described above with reference to method 700. For example, method 900 can be performed on an electronic device that detects a first gesture, including detecting an orientation of the first gesture with respect to a touch-sensitive surface of the device and performs different actions (e.g., media-related actions) depending on the orientation of the first gesture and the orientation of the device. For another example, method 900 can be performed on a device that detects motion of the device and operates in different audio output states, based on the detected motion (e.g., per method 1100). For brevity, these details are not repeated below.

FIGS. 10A-10C illustrate exemplary user interfaces for setting the audio output of an electronic device based on motion of the electronic device, in accordance with some embodiments. The user interfaces in these figures are used to illustrate the processes described below, including the processes in FIG. 11.

Turning now to FIGS. 10A-10C, techniques for setting the audio output of an electronic device based on motion of the electronic device are described.

FIG. 10A depicts a user interacting with exemplary headphones 1000 (which can include one or more features of devices 100, 300, or 500). Headphones 1000 include one or more sensors (e.g., inertial measurement units including accelerometers, gyroscopes, or magnetometers) for detecting motion of headphones 1000. Optionally, headphones 1000 include positional sensors (e.g., sensors for determining the position of headphones 1000 relative to a user). Optionally, headphones 1000 include one or more features of headphones 600 or headphones 800 described above (e.g., image sensors to determine on which of the user's ears each ear cup is placed).

FIG. 10A indicates that headphones 1000 were previously resting on the table in front of the user and that the user picks up headphones 1000 and places them on his ears. Headphones 1000 (or an electronic device in communication with headphones 1000) detect the motion. In response to detecting the motion, headphones 1000 are operated in an audio output state that is based on the characteristics of the detected motion. For example, headphones 1000 determine that the user picked up headphones 1000 from the surface of the table, and in accordance with this determination, headphones 100 are powered on (if headphones were in a powered off state prior to being picked up) or transition from a standby operating state to a normal operating state. In some embodiments, the standby operating state includes the sensors for detecting motion of headphones 1000 being powered on (so that headphones 1000 can detect motion) without speaker drivers in headphones 1000 being powered on, while the normal operating state includes the sensors and the speaker drivers being powered on. As such, the operating state of the headphones optionally automatically changes based on the motion of headphones 1000. In some embodiments, headphones 1000 are determined to be picked up based on headphones 1000 being raised, re-oriented from a horizontal orientation to a vertical orientation, placed on a user's ears (e.g., the device detects the user's ears), or contacted by the user, or some combination thereof.

FIG. 10B illustrates the user removing headphones 1000 and placing them down on the surface of the table. In response to detecting the motion and determining that the motion corresponds to headphones 1000 being placed down, headphones 1000 operated according to a different state than the state in which headphones 1000 operated in response to being picked up. For example, when headphones 1000 are removed and/or placed down, headphones 1000 power off or transition from a normal operating state to a standby operating state. In some embodiments, headphones 1000 are determined to have been placed down based on headphones 1000 being lowered, re-oriented from a vertical orientation to a horizontal orientation, removed from a user's ears (e.g., the device no longer detects the user's ears), or no longer in contact with the user, or some combination thereof.

Turning to FIG. 10C, the user is depicted as removing headphones 1000 from his ears and placing headphones 1000 around his neck. In some embodiments, in response to determining that headphones 1000 are placed around the user's neck, headphones 1000 play white noise, pause currently-playing content, or are placed in a power standby mode. Optionally, in response to determining that headphones 1000 are placed around the user's neck, headphones 1000 operate in a state in which notification sounds are amplified so that the user can hear the notifications even though the headphones are not on the user's ears. Optionally, headphones 1000 do not amplify sounds other than notification sounds (e.g., only notification sounds are amplified). Optionally, both notification sounds and non-notification sounds are amplified.

Other responses to various other motions and/or positions are possible. For example, in response to a determination that the orientation of headphones 1000 is changed from a first orientation with a first ear cup on a user's first ear and a second ear cup on the user's second ear (e.g., the final configuration depicted in FIG. 10A) to a second orientation with the first ear cup on the user's second ear and the second ear cup on the user's first ear, headphones 1000 are operated in a stereo channel configuration corresponding to the second orientation.

FIG. 11 is a flow diagram illustrating a method for operating an electronic device in different audio states based on motion of the electronic device in accordance with some embodiments. Method 1100 is performed at an electronic device (e.g., 100, 300, 500, 600, 800, 1000, 1200, or 1410) (e.g., headphones) having one or more motion sensors (e.g., 538) and an audio output mechanism (e.g., 113). In some embodiments, the electronic device further includes positional sensors (e.g., sensors 164 and 166 for determining the position of the device relative to a user).

As described below, method 1100 provides an intuitive way for operating an electronic device in different audio states based on motion of the electronic device. The method reduces the cognitive burden on a user for operating an electronic device in different audio states based on motion of the electronic device, thereby creating a more efficient human-machine interface. For battery-operated computing devices, enabling a user to operate an electronic device in different audio states based on motion of the electronic device faster and more efficiently conserves power and increases the time between battery charges. Some operations in method 1100 are, optionally, combined, the orders of some operations are, optionally, changed, and some operations are, optionally, omitted.

In method 1100, the electronic device detects (1102) first motion (e.g., a change in position of the electronic device, a change in position of the electronic device with reference to a user of the electronic device (e.g., motion or change in position resulting from being around the user's neck to being on the user's head) of the electronic device (e.g., detecting, by the electronic device (e.g., headphones) or by an external electronic device in communication with the headphones, a current motion (e.g., a change in position or orientation) of the headphones). In some embodiments, the headphones and/or the external electronic device include one or more sensors—for example, inertial measurement units including accelerometers, gyroscopes, magnetometers, etc.—that are used in making this detection. Some examples of the motion of the headphones that is detected includes the headphones being picked up from a surface (e.g., as depicted in FIG. 10A), the headphones being put down on a surface (e.g., as depicted in FIG. 10B), the headphones being placed around a user's neck (e.g., as depicted in FIG. 10C), etc.

In response to detecting the first motion (e.g., motion depicted in FIG. 10A) of the electronic device and in accordance with a determination (1104) that the first motion satisfies first operating state criteria (e.g., one or more criteria that are satisfied when the motion of the headphones indicates that the headphones are being picked up from a surface), the electronic device operates (1106) in a first audio output operating state (e.g., powering on the headphones if they were powered off before being picked up, transitioning the headphones from a standby operating state to a normal operating state if the headphones were in the standby operating state before being picked up, etc. In some embodiments, the standby operating state of the headphones includes powering one or more sensors for detecting motion of the headphones without powering one or more speaker drivers in the headphones, while the normal operating state includes powering the one or more sensors and the one or more speaker drivers). Operating the device in different audio output states based on the motion of the device provides the user with a device that adapts audio output, without the need for user action. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first operating state criteria are met when the electronic device is placed around a user's neck, and wherein operating the electronic device in the first audio output operating state includes playing white noise.

In some embodiments, the first operating state criteria are met when the orientation of the electronic device is changed from a first orientation with a first ear cup on a user's first ear and a second ear cup on the user's second ear to a second orientation with the first ear cup on the user's second ear and the second ear cup on the user's first ear, and the first audio output operating state includes a stereo channel configuration corresponding to the second orientation.

In some embodiments, the first operating state criteria are met when the electronic device is placed around a user's neck, and wherein operating the electronic device in the first audio output operating state includes pausing content or placing the electronic device in a power standby mode.

In some embodiments, the first operating state criteria are met when the electronic device is placed around a user's neck, and wherein operating the electronic device in the first audio output operating state includes amplifying notification sounds. In some such embodiments, operating the electronic device in the first audio output operating state includes not amplifying sounds other than notification sounds. In some such examples, wherein operating the electronic device in the first audio output operating state includes amplifying sounds other than notification sounds.

In some embodiments, the first operating state criteria are met when the electronic device is put down (e.g., in some embodiments, the device is characterized as being "put down" based on the device being lowered, re-oriented from a vertical orientation to a horizontal orientation, removed from a user's ears (e.g., the device no longer detects the user's ears), or no longer in contact with the user, or some combination thereof), and operating the electronic device in the first audio output operating state includes pausing content or placing the electronic device in a power standby mode.

In some embodiments, the first operating state criteria are met when the electronic device is picked up (e.g., in some embodiments, the device is characterized as being "picked up" based on the device being raised, re-oriented from a horizontal orientation to a vertical orientation, placed on a user's ears (e.g., the device detects the user's ears), or contacted by the user, or some combination thereof), and operating the electronic device in the first audio output operating state includes placing the electronic device in an on mode.

In response to detecting the first motion of the electronic device and in accordance with a determination (1104) that the first motion satisfies second operating state criteria (e.g., criteria satisfied by the motion depicted in FIG. 10B), different than the first operating state criteria (e.g., one or more criteria that are satisfied when the motion of the headphones indicates that the headphones are being put down onto a surface), the electronic device operates (1108) in a second audio output operating state, different than the first audio output operating state (e.g., powering off the headphones if they were powered on before being put down, transitioning the headphones from a normal operating state to a standby operating state if the headphones were in the normal operating state before being put down, etc.). In some such embodiments, the operating state of the headphones optionally automatically changes over time based on the current motion of the headphones.

Note that details of the processes described above with respect to method 1100 (e.g., FIG. 11) are also applicable in an analogous manner to the methods described below/above. For example, method 1100 optionally includes one or more of the characteristics of the various methods described above with reference to method 700. For example, method 1100 can be performed on an electronic device that detects a first gesture, including detecting an orientation of the first gesture with respect to a touch-sensitive surface of the device and performs different actions (e.g., media-related actions) depending on the orientation of the first gesture and the orientation of the device. For another example, method 1100 can be performed on an electronic device that determines the current context of the device and operates in different states of ambient sound transparency, in accordance with the determined context (e.g., per method 900). For brevity, these details are not repeated below.

FIGS. 12A-12D illustrate exemplary user interfaces for providing battery level information of an electronic device, in accordance with some embodiments. The user interfaces in these figures are used to illustrate the processes described below, including the processes in FIG. 13.

Figure 12A:
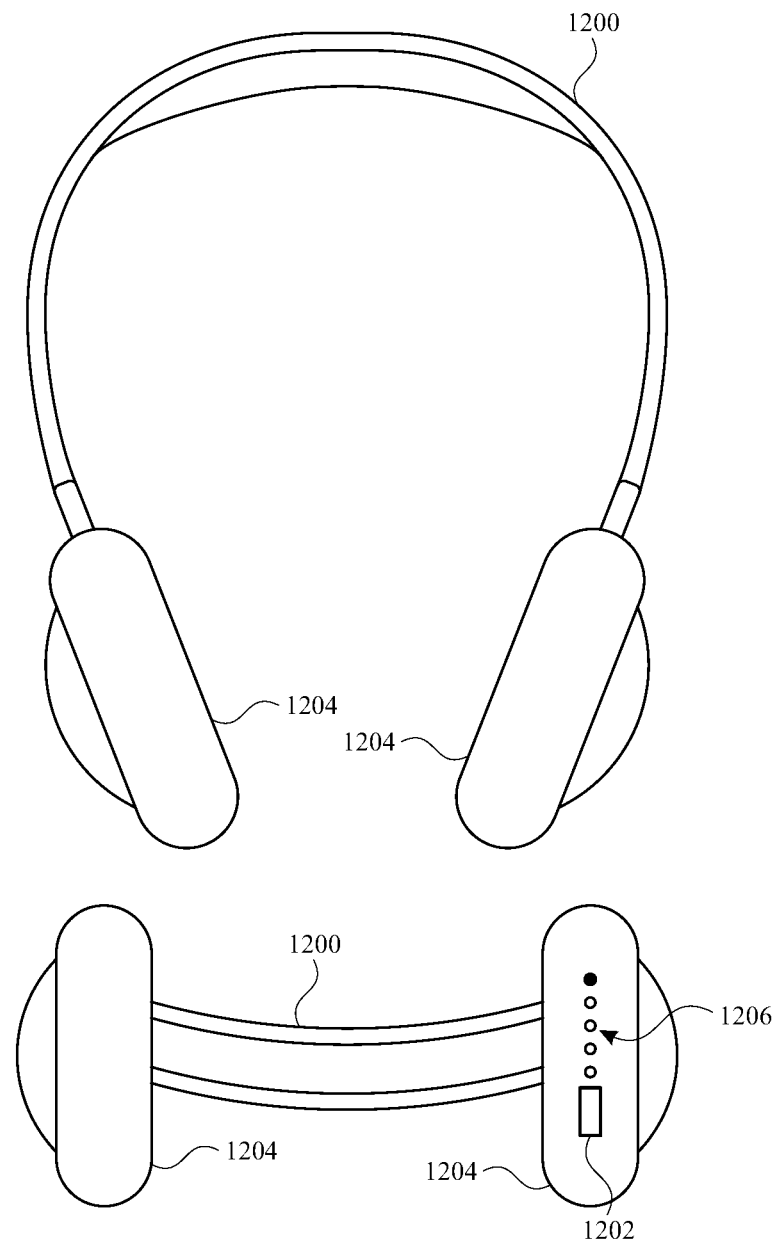
FIGS. 12A-12D illustrate exemplary techniques for providing state information about an electronic device in accordance with some embodiments.

FIG. 12A depicts an exemplary embodiment of headphones 1200 (which can include one or more features of devices 100, 300, or 500). Headphones 1200 include an input device (e.g., button 1201), a first output device for providing audio output (e.g., speakers 1204 in the ear cups), and a second output device 1206 (e.g., a display, LED array, or other light-emitting device) for providing visible output. Headphones 1200 also include one or more orientation sensors (e.g., orientation context sensors or positional sensors). Optionally, the orientation sensors determine the position of headphones 1200 relative to a user. Optionally, headphones 1200 include one or more features of headphones 600, 800, and/or 1000 described above (e.g., image sensors to determine on which of the user's ears each ear cup is placed).

Figure 12B:
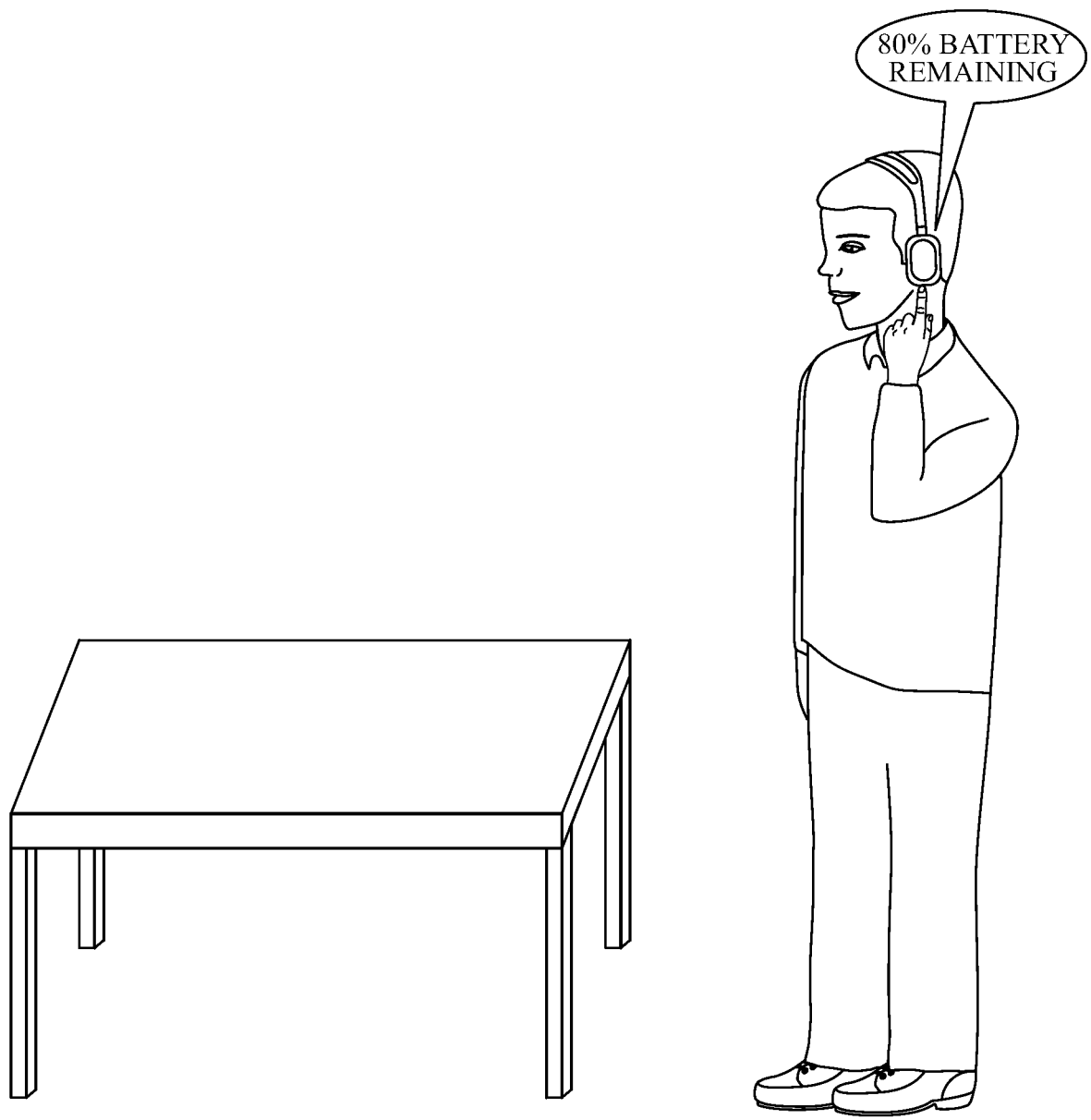

In FIG. 12B, headphones 1200 receive an input (e.g., depression of a button on headphones 1200) requesting information about a state of headphones 1200. Exemplary states of headphones 1200 for which information is requested include a battery level, a connection status of headphones 1200 with another electronic device, a volume level, and/or an ambient sound transparency state. In some embodiments, the input requesting information about the state of headphones 1200 includes selection of an affordance displayed on a touch screen of an electronic device (e.g., device 810) in communication with headphones 1200, or a voice input (e.g., received by headphones 1200 or an electronic device in communication with headphones 1200) requesting the information about the headphones.

In response to receiving the input requesting the information about the state of headphones 1200, headphones 1200 provides the requested information via either the first output device or the second output device based on a current orientation of headphones 1200 when the input is received. The orientation of headphones 120 is optionally based on both the absolute orientation of headphones 1200 and the relative position of headphones 1200 (e.g., relative position with respect to a user). Optionally, the orientation is determined by headphones 1200 or by an electronic device in communication with headphones 1200. In some embodiments, the headphones and/or the electronic device include one or more sensors—for example, inertial measurement units including accelerometers, gyroscopes, magnetometers; imaging sensors in the ear cups of the headphones that are able to image an ear on which the ear cups are placed for determining which ear the ear cups are on and/or whether the ear cups are on an ear at all; etc.—that are used in making this determination.

In FIG. 12B, headphones 1200 determine that headphones 1200 are oriented on the user's head when the input is received (e.g., headphones 1200 determine that the ear cups are on the user's left and/or right ears). Since the user can hear audio from headphones 1200 but cannot view the visible output from the second output device while wearing headphones 1200, headphones 1200 provide an audio output representing the state information using the first output device. Optionally, headphones 1200 do not provide output via the second output device while wearing headphones 1200 in response to the input.

Figure 12C:
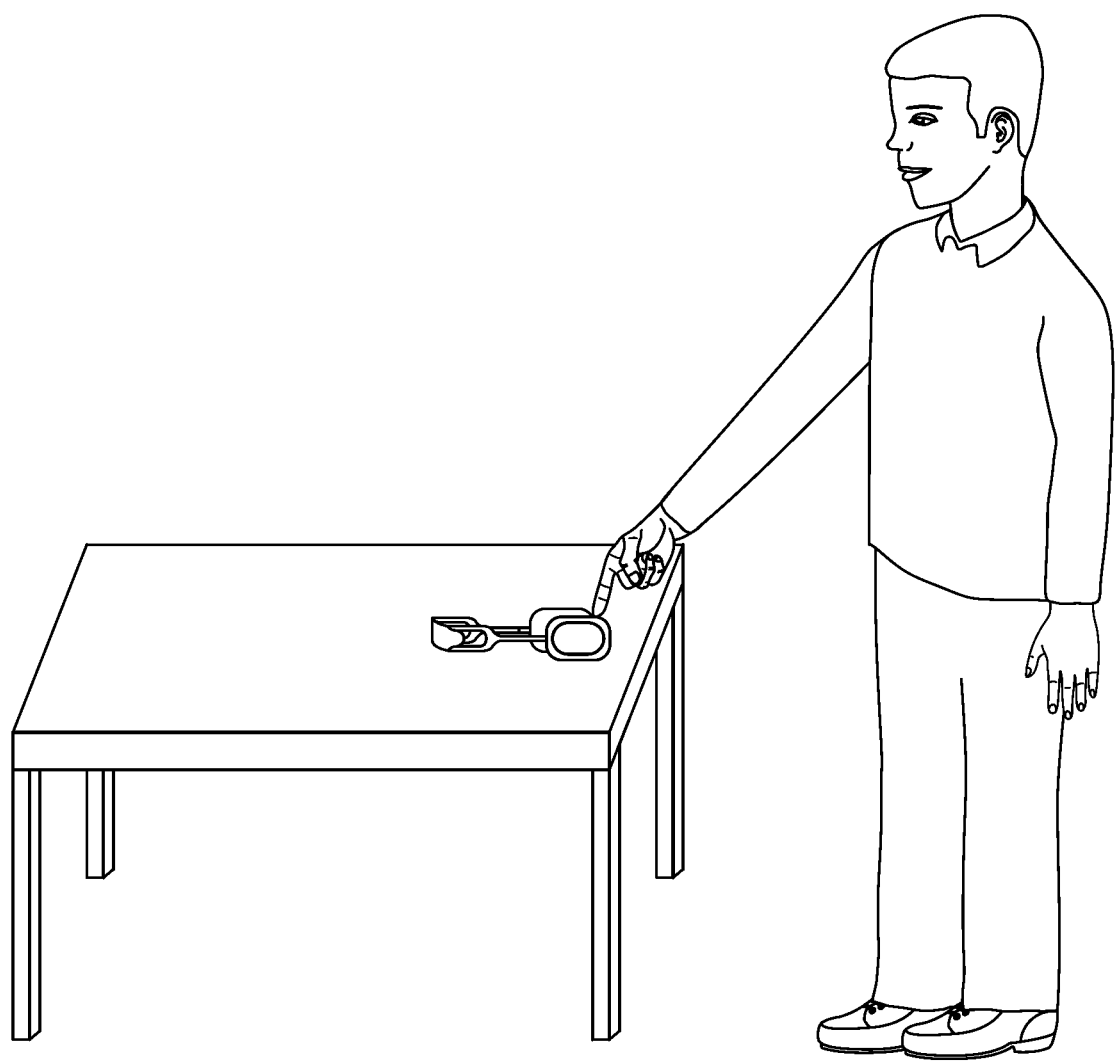
Figure 12D:
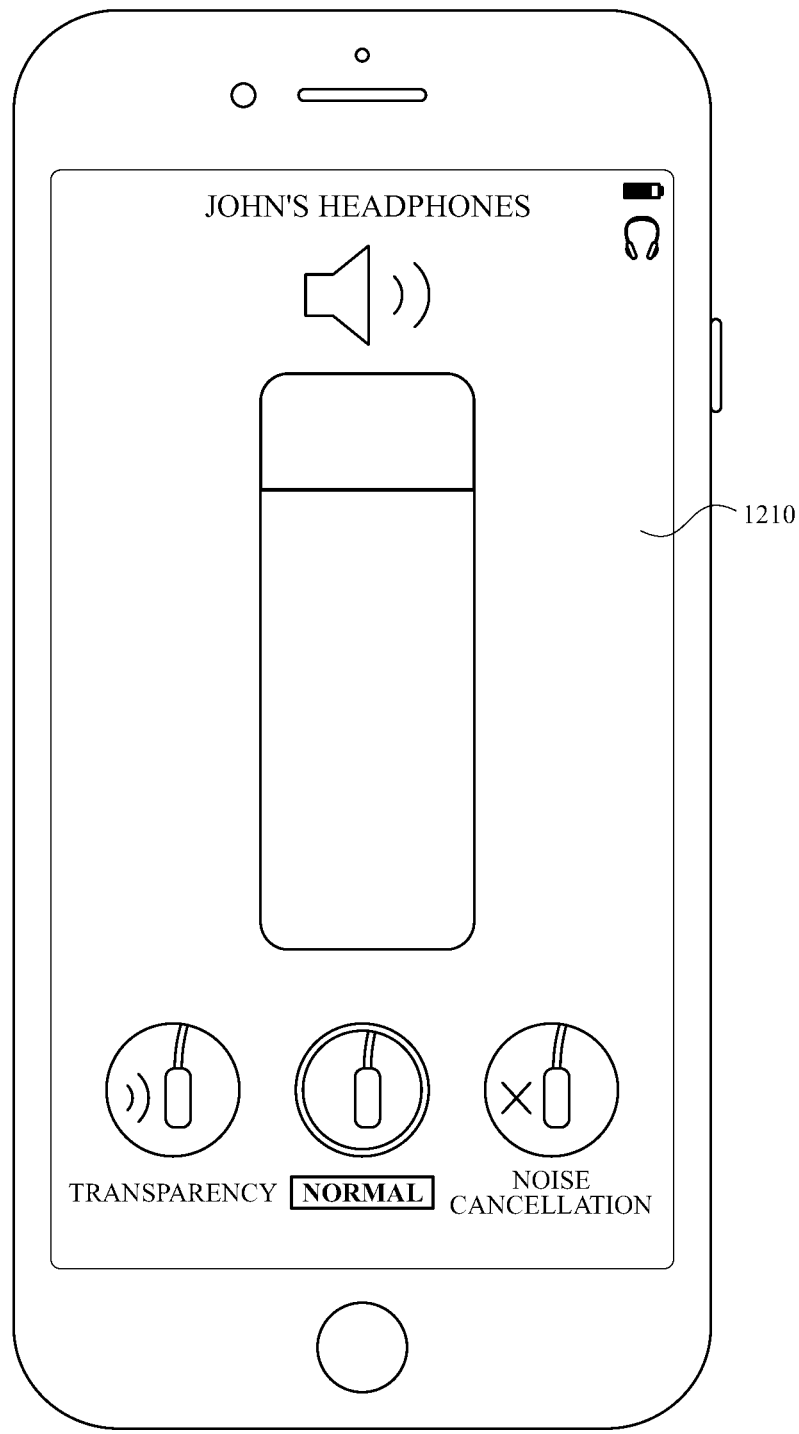

In FIG. 12C, headphones 1200 determine that headphones 1200 are not on the user's head when the input is received (e.g., headphones 1200 determine that neither ear cup of headphones 1200 is on the user's ears). Since the user can view the visible output from the second output device but may not be able to hear audio output while headphones 1200 are not being worn, headphones 1200 provide a visible (e.g., light) output representing the state information using the second output device. Accordingly, headphones 1200 provide output via different output devices for different device orientations. Optionally, headphones 1200 do not provide output via the first output device while not wearing headphones 1200 in response to the input. In some embodiments, the status information is provided by an electronic device in communication with headphones 1200. FIG. 12D illustrates an embodiment of a user interface 1210 that provides a visual display of the volume level, connection status, battery level, and ambient sound transparency mode of headphones 1200.

FIG. 13 is a flow diagram illustrating a method for contextually outputting battery level of an electronic device in accordance with some embodiments. Method 1300 is performed at an electronic device (e.g., 100, 300, 500, 600, 800, 1000, 1200, or 1410) (e.g., headphones) with one or more orientation sensors (e.g., 168), a first output device (e.g., 1204), and a second output device (e.g., 1206) that is different than the first output device. In some embodiments, the first output device outputs audio and the second output device outputs light.

As described below, method 1300 provides an intuitive way for contextually outputting battery level of an electronic device. The method reduces the cognitive burden on a user for contextually outputting battery level of an electronic device, thereby creating a more efficient human-machine interface. For battery-operated computing devices, enabling a user to receive the battery level of an electronic device, based on device context, faster and more efficiently conserves power and increases the time between battery charges. Some operations in method 1300 are, optionally, combined, the orders of some operations are, optionally, changed, and some operations are, optionally, omitted.

In method 1300, the electronic device receives (1302) an input (e.g., as depicted in FIG. 12B) corresponding to a requests for information about a state of the electronic device (e.g., detecting, by the headphones, depression of a button on the headphones for requesting the information about the headphones; detecting, by an electronic device in communication with the headphones, selection of an affordance displayed on a touch screen of the electronic device for requesting the information about the headphones; receiving, at the headphones or at the electronic device, a voice input requesting the information about the headphones, etc.).

In some embodiments, the input corresponding to the request for information about the state of the electronic device includes a depression of a button (e.g., 1202) on the electronic device.

In some embodiments, the input corresponding to the request for information about the state of the electronic device is detected at an external device (e.g., 810) in communication with the electronic device.

In some embodiments, the state of the electronic device includes battery status or a connection status (e.g., as depicted on interface 1210).

In response to receiving the input corresponding to the request for information about the state of the electronic device and in accordance with a determination (1304), based on the one or more orientation sensors, that the electronic device is in a first orientation (e.g., a first orientation context based on both the absolute orientation of the device and the relative position of the device (e.g., relative position with respect to a user)), the electronic device provides (1306) the requested information via the first output device (e.g., without providing it via the second output device). In some embodiments, if the headphones are on the user's head (e.g., at least one ear cup of the headphones is on at least one of the user's ears as depicted in FIG. 12B), the requested information is optionally provided as audio via one or more speaker drivers in the ear cups of the headphones). In some embodiments, the electronic device (e.g., headphones) or an external electronic device in communication with the headphones (e.g., 810), determines a current orientation of the headphones when the input requesting the information is received. In some embodiments, the headphones and/or the electronic device include one or more sensors—for example, inertial measurement units including accelerometers, gyroscopes, magnetometers; imaging sensors in the ear cups of the headphones that are able to image an ear on which the ear cups are placed for determining which ear the ear cups are on and/or whether the ear cups are on an ear at all; etc.—that are used in making this determination. Some examples of the orientation of the headphones include that the headphones are on a user's head (e.g., the ear cups of the headphones are on the user's left and/or right ears), that the headphones are not on the user's head (e.g., neither ear cup of the headphones is on the user's ears), etc.

In some embodiments, the first orientation (e.g., the orientation depicted in FIG. 12B) is on a user's head and the second orientation (e.g., the orientation depicted in FIG. 12C) is not on the user's head.

In response to receiving the input corresponding to the request for information about the state of the electronic device and in accordance with a determination, based on the one or more orientation sensors, that the electronic device is in a second orientation (e.g., the orientation depicted in FIG. 12C), different than the first orientation, providing the requested information about the state of the device via the second output device (e.g., without providing it via the first output device). In some embodiments, if the headphones are not on the user's head, the requested information is optionally provided visually via a display or other light-emitting device on the headphones. For example, if the request for information is a request for the battery level of the headphones, if the headphones are on the user's head, the headphones optionally provide the battery level information audibly via the headphones' speakers, but if the headphones are not on the user's head, the headphones optionally provide the battery level information visually via an LED array built into the headphones. Providing information selectively via different output devices based on the orientation information provides the user with the information using a modality that is appropriate for the user's current relationship to the device. Doing so improves the user's ability to receive the information by using an output type that is more likely to be perceivable by the user. Providing feedback using a more ideal output mechanism enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1300 (e.g., FIG. 13) are also applicable in an analogous manner to the methods described below/above. For example, method 1300 optionally includes one or more of the characteristics of the various methods described above with reference to method 700. For example, method 1300 can be performed on an electronic device that detects a first gesture, including detecting an orientation of the first gesture with respect to a touch-sensitive surface of the device and performs different actions (e.g., media-related actions) depending on the orientation of the first gesture and the orientation of the device. For another example, method 1300 can be performed on an electronic device that determines the current context of the device and operates in different states of ambient sound transparency, in accordance with the determined context (e.g., per method 900). For brevity, these details are not repeated below. For brevity, these details are not repeated below.

Turning now to FIG. 14, techniques for operating multiple sets of headphones are described. FIG. 14 depicts electronic device 1400 (e.g., phone), first headphones 1410, and second headphones 1420. Electronic device 1400 is connected (e.g., paired via a wireless communication link) with first headphones 1410 and provides content (e.g., music audio) to headphones 1410 via the connection. In FIG. 14, first headphones 1410 plays the content received from device 1400. Further, first headphones 1410 is connected (e.g., paired via a wireless communication link) with second headphones 1420. Optionally, second headphones 1420 are not connection with device 1400. First headphones 1410 forward the content from device 1400 to second headphones 1420 via the connection between first headphones 1410 and second headphones 1420. Accordingly, first headphones 1410 act like a repeater. In this way, content provided by a single source is provided to multiple devices. For example, music originating from device 1400 is sent to first headphones 1410 and then forwarded to second headphones 1420 so that the music is played on first headphones 1410 and second headphones 1420 together.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device that is configured to communicate with an external audio output device, comprising:
   a display device;
   one or more processors; and
   memory storing one or more programs configured to be executed by the one or more processors, the one or more programs including instructions for:
      displaying, via the display device, a first user interface, wherein the first user interface includes concurrent display, in the same user interface, of:
         a first selectable user interface object, displayed in the first user interface, that, when selected, causes the external audio output device to be configured to a sound transparency mode that includes active pass-through of ambient sounds; and
         a second selectable user interface object, displayed in the first user interface, that, when selected, causes the external audio output device to be configured to a noise cancellation mode that includes active cancellation of ambient sounds.

2. The electronic device of claim 1, wherein the first user interface includes concurrent display of the first selectable user interface object, the second selectable user interface object, and a third selectable user interface object that, when selected, causes the external audio output device to be configured to an intermediate ambient sound transparency mode, wherein the intermediate ambient sound transparency mode does not include active pass-through of ambient sounds and does not include active cancelation of ambient sounds.

3. The electronic device of claim 1, wherein the first user interface includes concurrent display of the first selectable user interface object, the second selectable user interface object, and a fourth user interface object that indicates a volume level of the external audio output device.

4. The electronic device of claim 3, wherein the fourth user interface object indicates the volume level of the external audio output device relative to a minimum volume level and a maximum volume level.

5. The electronic device of claim 1, wherein displaying the first user interface includes displaying the first user interface on a home screen user interface displayed via the display device.

6. The electronic device of claim 1, wherein the first user interface includes concurrent display of the first selectable user interface object, the second selectable user interface object, and a first status of the external audio output device, wherein the first status of the external audio output device includes one or more of a connection status of the external audio output device, a battery level of the external audio output device, and an ambient sound transparency mode of the external audio output device.

7. The electronic device of claim 1, the one or more programs including instructions for:
   detecting a first user input; and
   in response to detecting the first user input, displaying information about a state of the external audio output device.

8. The electronic device of claim 7, wherein the information about a state of the external audio output device includes one or more of a device name, a current microphone setting mode, and a current ear detection mode.

9. The electronic device of claim 1, wherein the first user interface includes a name of the external audio output device.

10. The electronic device of claim 1, wherein the first user interface includes a graphical representation of the external audio output device.

11. A method, comprising:
at an electronic device with a display device, wherein the electronic device is in communication with an external audio output device:
displaying, via the display device, a first user interface, wherein the first user interface includes concurrent display, in the same user interface, of:
a first selectable user interface object, displayed in the first user interface, that, when selected, causes the external audio output device to be configured to a sound transparency mode that includes active pass-through of ambient sounds; and
a second selectable user interface object, displayed in the first user interface, that, when selected, causes the external audio output device to be configured to a noise cancellation mode that includes active cancellation of ambient sounds.

12. A non-transitory computer-readable storage medium storing one or more programs configured to be executed by one or more processors of an electronic device with a display device, wherein the electronic device is in communication with an external audio output device, the one or more programs including instructions for:
displaying, via the display device, a first user interface, wherein the first user interface includes concurrent display, in the same user interface, of:
a first selectable user interface object, displayed in the first user interface, that, when selected, causes the external audio output device to be configured to a sound transparency mode that includes active pass-through of ambient sounds; and
a second selectable user interface object, displayed in the first user interface, that, when selected, causes the external audio output device to be configured to a noise cancellation mode that includes active cancellation of ambient sounds.

13. The method of claim 11, wherein the first user interface includes concurrent display of the first selectable user interface object, the second selectable user interface object, and a third selectable user interface object that, when selected, causes the external audio output device to be configured to an intermediate ambient sound transparency mode, wherein the intermediate ambient sound transparency mode does not include active pass-through of ambient sounds and does not include active cancelation of ambient sounds.

14. The method of claim 11, wherein the first user interface includes concurrent display of the first selectable user interface object, the second selectable user interface object, and a fourth user interface object that indicates a volume level of the external audio output device.

15. The method of claim 14, wherein the fourth user interface object indicates the volume level of the external audio output device relative to a minimum volume level and a maximum volume level.

16. The method of claim 11, wherein displaying the first user interface includes displaying the first user interface on a home screen user interface displayed via the display device.

17. The method of claim 11, wherein the first user interface includes concurrent display of the first selectable user interface object, the second selectable user interface object, and a first status of the external audio output device, wherein the first status of the external audio output device includes one or more of a connection status of the external audio output device, a battery level of the external audio output device, and an ambient sound transparency mode of the external audio output device.

18. The method of claim 11, further comprising:
detecting a first user input; and
in response to detecting the first user input, displaying information about a state of the external audio output device.

19. The method of claim 18, wherein the information about a state of the external audio output device includes one or more of a device name, a current microphone setting mode, and a current ear detection mode.

20. The method of claim 11, wherein the first user interface includes a name of the external audio output device.

21. The method of claim 11, wherein the first user interface includes a graphical representation of the external audio output device.

22. The non-transitory computer-readable storage medium of claim 12, wherein the first user interface includes concurrent display of the first selectable user interface object, the second selectable user interface object, and a third selectable user interface object that, when selected, causes the external audio output device to be configured to an intermediate ambient sound transparency mode, wherein the intermediate ambient sound transparency mode does not include active pass-through of ambient sounds and does not include active cancelation of ambient sounds.

23. The non-transitory computer-readable storage medium of claim 12, wherein the first user interface includes concurrent display of the first selectable user interface object, the second selectable user interface object, and a fourth user interface object that indicates a volume level of the external audio output device.

24. The non-transitory computer-readable storage medium of claim 23, wherein the fourth user interface object indicates the volume level of the external audio output device relative to a minimum volume level and a maximum volume level.

25. The non-transitory computer-readable storage medium of claim 12, wherein displaying the first user interface includes displaying the first user interface on a home screen user interface displayed via the display device.

26. The non-transitory computer-readable storage medium of claim 12, wherein the first user interface includes concurrent display of the first selectable user interface object, the second selectable user interface object, and a first status of the external audio output device, wherein the first status of the external audio output device includes one or more of a connection status of the external audio output device, a battery level of the external audio output device, and an ambient sound transparency mode of the external audio output device.

27. The non-transitory computer-readable storage medium of claim 12, wherein the one or more programs further include instructions for:
detecting a first user input; and in response to detecting the first user input, displaying information about a state of the external audio output device.

28. The non-transitory computer-readable storage medium of claim 27, wherein the information about a state of the external audio output device includes one or more of a device name, a current microphone setting mode, and a current ear detection mode.

29. The non-transitory computer-readable storage medium of claim 12, wherein the first user interface includes a name of the external audio output device.

30. The non-transitory computer-readable storage medium of claim 12, wherein the first user interface includes a graphical representation of the external audio output device.

* * * * *